(12) United States Patent
Gorshkov et al.

(10) Patent No.: US 12,632,770 B2
(45) Date of Patent: May 19, 2026

(54) PASSIVELY PROTECTED QUANTUM MEMORY AND OPERATING A PASSIVELY PROTECTED QUANTUM MEMORY IN TWO DIMENSIONS

(71) Applicant: Government of the United States of America, as represented by the Secretary of Commerce, Gaithersburg, MD (US)

(72) Inventors: Alexey Vyacheslavovich Gorshkov, Potomac, MD (US); Simon Kin-Wei Lieu, Washington, DC (US); Yu-Jie Liu, Garching (DE)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 43 days.

(21) Appl. No.: 18/663,156

(22) Filed: May 14, 2024

(65) Prior Publication Data

US 2024/0386305 A1 Nov. 21, 2024

Related U.S. Application Data

(60) Provisional application No. 63/467,705, filed on May 19, 2023.

(51) Int. Cl.
*G06N 10/70* (2022.01)
*G06N 10/40* (2022.01)

(52) U.S. Cl.
CPC ............. *G06N 10/70* (2022.01); *G06N 10/40* (2022.01)

(58) Field of Classification Search
None
See application file for complete search history.

(56) References Cited

U.S. PATENT DOCUMENTS

| | | | | |
|---|---|---|---|---|
| 9,978,020 B1 * | 5/2018 | Gambetta | ........... | H03M 13/154 |
| 10,250,271 B2 * | 4/2019 | Goto | ...................... | G06N 10/20 |
| 11,909,451 B2 * | 2/2024 | Noh | ........................ | H04B 10/70 |
| 12,361,313 B2 * | 7/2025 | Royer | ................... | G06N 10/20 |
| 2018/0341874 A1 * | 11/2018 | Puri | ...................... | G06N 10/40 |

(Continued)

OTHER PUBLICATIONS

Lieu, et al., Candidate for a self-correcting quantum memory in two dimensions, May 19, 2022, arXiv:2205.09767v1 [quant-ph] May 19, 2022, https://doi.org/10.48550/arXiv.2205.09767 (Year: 2022).*

(Continued)

*Primary Examiner* — Daniel F. McMahon
(74) *Attorney, Agent, or Firm* — Office of Chief Counsel for National Institute of Standards and Technology

(57) ABSTRACT

A passively protected quantum memory operates in two dimensions using a square lattice of harmonic oscillators. Each harmonic oscillator is subjected to a coherent two-photon drive process and an incoherent two-photon loss process. The oscillators are coupled to their nearest neighbors via a ferromagnetic Ising parity-parity interaction. A cold bath coupled to the oscillators facilitates an energy dissipation process that aligns the parities of neighboring oscillators. This configuration passively suppresses phase-flip and bit-flip errors without active error correction cycles.

30 Claims, 9 Drawing Sheets

(56)　　　　　　References Cited

U.S. PATENT DOCUMENTS

| 2021/0125096 A1* | 4/2021 | Puri | G06N 10/40 |
| 2024/0303524 A1* | 9/2024 | Houck | G06N 10/40 |

OTHER PUBLICATIONS

Leghtas, et al., Hardware-efficient autonomous quantum error correction, Jan. 16, 2023, arXiv:1207.0679v2 [quant-ph] Jan. 16, 2013, https://doi.org/10.48550/arXiv.1207.0679 (Year: 2013).*

Dennis, E., et al., "Topological quantum memory", J. Math. Phys., 2002, p. 4452-4505, vol. 43.

Alicki, R., et al., "On thermal stability of topological qubit in Kitaev's 4D model", Open Syst. Inf. Dyn., 2010, p. 1-9, vol. 17.

Mirrahimi, M., et al., "Dynamically protected cat-qubits: a new paradigm for universal quantum computation", New Journal of Physics, 2014, p. 045014, vol. 16.

Gilles, L., et al., "Generation of nonclassical light by dissipative two-photon processes", Physical Review A, 1994, p. 2785-2799, vol. 49 No.4.

Lieu, S., et al., "Symmetry Breaking and Error Correction in Open Quantum Systems", Physical Review Letters, 2020, p. 240405, vol. 125.

Guillaud, J., et al., "Repetition Cat Qubits for Fault-Tolerant Quantum Computation", Physical Review X, 2019, p. 041053, vol. 9.

Chamberland, C., et al., "Building a Fault-Tolerant Quantum Computer Using Concatenated Cat Codes", PRX Quantum, 2022, p. 010329, vol. 3.

* cited by examiner

PASSIVELY PROTECTED QUANTUM MEMORY AND OPERATING A PASSIVELY PROTECTED QUANTUM MEMORY IN TWO DIMENSIONS

CROSS REFERENCE TO RELATED APPLICATIONS

This application claims the benefit of U.S. Provisional Patent Application Ser. No. 63/467,705 (filed May 19, 2023), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BACKGROUND

The present invention generally relates to the field of quantum error correction, and more particularly to techniques for passively protecting quantum memories in two-dimensional systems.

Quantum computing presents a revolutionary leap in computational power, promising to significantly accelerate advancements in fields like materials design and drug discovery. However, the realization of large-scale, practical quantum computers faces a critical hurdle: quantum decoherence. Qubits, the fundamental units of information in quantum computers, are highly susceptible to errors induced by unwanted interactions with the environment and imperfect control mechanisms. These errors, if unchecked, can rapidly accumulate and undermine the integrity of quantum computations.

To mitigate this challenge, quantum error correction (QEC) techniques have been developed. QEC methods employ redundant encoding of quantum information to detect and correct errors. Traditional approaches to QEC rely on active error correction, which involves continuous monitoring of the system for errors and subsequent corrective actions. This constant measurement and correction process adds complexity and overhead to quantum computation, hindering its scalability and efficiency.

Passive error correction offers an alternative approach to QEC, aiming to inherently protect quantum information from errors without the need for continuous active intervention. This strategy involves embedding the encoded quantum bits, or quantum memory, within a specially designed environment that naturally suppresses errors. While theoretical frameworks for passively protected quantum memories in four or more spatial dimensions have been proposed, these models are impractical for real-world implementation due to the constraints of our three-dimensional physical world.

It is therefore an objective of the present invention to provide a novel passively protected quantum memory that operates efficiently in two dimensions. This would enable the creation of robust quantum memories without the complexity and overhead associated with active error correction, thereby overcoming the above-mentioned disadvantages of the conventional technology at least in part. Accordingly, methods and equipment for utilizing bosonic modes (such as phonons or optical or microwave photons) for passively protected quantum memory in two dimensions, as provided by the present invention, would be advantageous and would be favorably received in the art.

BRIEF DESCRIPTION

One aspect of the present invention relates to a passively protected memory in two dimensions. A passively protected memory may be understood as a system designed to store quantum information while inherently mitigating errors without the need for active error correction mechanisms. A quantum memory refers to a physical system capable of storing and preserving quantum states. Two-dimensional in this context signifies that the memory is arranged within a plane, as opposed to occupying three-dimensional space.

It may be provided that the passively protected memory in two dimensions comprises a square lattice of quantum harmonic oscillators. Harmonic oscillators are physical systems that exhibit periodic behavior, and in this context, they represent the individual units of the quantum memory. These quantum harmonic oscillators can be implemented using phonons (i.e. vibrations of some system such as an ion trapped by electromagnetic fields) or using optical or microwave photons. As building blocks for the passive quantum memory, quantum harmonic oscillators exhibit outstanding coherence properties, allowing them to maintain quantum superpositions for extended periods. The passively protected quantum memory built out of these oscillators can store a robust long-lived logical qubit that has even better coherence properties than the underlying oscillators, as the passive protection autonomously corrects residual excitation-loss and dephasing errors in the oscillators.

Further, each of the harmonic oscillators experiences a two-photon drive process and a two-photon loss process, wherein the oscillators can be, e.g., phonons or photons, the language of photons is used for concreteness. A two-photon drive process refers to the controlled coherent addition of pairs of photons to the harmonic oscillator, while a two-photon loss process describes the simultaneous incoherent removal of two photons. This arrangement drives the oscillator into a qubit steady state defined by two large coherent states that are 180 degrees out of phase with each other. This arrangement also ensures that the quantum information encoded within this qubit steady state is continuously stabilized against decoherence caused by photon dephasing. Symmetric and antisymmetric superpositions of the two coherent states are the logical basis states and will be referred to as even and odd cat states because they are composed of even and odd photon number (Fock) states, respectively. Photon dephasing causes phase-flip errors in this even/odd basis, i.e. the even basis state picks up a minus sign under this error. This process therefore suppresses phase-flip errors caused by dephasing.

While photon dephasing causes phase-flip errors in the even-odd basis, photon loss causes bit-flip errors in this basis, i.e., it flips an odd cat state into an even cat state and vice versa. To protect against bit-flip errors, oscillators are arranged into a two-dimensional square lattice and are coupled to each other with a nearest-neighbor ferromagnetic Ising-like parity-parity Hamiltonian that favors neighboring oscillators to have the same parity (i.e., to be either both even or both odd). An Ising-like interaction refers to a coupling between two systems where their interaction energy depends on the relative alignment of their states. The parity-parity aspect indicates that the interaction specifically depends on the parity (even or odd) of the photon number within each harmonic oscillator. This interaction, in the presence of a cold bath, promotes the alignment of parities of neighboring oscillators, effectively creating a collective error-correcting code. One advantage of this coupling scheme is the suppression of bit-flip errors caused by photon loss.

As indicated above, a cold bath is coupled to the harmonic oscillators that drives the system towards the ground subspace of the Ising-like parity-parity Hamiltonian. A cold bath refers to a reservoir at a low temperature that can absorb energy from the system. This coupling enables the dissipation of energy from the two-dimensional array of oscillators, driving them towards a low-energy, stable state. The cold bath interacts with the harmonic oscillators in a way that aligns the parities of neighboring cavities via local dissipators. A local dissipator describes a process that causes the loss of energy or coherence within a specific region of the system. This arrangement ensures that local errors introduced into the quantum memory are effectively corrected by the dissipative interactions with the cold bath. One advantage of this configuration is the continuous and localized suppression of bit-flip errors within the quantum memory, which is essential for the performance of the quantum memory.

In the case where the oscillators are LC oscillators in a superconducting circuit, the nearest-neighbor parity-parity interaction is implemented by coupling two neighboring oscillators via a Josephson junction. A Josephson junction is a quantum mechanical device that allows the flow of superconducting current between two superconductors separated by a thin insulating barrier. In this context, the Josephson junctions facilitate interactions between neighboring harmonic oscillators, generating the desired Ising-like parity-parity interaction.

It may be provided that each of the harmonic oscillators experiences a coherent two-photon drive process with an amplitude $\lambda$ and a two-photon loss process with a rate $\kappa_2$. The amplitude $\lambda$ determines the strength of the drive, influencing the number of photons coherently added to the harmonic oscillators during the drive process. The rate $\kappa_2$ governs the speed at which photons are removed from the harmonic oscillators through the incoherent loss process. By carefully tuning these parameters, the quantum memory can be optimized for both coherence and error correction.

It may also be provided that the parity-parity interaction Hamiltonian between neighboring cavities on an M by M square lattice is defined as $H_S = -\sum_{\langle ij \rangle} Q_i Q_j$, where $Q_j$ is the photon parity operator at site j. The photon parity operator indicates the evenness (in which case it is equal to 1) or oddness (in which case it is equal to $-1$) of the number of photons (i.e., excitations) in the oscillator (which can also be referred to as a cavity). This specific form of the interaction Hamiltonian ensures that the energy of the system depends on the relative parity of neighboring cavities, encouraging their alignment and contributing to the passive error correction capabilities of the memory.

It may further be provided that the local dissipators, produced by the combination of the parity-parity Hamiltonian and the cold bath, are defined as $$L_{x,y}^{(4)} = \sqrt{\tilde{\kappa}_{nn}}\, a_{x,y} P_{x,y;\rightarrow}^- P_{x,y;\uparrow}^- P_{x-1,y;\rightarrow}^- P_{x,y-1;\uparrow}^-,$$

$$L_{x,y}^{(3)} = \sqrt{\tilde{\kappa}_{nn}}\, a_{x,y} P_{x,y;\rightarrow}^+ P_{x,y;\uparrow}^- P_{x-1,y;\rightarrow}^- P_{x,y-1;\uparrow}^-,$$

4 wherein $a_{x,y}$ is the annihilation operator for the cavity at site $$x,\, y,\, \tilde{\kappa}_{nn} = \sqrt{\kappa_1 \kappa_{nn} + \kappa_1^2} - \kappa_1,$$

$\kappa_1$ is the single-photon loss rate corresponding to the local dissipator $$L_{1,x,y} = \sqrt{\kappa_1}\, a_{x,y},\ P_{x,y;\rightarrow}^\pm = (1 \pm Q_{x,y} Q_{x+1,y})/2,$$

$$P_{x,y;\uparrow}^\pm = (1 \pm Q_{x,y} Q_{x,y+1})/2,\ \text{and}\ Q_{x,y} = e^{i\pi a_{x,y}^\dagger a_{x,y}}.$$

The annihilation operator $a_{x,y}$ removes a photon from the cavity at site i, while the creation operator $$a_{x,y}^\dagger$$

adds a photon. This definition of local dissipators ensures that the system preferentially loses energy in configurations with misaligned parities, driving the system towards a state with aligned parities and thus, correcting bit-flip errors.

It may be provided that the steady states of the model span the codespace and are defined as $|\psi\rangle = c_0 |\alpha_e\rangle |\alpha_e\rangle |\alpha_e\rangle \ldots + c_1 |\alpha_o\rangle |\alpha_o\rangle |\alpha_o\rangle \ldots$, for $|c_0|^2 + |c_1|^2 = 1$. The codespace refers to the subspace of states that are used to encode quantum information. The states $|\alpha_e\rangle$ and $|\alpha_o\rangle$ represent even and odd cat states, respectively, which are superpositions of coherent states with opposite phases. At every cavity, the two-photon coherent drive and two-photon loss drives the cavity towards a steady state spanned by the even and odd cat states and makes the memory robust against phase-flip errors (i.e., against flipping odd cats to even cats and vice versa, as caused by photon dephasing).

It may be provided that $|\alpha_e\rangle \sim |\alpha\rangle + |-\alpha\rangle$, $|\alpha_o\rangle \sim |\alpha\rangle - |-\alpha\rangle$, and $|\alpha\rangle$ is a coherent state with amplitude $\alpha = \text{Exp}[-i\pi/4]\, \text{Sqrt}[N]$ and $N = \lambda/\kappa_2$ photons. Coherent states are quantum states that closely resemble classical electromagnetic waves, and they exhibit well-defined amplitude and phase. The amplitude $\alpha$ determines the average number of photons $N = |\alpha|^2$ in the coherent state, which in turn, affects the separation between $|\alpha\rangle$ and $|-\alpha a\rangle$ in phase space. This separation plays a crucial role in the protection against phase-flip errors, as it makes it more difficult for noise to induce transitions between the logical states.

It may also be provided that logical phase-flip errors are suppressed as the number of photons N grows. Phase-flip errors occur when the relative phase of a qubit is flipped, and they can corrupt the stored quantum information. As the number of photons N in the coherent state increases, the separation between $|\alpha\rangle$ and $|-\alpha\rangle$ in phase space also increases, making it exponentially less likely for noise to induce phase flips $|\alpha_o\rangle \rightarrow |-\alpha_o\rangle$ and thus, improving the protection against phase-flip errors.

Further, it may be provided that logical bit-flip errors are suppressed as the lattice size M grows. Bit-flip errors occur when the state of a qubit is flipped from 0 to 1 or vice versa. The suppression of bit-flip errors (from state $|\alpha_e\rangle |\alpha_e\rangle |\alpha_e\rangle \ldots$ to state $|\alpha_o\rangle |\alpha_o\rangle |\alpha_o\rangle \ldots$ and vice versa) as the lattice size M grows is a consequence of the collective error correction provided by the Ising-like interactions and the cold bath, which together give rise to the local dissipators. As the lattice size increases, the energy barrier for creating a logical bit-flip error also increases, making it exponentially less likely for such errors to occur.

It may be provided that a product-state mean-field ansatz is defined as $$\rho = \bigotimes_{x,y=1}^{M} \rho_{x,y},$$

where each $\rho_{x,y}$ is a density matrix for a two-level system in the basis of $|\pm\alpha_{MF}\rangle$ for some mean-field coherent parameter $\alpha_{MF}$. A density matrix describes the quantum state of a system, and, in this case, each $\rho_{x,y}$ represents the state of an individual harmonic oscillator within the lattice. The mean-field approximation assumes that the state of each oscillator can be described independently, neglecting quantum correlations between neighboring oscillators. This simplification allows for the analysis of the system's behavior and the identification of phase transitions using mean-field theory. Mean-field theory shows the existence of two symmetry-breaking transitions via two order parameters: $\langle a^2 \rangle$ and $\langle Q \rangle$. Order parameters are quantities that characterize the degree of order or symmetry in a system, and their behavior can indicate the presence of phase transitions. Nonzero order parameters $\langle a^2 \rangle$ and $\langle Q \rangle$ represent that the cat states are stabilized and that the ferromagnetic phase is stabilized, respectively. The resulting mean-field phase diagram suggests that for weak single-photon loss and weak single-photon dephasing, the memory is protected against both phase and bit-flip errors.

It may be provided that a toy model comprises a single cavity coupled to a spin-½ particle described by Pauli operators X,Y,Z. Pauli operators are mathematical objects used to describe the state of a qubit, and in this toy model, the spin-½ particle represents an ancillary system coupled to the main cavity. This simplified model allows for the exploration of the effects of dephasing, single-photon loss, and bit-flip recovery processes on the quantum memory without the complexities of the full two-dimensional lattice.

It may be provided that the toy model assumes that single-photon loss is accompanied by a spin flip, while two-photon drive and dephasing are not. This assumption reflects the behavior of the full system, where single-photon loss events can induce bit flips in the harmonic oscillators. However, the toy model neglects the effects of dephasing and two-photon drive processes for simplicity.

Further, it may be provided that the toy model utilizes a bit-flip recovery jump triggered by a flipped spin state $|\uparrow\rangle$. The bit-flip recovery jump represents the process of correcting a bit-flip error in the cavity by applying an appropriate operation based on the state of the spin-½ particle. This mechanism mimics the behavior of the local dissipators in the full two-dimensional model, which correct bit-flip errors based on the parity misalignment between neighboring cavities.

It may be provided that the parity-parity interaction Hamiltonian is engineered from a coupling between high-impedance cavity modes and Josephson junctions. High-impedance cavity modes are electromagnetic resonances within a cavity that have a large impedance, meaning they resist the flow of current. This property makes them suitable for coupling to Josephson junctions, as the junctions are sensitive to changes in current. By carefully designing the circuit parameters, the interaction between the cavity modes and the Josephson junctions can be engineered to produce the desired Ising-like parity-parity interaction.

It may be provided that the photonic-Ising dissipators are realized digitally. This implies that the dissipative interactions between the harmonic oscillators and the cold bath are implemented using a sequence of discrete quantum gates and operations rather than through direct always-on physical coupling to a cold bath. This approach offers an alternative implementation of the passive error correction mechanism, potentially simplifying the experimental realization of the quantum memory.

One aspect of the present invention relates to a process for operating a passively protected memory in two dimensions. A process in this context refers to a sequence of steps or actions performed to achieve a particular outcome, which in this case, is the utilization of a passively protected memory to store and retrieve quantum information. As defined earlier, a passively protected memory refers to a system designed to store quantum information while inherently mitigating errors without the need for active error correction mechanisms. Two-dimensional signifies that the memory is arranged within a plane, as opposed to occupying three-dimensional space.

It may be provided that the process comprises encoding a quantum bit into a square lattice of quantum harmonic oscillators. Encoding refers to the mapping of quantum information onto the physical states of the harmonic oscillators within the lattice. This step involves preparing the harmonic oscillators in specific quantum states that represent the desired quantum bit to be stored. One advantage of encoding quantum information into a lattice structure is the inherent redundancy it provides, allowing for the detection and correction of errors that may occur while the quantum bit is stored in the system.

Further, each of the harmonic oscillators experiences a two-photon drive process and a two-photon loss process. While the oscillators can be phonons or photons, we use the language of photons for concreteness. As described earlier, a two-photon drive process refers to the controlled coherent addition of pairs of photons to the harmonic oscillator, while a two-photon loss process describes the simultaneous incoherent removal of two photons. This continuous drive and loss process ensures that the quantum information encoded within the harmonic oscillators is stabilized against decoherence caused by photon dephasing.

Additionally, each of the harmonic oscillators is coupled to its neighbor via a ferromagnetic Ising-like parity-parity interaction. In the superconducting implementation, the harmonic oscillators are LC oscillators coupled to their neighbors via Josephson junctions, generating the desired Ising-like parity-parity interaction in the appropriate limit. The parity-parity aspect of the interaction ensures that the energy of the system is minimized when neighboring cavities have the same parity (even or odd) of photon number. This interaction, in the presence of a cold bath, promotes the alignment of parities of neighboring oscillators and contributes to the error correction capabilities of the memory.

As indicated above, a cold bath is coupled to the harmonic oscillators such that, together with the parity-parity Hamiltonian, it produces local dissipators that align parities of neighboring cavities. The cold bath, acting as a reservoir at a low temperature, absorbs energy from the harmonic oscillators, driving them towards a low-energy, stable state. The interaction between the cold bath and the harmonic oscillators is designed such that the system preferentially loses energy in configurations with misaligned parities. This leads to the alignment of parities in neighboring cavities, effectively correcting bit-flip errors, which is essential for the performance of the quantum memory.

It may be provided that each of the harmonic oscillators experiences a coherent two-photon drive process with an amplitude $\lambda$ and a two-photon loss process with a rate $\kappa_2$. As mentioned previously, the amplitude $\lambda$ determines the strength of the drive, influencing the number of photons coherently added to the harmonic oscillators during the drive process, while the rate $\kappa_2$ governs the speed at which photons are removed from the harmonic oscillators through the incoherent loss process. This careful control of these parameters allows for the optimization of the quantum memory for coherence and error correction.

It may also be provided that the parity-parity interaction Hamiltonian between neighboring cavities on an M by M square lattice is defined as $H_S = -\sum_{\langle ij \rangle} Q_i Q_j$, where $Q_j$ is the photon parity operator at site j. The photon parity operator indicates the evenness (in which it is 1) or oddness (in which case it is $-1$) of the number of photons (excitations) in a cavity (oscillator). This specific form of the interaction Hamiltonian ensures that the energy of the system depends on the relative parity of neighboring cavities, encouraging their alignment and contributing to the passive error correction capabilities of the memory.

It may further be provided that the local dissipators ensure that the system preferentially loses energy in configurations with misaligned parities, driving the system towards a state with aligned parities and thus, correcting bit-flip errors.

It may be provided that the steady states of the model span the codespace and are defined as $|\psi\rangle = c_0 |\alpha_e\rangle |\alpha_e\rangle |\alpha_e\rangle \ldots + c_1 |\alpha_o\rangle |\alpha_o\rangle |\alpha_o\rangle \ldots$, for $|c_0|^2 + |c_1|^2 = 1$. As mentioned earlier, the codespace refers to the subspace of states that are used to encode quantum information. The states $|\alpha_e\rangle$ and $|\alpha_o\rangle$ represent even and odd cat states, respectively, which are superpositions of coherent states with opposite phases. The states $|\alpha_e\rangle |\alpha_e\rangle |\alpha_e\rangle \ldots$ and $|\alpha_o\rangle |\alpha_o\rangle |\alpha_o\rangle \ldots$ serve as the logical basis for the quantum memory, and their specific form contributes to the robustness of the memory against errors.

It may be provided that $|\alpha_e\rangle \sim |\alpha\rangle + |-\alpha\rangle$, $|\alpha_o\rangle \sim |\alpha\rangle - |-\alpha\rangle$, and $|\alpha\rangle$ is a coherent state with amplitude $\alpha = \mathrm{Exp}[-i\pi/4]\sqrt{N}$ and $N = \lambda/\kappa_2$ photons. Coherent states are quantum states that closely resemble classical electromagnetic waves, and they exhibit well-defined amplitude and phase. The amplitude $\alpha$ determines the average number of photons $N = |\alpha|^2$ in the coherent state, which in turn, affects the separation between $|\alpha\rangle$ and $|-\alpha\rangle$ in phase space. This separation plays a crucial role in the protection against phase-flip errors $|\alpha_o\rangle \rightarrow -|\alpha_o\rangle$, as it makes it more difficult for noise to induce transitions between these two states.

It may also be provided that logical phase-flip errors are suppressed as the number of photons N grows. As the number of photons N in the coherent state increases, the separation between $|\alpha\rangle$ and $|-\alpha\rangle$ in phase space also increases, making it exponentially less likely for noise to induce phase flips and thus, improving the protection against phase-flip errors.

Further, it may be provided that logical bit-flip errors are suppressed as the lattice size M grows. The suppression of bit-flip errors (from state $|\alpha_e\rangle |\alpha_e\rangle |\alpha_e\rangle \ldots$ to state $|\alpha_o\rangle |\alpha_o\rangle |\alpha_o\rangle \ldots$ and vice versa) as the lattice size M grows is a consequence of the collective error correction provided by the Ising-like interactions and the cold bath, which together give rise to the local dissipators. As the lattice size increases, the energy barrier for creating a logical bit-flip error also increases, making it exponentially less likely for such errors to occur.

It may be provided that the passively protected memory in two dimensions comprises a square lattice comprising a plurality of harmonic oscillators. Each harmonic oscillator exhibits outstanding coherence properties sufficient for maintaining quantum superpositions (and therefore stored quantum information) for extended periods. Harmonic oscillators are physical systems that exhibit periodic behavior, and in this context, they represent the individual units of the quantum memory. The square lattice arrangement provides a structured framework for implementing error correction codes by leveraging the interactions between neighboring oscillators. The passively protected quantum memory including a square lattice of the oscillators can store a robust long-lived logical qubit that has even better coherence properties than the underlying oscillators, as the passive protection autonomously corrects residual excitation-loss and dephasing errors in the oscillators.

Further, each of the plurality of harmonic oscillators experiences a coherent two-photon drive process and an incoherent two-photon loss process. A two-photon drive process refers to the coherent controlled addition of pairs of photons to the harmonic oscillator, while a two-photon loss process describes the simultaneous incoherent removal of two photons. This arrangement ensures that the quantum information encoded within the harmonic oscillators is continuously stabilized against decoherence caused by photon dephasing, contributing to the passive error correction capabilities of the memory.

In the alternative digital implementation of the memory, an ancillary cavity is coupled to each of the plurality of harmonic oscillators. The ancillary cavity serves as an auxiliary system that interacts with the main harmonic oscillators to facilitate autonomous error correction. This coupling allows for the transfer of information between the ancillary cavity and the corresponding harmonic oscillator, enabling the autonomous error correction.

Moreover, a processor is configured to perform a sequence of steps to implement the passive error correction mechanism. The processor applies a unitary operation U to the ancillary cavity, where the specific form of U depends on the state of the corresponding harmonic oscillator and its four nearest neighbor harmonic oscillators. The unitary operation U is designed to change the state of the ancillary cavity only if a local error is detected in the configuration of domain walls on the four bonds connecting the corresponding harmonic oscillator to its four nearest neighbor harmonic oscillators. Otherwise, it leaves the ancillary cavity unchanged.

Following the application of the unitary operation, the processor applies a controlled-NOT gate with the ancillary cavity as the control qubit and the corresponding harmonic oscillator as the target qubit. The controlled-NOT gate, a fundamental quantum operation, flips the state of the target qubit (the harmonic oscillator) only if the control qubit (the ancillary cavity) is in a specific state. This step allows for the transfer of error information from the ancillary cavity to the harmonic oscillator, enabling the correction of local errors within the quantum memory.

Finally, the processor resets the ancillary cavity to its initial state, preparing it for subsequent error detection and correction cycles. This resetting process ensures that the ancillary cavity is ready to interact with the harmonic oscillators in the next cycle.

It may be provided that each of the plurality of harmonic oscillators experiences a coherent two-photon drive process with an amplitude $\lambda$ and a two-photon loss process with a rate $\kappa_2$. The amplitude $\lambda$ determines the strength of the drive, influencing the number of photons coherently added to the harmonic oscillators during the drive process. The rate $\kappa_2$ governs the speed at which photons are removed from the harmonic oscillators through the incoherent loss process.

This careful control of these parameters allows for the stabilization of each harmonic oscillator to a qubit spanned by $|\alpha_o\rangle$ and $|\alpha_e\rangle$.

Furthermore, it may be provided that the unitary operation U is defined as $U=P\otimes(|\alpha_e\rangle\langle\alpha_o|+|\alpha_o\rangle\langle\alpha_e|)+P^\perp\otimes(|\alpha_o\rangle\langle\alpha_o|+|\alpha_e\rangle\langle\alpha_e|)$, where P projects on a local configuration of domain walls and $P^\perp$ is the orthogonal subspace projector. Domain walls in this context represent boundaries between regions of different parity within the lattice of harmonic oscillators. The projector P selects specific configurations of domain walls, allowing the unitary operation U to target and correct local errors within the quantum memory. The orthogonal subspace projector $P^\perp$ ensures that the unitary operation does not affect the state of the ancillary cavity when no local errors are detected.

It may also be provided that P projects onto a configuration with 3 or 4 misaligned neighboring lattice cavities. This specific configuration of domain walls corresponds to a local error within the lattice, where the parity of a harmonic oscillator is misaligned with the majority of its neighbors. By projecting onto this configuration, the unitary operation U can identify and subsequently correct these local errors, enhancing the overall robustness of the quantum memory.

Alternatively, it may be provided that P implements Toom's rule for detecting local errors. Toom's rule is a specific algorithm used in cellular automata and error correction codes to determine the state of a cell based on the states of its neighboring cells. In this context, Toom's rule can be applied to detect local errors within the lattice of harmonic oscillators by analyzing the parity of an oscillator and its two nearest neighbors at the top and to the left. By implementing Toom's rule, the unitary operation U can efficiently identify and correct local errors, contributing to the passive error correction capabilities of the memory.

It may be provided that the ancillary cavity is initialized in state $|\alpha_o\rangle$. The state $|\alpha_o\rangle$ represents an odd cat state, which is a superposition of coherent states with opposite phases. Initializing the ancillary cavity in this state ensures that it is prepared to interact with the harmonic oscillators and detect local errors within the quantum memory.

Furthermore, it may be provided that, in the context of a superconducting implementation, the processor resets the ancillary cavity by dispersively coupling the ancillary cavity to a transmon qubit. Dispersive coupling refers to a weak interaction between two quantum systems that does not directly induce transitions between their energy levels, but rather, shifts their energy levels based on their respective states. A transmon qubit is a type of superconducting qubit known for its long coherence times and its suitability for coupling to other quantum systems. By dispersively coupling the ancillary cavity to a transmon qubit, the processor can effectively extract entropy from the ancillary cavity and reset it to its initial state $|\alpha_o\rangle$, preparing it for subsequent error detection and correction cycles.

It may be provided that the processor implements the unitary operation U in parallel across all the sites of the square lattice before resetting the ancillary cavities. Parallel implementation of the unitary operation U allows for the simultaneous detection and correction of errors across the entire lattice, improving the efficiency and speed of the passive error correction process.

To achieve parallel implementation, it may be provided that the processor divides the lattice into bipartite sublattices and operates on the cavities that belong to the same sublattice in parallel. Bipartite sublattices refer to a division of the lattice into two sets of non-adjacent cavities. By operating on the cavities within each sublattice simultaneously, the processor can efficiently apply the unitary operation U across the entire lattice before resetting the ancillary cavities.

Finally, it may be provided that the processor implements the unitary operation U using bias-preserving gates. Bias-preserving gates are a specific type of quantum gate that minimizes the introduction of additional dephasing errors during the error correction process. By utilizing bias-preserving gates, the processor ensures the accuracy and fidelity of the passive error correction mechanism, contributing to the overall robustness of the quantum memory.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

(a) Overlap between the initial and final states for $\kappa_{nn}=0$ [case (i)] and $\kappa_{nn}/\kappa_2=0.3$ [case (ii)] as $N=\lambda/\kappa_2$ increases. Parameters: $\kappa_d/\kappa_2=0.1$, $\kappa_1/\kappa_2=0.1$. (b) For case (ii), i.e. $\kappa_{nn}/=0$, the log scale plot shows that the fidelity converges exponentially quickly to 1 as $N\to\infty$.

Figure 6:
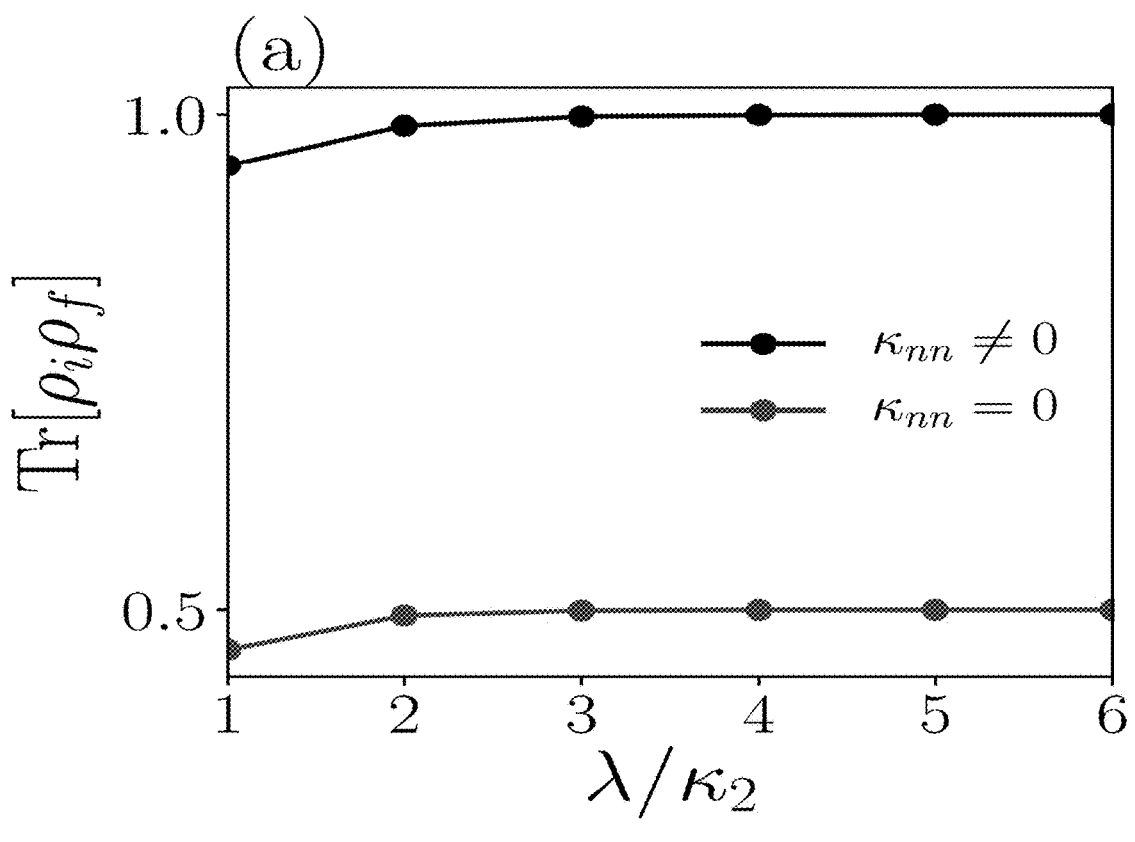
FIG. 6 shows, according to some embodiments, the case where we initialize the dynamics with state $\rho_i = |\psi\rangle\langle\psi|$, where $$|\psi\rangle = \frac{1}{\sqrt{5}}|\downarrow\rangle|\alpha_e\rangle + \frac{2e^{i\pi/4}}{\sqrt{5}}|\downarrow\rangle|\alpha_o\rangle.$$
Figure 6:
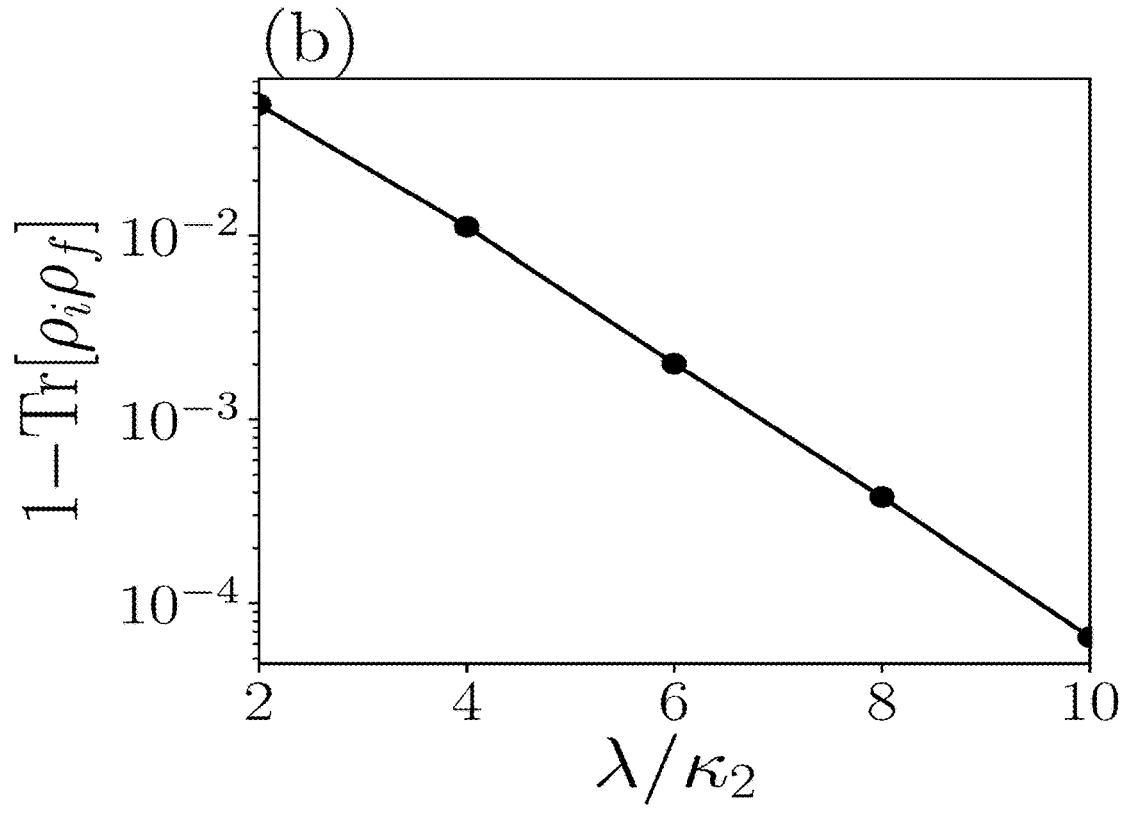
Figure 7:
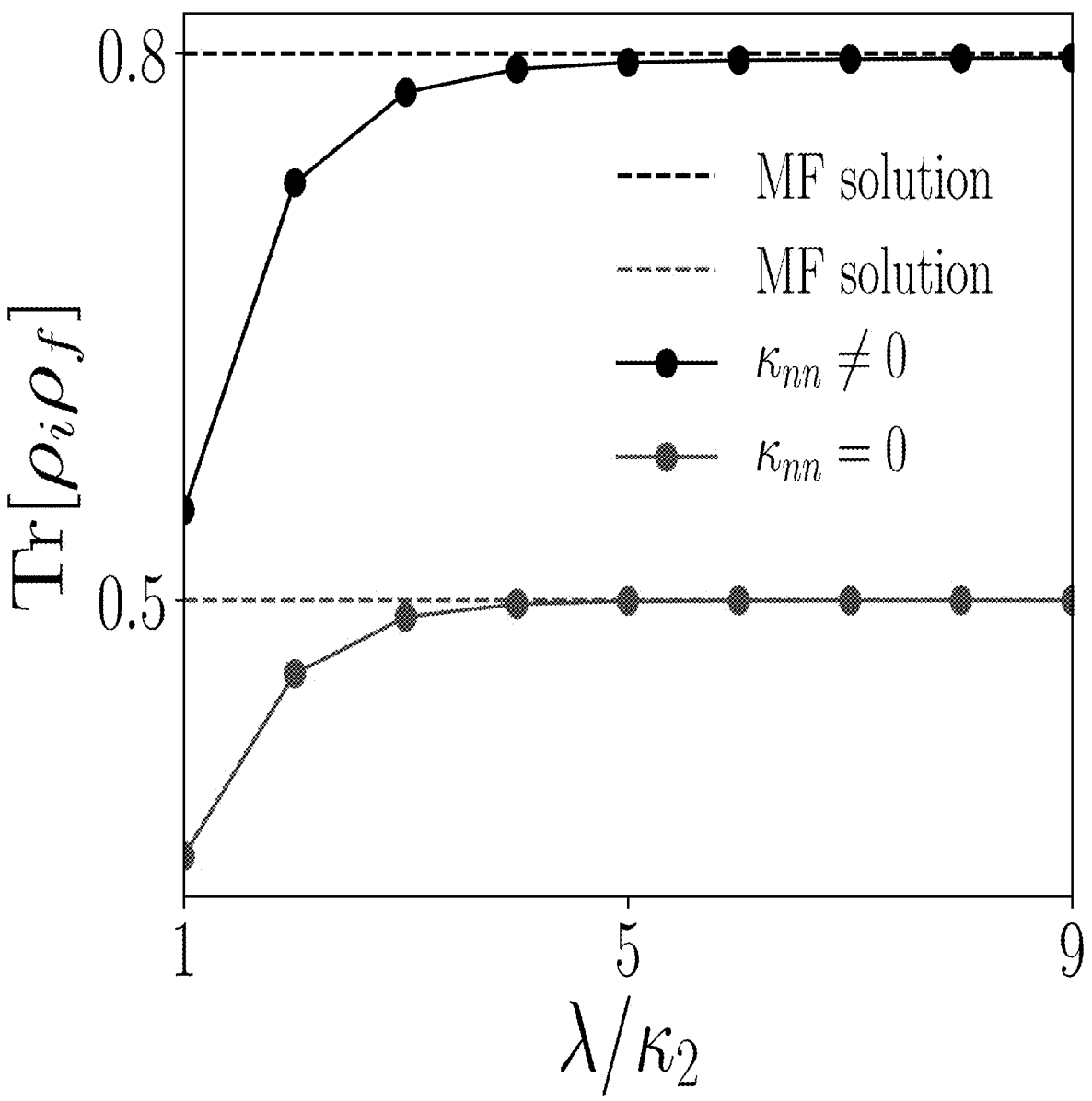

FIG. 7 shows, according to some embodiments, the repetition of the same simulation as in FIG. 6, except the recovery (noiseless) Lindblad evolution is done using $\kappa_{nn}=\kappa_d=\kappa_1=0$ in both cases (i) and (ii) [not just case (i)]. The overlap between the initial and final states is larger than $\frac{1}{2}$ when $\kappa_{nn}$ not equal to 0 during the noisy dynamics [modified case (ii)], while the overlap saturates to $\frac{1}{2}$ when $\kappa_{nn}=0$ [the original case (i)]. In the thermodynamic limit, the overlap values agree with mean-field results (shown as horizontal dashed lines).

Figure 8:
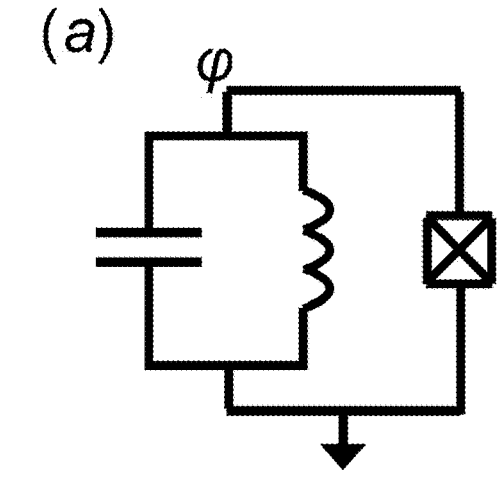
Figure 8:
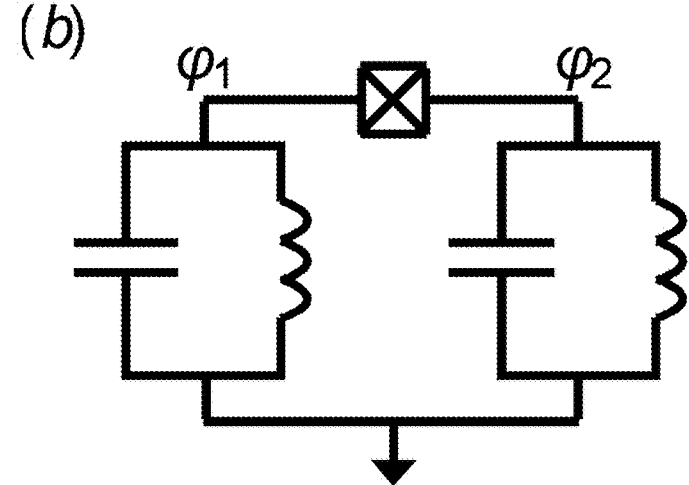
Figure 8:
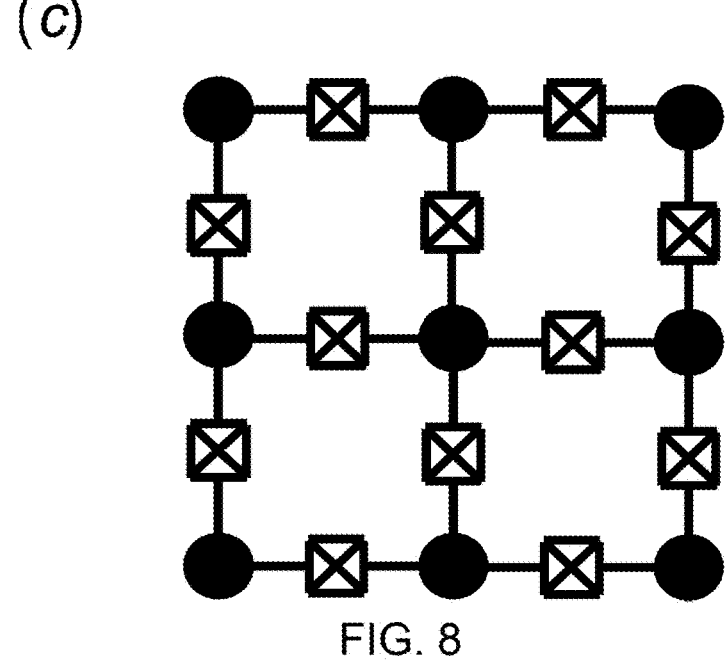

FIG. 8 shows, according to some embodiments, in subfigure (a), an LC oscillator (representing a cavity) connected to a Josephson junction. The junction generates a Hamiltonian term that is proportional to the photon parity in the cavity. In subfigure (b), the figure shows two LC oscillators connected via a Josephson junction. The junction generates an Ising-like parity-parity interaction between the oscillators in a certain parameter regime. In subfigure (c), the figure shows the schematic layout for a 2D quantum memory: Black circles represent driven-dissipative resonator cavities (or LC oscillators). Each resonator is coupled to its neighbor via a Josephson junction which generates an Ising-like interaction (in the appropriate limit).

Figure 9:
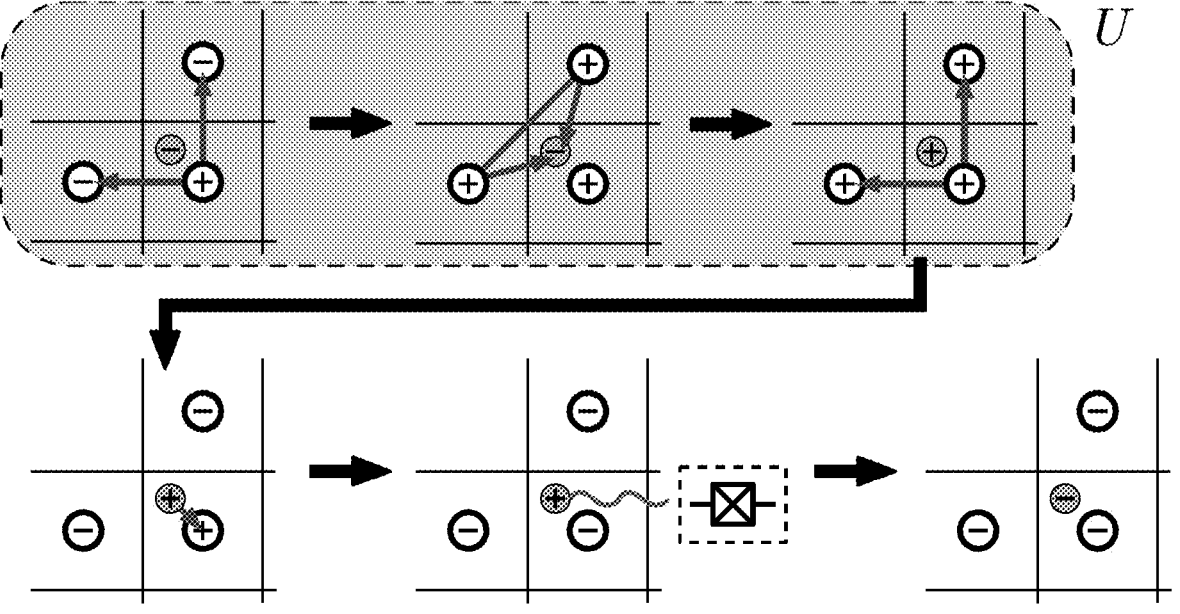

FIG. 9 shows, according to some embodiments, an illustration of the digital autonomous photonic-Ising local decoder when U is implementing Toom's rule. Purple color labels the ancillary cavity. We denote $|\alpha_o\rangle$ by (−) and $|\alpha_e\rangle$ by (+). The green arrows are CNOT gates, pointing from the control cavity to the target cavity. A connected double green arrow is a Toffoli gate. The procedure consists of the following steps: (i) two CNOTs from the central cavity to its neighbors; (ii) a Toffoli gate from the neighbors to the ancillary cavity; (iii) two CNOTs from the central cavity to its neighbors; (iv) a CNOT from the ancillary cavity to the central cavity; (v) reset the ancillary cavity via coupling to a transmon.

DETAILED DESCRIPTION

A detailed description of one or more embodiments is presented herein by way of exemplification and not limitation.

Quantum computers can be much faster than classical computers with many potential applications including in materials design and drug discovery. The main challenge to implementing large powerful quantum computers is that undesired interaction with the environment and imperfect control of qubits (quantum bits) lead to errors. If left uncorrected, these errors accumulate and destroy the computation. The solution is quantum error correction. Like classical error correction, quantum error correction works by redundantly encoding the information. In what's called active error correct, one then keeps checking for errors, and if errors are found, one corrects them. An alternative scheme is to embed your encoded quantum bit (quantum memory) in a bath that passively corrects the errors, so that one doesn't have to constantly measure and correct. It has been known how to construct such a passively protected quantum memory in 4 or more (spatial) dimensions (such as e.g. the four-dimensional toric code), which is physically unrealistic since we live in 3 dimensions. Disclosed is an invention of a new type of passive quantum memory that works in two dimensions: A square lattice composed of photonic "cat qubits" coupled via dissipative terms which tend to fix errors locally.

One needs to protect quantum bits against two types of error: bit flips and phase flips. It has been known that a single harmonic oscillator in the presence of appropriate driving can protect against one type of error with the help of a carefully designed driven-dissipative photon environment. The disclosed invention, in contrast, protects against both types of error.

It has been known how one can use active error correction to achieve a similar effect. Active error correction, however, requires constantly checking for errors and constantly correcting errors. On the other hand, the disclosed invention accomplishes passive error correction where the bath keeps the quantum information protected in the presence of errors. While a driven-dissipative photonic environment protect against one type of error, Ising-like dissipators protect against the other type of error.

Conventional approaches to quantum error correction often rely on active error correction mechanisms, which necessitate continuous monitoring of the system for errors and subsequent corrective actions. This constant measurement and correction process introduces significant complexity and overhead, limiting the scalability and efficiency of quantum computations. Additionally, existing proposals for passively protected quantum memories often require operation in four or more spatial dimensions, rendering them impractical for real-world implementation within the constraints of our three-dimensional physical world.

The passively protected memory in two dimensions overcomes these limitations of conventional technology. It provides a robust and efficient solution for protecting quantum information without the need for active error correction mechanisms, and it operates within a physically realistic two-dimensional architecture.

It has been discovered that a passively protected memory in two dimensions can be achieved by utilizing a square lattice of quantum harmonic oscillators with specific properties and interactions. These harmonic oscillators, possessing small non-linearities and outstanding coherence properties, serve as effective medium for storing quantum information. Each harmonic oscillator is subjected to a coherent two-photon drive process and a two-photon loss process, ensuring the continuous stabilization of the encoded quantum states against decoherence. Furthermore, in the superconducting implementation, each harmonic oscillator is an LC oscillator coupled to its neighbors via Josephson junctions, generating an Ising-like parity-parity interaction that promotes the alignment of neighboring qubits and contributes to the passive error correction capabilities of the memory. This two-dimensional lattice of interacting harmonic oscillators is then coupled to a cold bath, enabling the dissipation of energy and the correction of local errors through interactions with the bath. This arrangement allows for the passive protection of quantum information against both bit-flip and phase-flip errors, ensuring the long-term stability and integrity of the quantum memory.

One advantage of this passively protected memory in two dimensions is its ability to suppress logical errors, such as bit flips and phase flips, as the system size increases. As the number of photons within the harmonic oscillators grows, the protection against phase-flip errors is enhanced due to the increased separation between the logical states in phase space. Similarly, as the lattice size expands, the energy barrier for creating a logical bit-flip error also grows, leading to an exponential suppression of bit-flip errors. This scalability ensures that the passively protected memory can maintain its robustness and reliability even as the size of the quantum system increases.

Consider an M×M square lattice of harmonic oscillators. Harmonic oscillators can be photonic or phononic modes, but for concreteness we will often refer to them as photonic cavities. Harmonic oscillators with small non-linearities and outstanding coherence properties can be found in a variety of photonic and phononic systems, including superconducting cavities and vibrational modes of trapped ions.

It is proposed that each cavity undergoes a two-photon drive process and a two-photon loss process shown in Eq. (8) and repeated here:

$$H_{x,y} = \lambda\left(a_{x,y}^2 + \left(a_{x,y}^\dagger\right)^2\right),\ L_{2,x,y} = \sqrt{\kappa_2}\ a_{x,y}^2,$$

where $a_{x,y}$ is the annihilation operator on site (x,y). $H_{x,y}$ is Hamiltonian that coherently adds or removes photons on site (x,y) in pairs with amplitude. $\lambda$, $L_{2,x,y}$ is a Lindblad jump operator that incoherently removes two photons from the mode on site (x,y) with rate $\kappa_2$. It is well-known how to engineer such processes for superconducting cavities, and they have indeed been experimentally demonstrated. It is also proposed that a parity-parity interaction Hamiltonian between neighboring cavities is engineered: $H_S = -\sum_{\langle ij\rangle} Q_i Q_j$, where $$Q_j = e^{i\pi a_j^\dagger a_j}$$

is the photon parity operator at site j. $Q_j$ is equal to 1 when the number of photons on site j is even, and it is equal to $-1$ when the number of photons on site j is odd. One can engineer such parity-parity interaction between superconducting cavities. It is proposed that the system is coupled to a cold bath. Such interaction will tend to align the parities of neighboring cavities via the local dissipators shown in Eq. (9) and repeated here:

$$L_{x,y}^{(4)} = \sqrt{\tilde\kappa_{nn}}\ a_{x,y} P_{x,y;\to}^- P_{x,y;\uparrow}^- P_{x-1,y;\to}^- P_{x,y-1;\uparrow}^-$$
$$L_{x,y}^{(3)} = \sqrt{\tilde\kappa_{nn}}\ a_{x,y} P_{x,y;\to}^+ P_{x,y;\uparrow}^- P_{x-1,y;\to}^- P_{x,y-1;\uparrow}^-,$$

where $a_{x,y}$ is the annihilation operator for the cavity at site $$x,\ y,\ \tilde\kappa_{mn} = \sqrt{\kappa_1\kappa_{mn} + \kappa_1^2} - \kappa_1,$$

$\kappa_1$ is the single-photon loss rate (corresponding to the dissipator:

$$L_{1,x,y} = \sqrt{\kappa_1 a_{x,y}}),\ P_{x,y\in\to}^\pm = (1 \pm Q_{x,y}Q_{x+1,y})/2,$$
$$P_{xy;\uparrow}^\pm = (1 \pm Q_{x,y}Q_{x,y+1})/2\ \text{and}\ Q_{x,y} = e^{i\pi a_{x,y}^\dagger a_{m,y}}.$$

The following states are the steady states of the model in the absence of errors ($\kappa_1 = 0$) and span the codespace:

$$|\psi\rangle = c_0|\alpha_e\rangle|\alpha_e\rangle|\alpha_e\rangle\ ... + c_1|\alpha_o\rangle|\alpha_o\rangle|\alpha_o\rangle\ ...,\qquad(10)$$

for $|c_0|^2 + |c_1|^2 = 1$. Here $|\alpha_e\rangle \sim |\alpha\rangle + |-\alpha\rangle$, $|\alpha_o\rangle \sim |\alpha\rangle - |-\alpha\rangle$, and $|\alpha\rangle$ is a coherent state with amplitude $\alpha = \text{Exp}[-i\pi/4]$ Sqrt[N] and $N = \lambda/\kappa_2$ photons.

As an alternative to analogue implementation just described, a digital autonomous quantum memory is also disclosed. Instead of realizing the dissipators in Eq. (9) by a combination of the parity-parity Hamiltonian and a cold bath, it is proposed that they can be realized digitally. It is proposed that, over each cavity in our M×M lattice of cavities, there is an additional ancillary cavity initialized in state $|\alpha_o\rangle$. For every site in the lattice, we repeat the following as fast as possible. First, for a given site, the following uncoding unitary U is applied. Depending on the state of the chosen lattice cavity and its four neighbors, U changes the state of the ancillary cavity via Eq. (S48), which we repeat here:

$$U = P \otimes (|\alpha_e\rangle\langle\alpha_o| + |\alpha_o\rangle\langle\alpha_e|) + P^\perp \otimes (|\alpha_o\rangle\langle\alpha_o| + |\alpha_e\rangle\langle\alpha_e|),$$

where P projects on a local configuration of domain walls (a specific example was considered in Eq. (9) reproduced above, where we project onto a configuration with 3 or 4 misaligned neighboring lattice cavities, but other recipes are also possible, such as, for example, the Toom's rule) and $P^\perp$ is the orthogonal subspace projector. We define the unitary U such that it changes the ancillary cavity from $|\alpha_o\rangle$ to $|\alpha_e\rangle$ if a local error is detected; it does nothing otherwise. Note that U can be implemented using the fundamental set of bias-preserving gates, where the two-photon drive and two-photon loss can be kept on thus suppressing the dephasing errors during the gate implementation.

Second, we apply a CNOT gate that is controlled by the ancillary cavity and targets the corresponding lattice cavity. (We use the convention that $|\alpha_o\rangle$ is $|0\rangle$ and $|\alpha_e\rangle$ is $|1\rangle$).

Third, we use a strong dispersive coupling to a transmon to extract the entropy from the ancillary cavity and reset it back to the initial state $|\alpha_o\rangle$. Due to the fault-tolerance of the cavity-cavity gates, the phase errors stay suppressed when the Ising-type local decoder is implemented autonomously.

The full procedure is achieved by implementing the encoding and the reset across the entire lattice. To extend the single-site procedure to the entire lattice, we note that the encoding operations U on each site are local around each lattice cavity and they commute across different lattice sites. Therefore, the encoding U can be implemented in parallel across all the sites before a final reset, e.g. by dividing the lattice into bipartite sublattices and operating on the cavities that belong to the same sublattice in parallel.

In an embodiment, a passively protected quantum memory in two dimensions includes: a square lattice comprising a plurality of quantum harmonic oscillators, each harmonic oscillator exhibiting excellent coherence properties; each of the plurality of harmonic oscillators experiencing a coherent two-photon drive process and a two-photon loss process; each of the plurality of harmonic oscillators coupled to its nearest neighbor harmonic oscillator via an Ising parity-parity interaction, which, in the superconducting implementation can be realized by a Josephson junction; and a cold bath coupled to the plurality of harmonic oscillators at a temperature such that parities of neighboring harmonic oscillators align through an energy dissipation process that comprises a local dissipator. In an embodiment, each of the harmonic oscillators experiences a two-photon drive process with an amplitude/and a two-photon loss process with a rate $\kappa_2$. In an embodiment, the parity-parity interaction Hamiltonian between neighboring cavities is defined as $H_S = -\sum_{\langle ij \rangle} Q_i Q_j$, wherein $Q_j$ is the photon parity operator at site j. In an embodiment, the local dissipators are defined as $$L_{x,y}^{(4)} = \sqrt{\kappa_{nn}}\, a_{x,y} P_{x,y;\rightarrow}^- P_{x,y;\uparrow}^- P_{x-1,y;\rightarrow}^- P_{x,y-1;\uparrow}^-,$$

$$L_{x,y}^{(3)} = \sqrt{\kappa_{nn}}\, a_{x,y} P_{x,y;\rightarrow}^+ P_{x,y;\uparrow}^- P_{x-1,y;\rightarrow}^- P_{x,y-1;\uparrow}^-,$$

wherein $a_{x,y}$ is the annihilation operator for the cavity at site $$x,\, y,\, \tilde{\kappa}_{nn} = \sqrt{\kappa_1 \kappa_{nn} + \kappa_1^2} - \kappa_1,$$

$\kappa_1$ is the single-photon loss rate corresponding to the local dissipator $$L_{1,x,y} = \sqrt{\kappa_1}\, a_{x,y},\ P_{x,y;\rightarrow}^{\pm} (1 \pm Q_{x,y} Q_{x+1,y})/2,$$

$$P_{x,y;\uparrow}^{\pm} = (1 \pm Q_{x,y} Q_{x,y+1})/2,\ \text{and } Q_{x,y} = e^{i\pi a_{x,y}^{\dagger} a_{x,y}}.$$

In an embodiment, steady states of the parity-parity interaction Hamiltonian span the codespace and are defined as $|\psi\rangle = c_0 |\alpha_e\rangle |\alpha_e\rangle |\alpha_e\rangle \ldots + c_1 |\alpha_o\rangle |\alpha_o\rangle |\alpha_o\rangle \ldots$ for $|c_0|^2 + |c_1|^2 = 1$. In an embodiment, $|\alpha_e\rangle \sim |\alpha\rangle + |-\alpha\rangle$, $|\alpha_o\rangle \sim |\alpha\rangle - |-\alpha\rangle$, and $|\alpha\rangle$ is a coherent state with amplitude $\alpha = \text{Exp}[-i\pi/4]\, \text{Sqrt}[N]$ and $N = \lambda/\kappa_2$ photons. In an embodiment, logical phase-flip errors are suppressed as the number of photons N grows. In an embodiment, logical bit-flip errors are suppressed as the lattice size M grows. In an embodiment, a product-state mean-field ansatz is defined as $$\rho = \bigotimes_{x,y=1}^{M} \rho_{x,y},$$

where each $\rho_{x,y}$ is a density matrix for a two-level system in the basis of $$|\pm \alpha_{MF}\rangle$$

for some mean-field coherent parameter $\alpha_{MF}$. In an embodiment, a toy model is provided, the toy model comprising: a single cavity coupled to a spin-½ particle described by Pauli operators X,Y,Z. In an embodiment, the toy model assumes that single-photon loss is accompanied by a spin flip, while two-photon drive and dephasing are not. In an embodiment, the toy model utilizes a bit-flip recovery jump triggered by a flipped spin state $|\uparrow\rangle$. In an embodiment, the toy model shows the existence of two symmetry-breaking transitions via two order parameters: $\langle a^2 \rangle$ and $\langle Q \rangle$. In an embodiment, the parity-parity interaction Hamiltonian is engineered from a coupling between high-impedance cavity modes and Josephson junctions. In an embodiment, the photonic-Ising dissipators are realized digitally.

The square lattice of harmonic oscillators forms the fundamental structure of the passively protected memory. Each harmonic oscillator, characterized by small non-linearities and outstanding coherence properties, acts as a qubit capable of storing quantum information. These oscillators can be implemented using various physical systems, such as superconducting cavities or trapped ions, which exhibit the desired harmonic behavior and coherence properties. The lattice arrangement provides a framework for implementing error correction codes by exploiting the interactions between neighboring qubits.

The two-photon drive process and the two-photon loss process play a crucial role in stabilizing the quantum states stored within the harmonic oscillators. The two-photon drive process involves the coherent addition of pairs of photons to the oscillators, effectively counteracting the decoherence caused by single-photon loss events. The two-photon loss process ensures that the system remains within the desired subspace of states by removing excess photons. These processes can be implemented using carefully designed electromagnetic fields that interact with the harmonic oscillators, driving transitions between specific energy levels. The combined effect of these processes is the suppression of phase-flip errors and the maintenance of the integrity of the stored quantum information.

The Josephson junctions, responsible for coupling neighboring harmonic oscillators in the case of a superconducting implementation, generate an Ising-like parity-parity interaction. The Josephson junctions, implemented using superconducting circuits, facilitate the flow of superconducting current between neighboring cavities. This current flow depends on the relative phase of the superconducting wave-functions in each cavity, and by carefully designing the circuit parameters, this interaction can be engineered to produce the desired Ising-like parity-parity coupling. This interaction, which depends on the parity (even or odd) of the photon number within each cavity, promotes the alignment of neighboring qubits and contributes to the collective error correction capabilities of the memory.

The cold bath, coupled to the harmonic oscillators, provides a mechanism for dissipating energy and correcting local errors. The cold bath can be implemented using a physical reservoir at a low temperature, such as a cryogenic system. The interaction between the cold bath and the harmonic oscillators is designed such that the system preferentially loses energy in configurations with misaligned parities, driving the system towards a state with aligned parities and thus, correcting bit-flip errors. This local dissipation process ensures that any errors introduced into the quantum memory are effectively corrected by the interactions with the cold bath, further enhancing the robustness of the memory.

The specific implementation of each element in the passively protected memory in two dimensions contributes to its overall functionality and advantages. The square lattice structure (along with the parity-parity interaction and the cold bath) provides a framework for correcting bit-flip errors caused by photon loss, while the harmonic oscillators (along with the two-photon drive and two-photon loss) enable the correction of phase-flip errors caused by photon dephasing. The combined effect of these elements is a passively protected quantum memory in two dimensions that exhibits exceptional robustness and scalability, paving the way for advancements in quantum computing technologies.

The two-photon drive process, characterized by an amplitude $\lambda$, governs the strength with which pairs of photons are added to the harmonic oscillators. This amplitude influences the average number of photons present in the system and consequently, affects the separation between the $|\alpha\rangle$ and $|-\alpha\rangle$ in phase space. The two-photon loss process, occurring at a rate $\kappa_2$, controls the removal of photons from the harmonic oscillators. By carefully balancing the drive and loss processes, the quantum memory can be maintained within the desired subspace of states while simultaneously suppressing phase-flip errors caused by photon dephasing events.

The parity-parity interaction Hamiltonian $H_S=-\sum_{\langle ij\rangle} Q_i Q_j$, where $Q_j$ represents the photon parity operator at site j, plays a critical role in promoting error correction. The photon parity operator indicates whether the number of photons in a cavity is even or odd. This specific form of the Hamiltonian ensures that the energy of the system depends on the relative parity of neighboring cavities, encouraging their alignment and creating a collective error-correcting code. By minimizing the energy of the system, thanks to the cold bath, this interaction effectively suppresses bit-flip errors caused by photon loss and enhances the overall robustness of the quantum memory.

The parity-parity Hamiltonian and the cold bath give rise to local dissipators, which in turn enable passive error correction of bit-flip errors caused by photon loss. These dissipators act on specific configurations of neighboring cavities based on the number of domain walls, which represent boundaries between regions of different parity. The annihilation and creation operators, $a_{x,y}$ and $$a^\dagger_{x,y}$$

respectively, remove or add photons to the cavities, while the dissipative rates $\kappa_{nn}$ determine the strength of the dissipation process. By preferentially dissipating energy in configurations with misaligned parities, the local dissipators drive the system towards a state with aligned parities, effectively correcting bit-flip errors and enhancing the stability of the quantum memory.

The steady states of the model, spanning the codespace and defined as $|\psi\rangle = c_0|\alpha_e\rangle|\alpha_e\rangle|\alpha_e\rangle \ldots + c_1|\alpha_o\rangle|\alpha_o\rangle|\alpha_o\rangle \ldots$, for $|c_0|^2 + |c_1|^2 = 1$, serve as the logical basis for the quantum memory. The even and odd cat states, $|\alpha_e\rangle$ and $|\alpha_o\rangle$ respectively, are superpositions of coherent states with opposite phases, and they provide a robust encoding for quantum information. The specific form of these states, along with the interactions and dissipative processes within the system, contribute to the protection against both bit-flip and phase-flip errors.

The definition of the even and odd cat states, $|\alpha_e\rangle \sim |\alpha\rangle + |-\alpha\rangle$ and $|\alpha_o\rangle \sim |\alpha\rangle - |-\alpha\rangle$, where $|\alpha\rangle$ is a coherent state with amplitude $\alpha = \mathrm{Exp}[-i\pi/4]\sqrt{N}$ and $N = \lambda/\kappa_2$ photons, highlights the importance of the coherent state amplitude $\alpha$. This amplitude determines the average number of photons $N = |\alpha|^2$ in the coherent state and consequently, affects the separation between $|\alpha\rangle$ and $|-\alpha\rangle$ in phase space. As the amplitude increases, the separation between these states also increases, making it exponentially less likely for noise to induce transitions between them and thus, providing enhanced protection against phase-flip errors.

The suppression of logical phase-flip errors as the number of photons N grows is a direct consequence of the increased separation between $|\alpha\rangle$ and $|-\alpha\rangle$ in phase space. This separation makes it increasingly difficult for noise to induce transitions between these states, effectively protecting the stored quantum information from phase-flip errors $|\alpha_o\rangle \rightarrow -|\alpha_o\rangle$.

The suppression of logical bit-flip errors as the lattice size M grows is a result of the collective error correction provided by the Ising-like interactions and the local dissipators. As the lattice size increases, the energy barrier for creating a logical bit-flip error also increases, making it exponentially less likely for such errors to occur. This scalability ensures that the quantum memory gains in robustness as the size of the quantum system increases.

The product-state mean-field ansatz, defined as $$\rho = \bigotimes_{x,y=1}^{M} \rho_{x,y},$$

where each $\rho_{x,y}$ is a density matrix for a two-level system in the basis of $|\pm\alpha_{MF}\rangle$ for some mean-field coherent parameter $\alpha_{MF}$, provides a simplified framework for analyzing the behavior of the quantum memory. This approximation, which assumes that the state of each oscillator can be described independently, allows for the application of mean-field theory to study the system's properties and to identify phase transitions. Nonzero order parameters $\langle a^2\rangle$ and $\langle Q\rangle$ represent that the cat states are stabilized and that the ferromagnetic phase is stabilized, respectively. The resulting mean-field phase diagram suggests that for weak single-photon loss and weak single-photon dephasing, the memory is protected against both phase and bit-flip errors.

The toy model, comprising a single cavity coupled to a spin-½ particle described by Pauli operators X,Y,Z, serves as a simplified representation of the full two-dimensional system. This model allows for the exploration of the effects of single-photon loss and bit-flip recovery processes without the complexities of the full lattice.

The assumption that single-photon loss is accompanied by a spin flip reflects the behavior of the full system, where single-photon loss events can induce bit flips in the harmonic oscillators. However, the toy model neglects the effects of dephasing and two-photon drive processes for simplicity.

The bit-flip recovery jump in the toy model represents the process of correcting a bit-flip error in the cavity based on the state of the spin-½ particle. This mechanism mimics the behavior of the local dissipators in the full two-dimensional model, which correct bit-flip errors based on the parity misalignment between neighboring cavities.

In the case of the superconducting implementation, parity-parity interaction Hamiltonian can be engineered from a coupling between high-impedance cavity modes and Josephson junctions. High-impedance cavity modes are electromagnetic resonances within a cavity that have a large impedance, meaning they resist the flow of current. This property makes them suitable for coupling to Josephson junctions, as the junctions are sensitive to changes in current. By carefully designing the circuit parameters, the interaction between the cavity modes and the Josephson junctions can be engineered to produce the desired Ising-like parity-parity interaction, contributing to the passive error correction capabilities of the memory.

The alternative implementation of the photonic-Ising dissipators using digital techniques offers a potentially simpler approach to realizing the passive error correction mechanism. This involves implementing the dissipative interactions between the harmonic oscillators and the cold bath using a sequence of discrete quantum gates and operations, rather than relying on direct always-on physical coupling to a cold bath. This approach could simplify the experimental realization of the quantum memory and facilitate its integration into larger quantum computing systems.

The specific implementation of each element in the process for operating a passively protected memory in two dimensions contributes to its overall functionality and effectiveness. The encoding of quantum information into a square lattice of harmonic oscillators provides redundancy and facilitates error correction. The two-photon drive and loss processes stabilize the quantum states and suppress phase-flip errors caused by photon dephasing. The Josephson junctions generate an Ising-like parity-parity interaction that, with the help of the cold bath, promotes parity alignment and corrects, through local dissipators, bit-flip errors caused by photon loss. The optional implementation of the photonic-Ising dissipators using digital techniques offers an alternative approach to realizing the passive error correction mechanism. These elements work together to create a robust and scalable quantum memory that operates efficiently in two dimensions, advancing the field of quantum computing.

The encoding of a quantum bit into the square lattice of harmonic oscillators involves the mapping of the quantum information onto the physical states of the oscillators. This can be achieved by preparing the harmonic oscillators in specific superpositions of coherent states, such as even and odd cat states, which represent the logical basis for the quantum memory. The lattice structure provides inherent redundancy, allowing for the detection and correction of bit-flip errors that may occur the operation of the quantum information.

Each harmonic oscillator within the lattice is subjected to a two-photon drive process and a two-photon loss process. The two-photon drive process, involving the controlled coherent addition of pairs of photons to the oscillators, counteracts decoherence caused by single-photon loss events. The two-photon loss process ensures that the system remains within the desired subspace of states by removing excess photons. These processes can be implemented using carefully designed electromagnetic fields that interact with the harmonic oscillators, driving transitions between specific energy levels. The combined effect of these processes is the suppression of phase-flip errors and the maintenance of the integrity of the stored quantum information.

In the superconducting implementation, the coupling of each harmonic oscillator to its neighbors via Josephson junctions generates an Ising-like parity-parity interaction. Josephson junctions, implemented using superconducting circuits, facilitate the flow of superconducting current between neighboring cavities. This current flow depends on the relative phase of the superconducting wavefunctions in each cavity, and by carefully designing the circuit parameters, this interaction can be engineered to produce the desired Ising-like parity-parity coupling. With the help of the cold bath, this interaction, which depends on the parity (even or odd) of the photon number within each cavity, promotes the alignment of neighboring qubits and contributes to the collective error correction capabilities of the memory. As a result, the system exhibits robustness against bit-flip errors and maintains the integrity of the stored quantum information.

The coupling of a cold bath to the harmonic oscillators enables the dissipation of energy and the correction of local errors. The cold bath, acting as a reservoir at a low temperature, absorbs energy from the harmonic oscillators, driving them towards a low-energy, stable state. The interaction between the cold bath and the harmonic oscillators is designed such that the system preferentially loses energy in configurations with misaligned parities. This leads to the alignment of parities in neighboring cavities, effectively correcting bit-flip errors and enhancing the robustness of the quantum memory. This passive error correction mechanism, driven by the interaction with the cold bath, ensures the long-term stability and integrity of the quantum information stored within the memory.

The specific implementation of each element in the process for operating a passively protected memory in two dimensions contributes to its overall functionality and effectiveness. The encoding of quantum information into a square lattice of harmonic oscillators provides redundancy and facilitates error correction. The two-photon drive and loss processes stabilize the quantum states and suppress phase-flip errors caused by photon dephasing. The Josephson junctions generate an Ising-like parity-parity interaction that, with the help of the cold bath, promotes parity alignment and corrects, through local dissipators, bit-flip errors caused by photon loss. These elements work together to create a robust and scalable quantum memory that operates efficiently in two dimensions, advancing the field of quantum computing.

The two-photon drive process, characterized by an amplitude 1, governs the strength with which pairs of photons are added to the harmonic oscillators. This amplitude influences the average number of photons present in the system and consequently, affects the separation between $|\alpha\rangle$ and $|-\alpha\rangle$ in phase space. The two-photon loss process, occurring at a rate $\kappa_2$, controls the removal of photons from the harmonic oscillators. By carefully balancing the drive and loss processes, the quantum memory can be maintained within the desired subspace of states while simultaneously suppressing phase-flip errors caused by single-photon loss events.

The parity-parity interaction Hamiltonian $H_S = -\sum_{\langle ij \rangle} Q_i Q_j$, where $Q_j$ represents the photon parity operator at site j, plays a critical role in promoting error correction. The photon parity operator indicates whether the number of photons in a cavity is even or odd. This specific form of the Hamiltonian ensures that the energy of the system depends on the relative parity of neighboring cavities, encouraging, together with the cold bath, their alignment and creating a collective error-correcting code. By minimizing the energy of the system, this interaction effectively suppresses bit-flip errors and enhances the overall robustness of the quantum memory.

The local dissipators, generated by the combination of the parity-parity Hamiltonian and the cold bath, contribute to the passive error correction mechanism. These dissipators act on specific configurations of neighboring cavities based on the number of domain walls, which represent boundaries between regions of different parity. The annihilation and creation operators, $a_{x,y}$ and $$a^{\dagger}_{x,y}$$

respectively, remove or add photons to the cavities, while the dissipative rates $\tilde{\kappa}_{nn}$ determine the strength of the dissipation process. By preferentially dissipating energy in configurations with misaligned parities, the local dissipators drive the system towards a state with aligned parities, effectively correcting bit-flip errors and enhancing the stability of the quantum memory.

The steady states of the model, spanning the codespace and defined as $|\psi\rangle = c_0 |\alpha_e\rangle |\alpha_e\rangle |\alpha_e\rangle \ldots + c_1 |\alpha_o\rangle |\alpha_o\rangle |\alpha_o\rangle \ldots$, for $|c_0|^2 + |c_1|^2 = 1$, serve as the logical basis for the quantum memory. The even and odd cat states, $|\alpha_e\rangle$ and $|\alpha_o\rangle$ respectively, are superpositions of coherent states with opposite phases, and they provide a robust encoding for quantum information. The specific form of these states, along with the interactions and dissipative processes within the system, contribute to the protection against both bit-flip and phase-flip errors.

The definition of the even and odd cat states, $|\alpha_e\rangle \sim |\alpha\rangle + |-\alpha\rangle$ and $|\alpha_o\rangle \sim |\alpha\rangle - |-\alpha\rangle$, where $|\alpha\rangle$ is a coherent state with amplitude $\alpha = \mathrm{Exp}[-i\pi/4]\,\mathrm{Sqrt}[N]$ and $N = \lambda/\kappa_2$ photons, highlights the importance of the coherent state amplitude $\alpha$. This amplitude determines the average number of photons $N = |\alpha|^2$ in the coherent state and consequently, affects the separation between $|\alpha\rangle$ and $|-\alpha\rangle$ in phase space. As the amplitude increases, the separation between these states also increases, making it exponentially less likely for noise to induce transitions between them and thus providing enhanced protection against phase-flip errors.

The suppression of logical phase-flip errors as the number of photons N grows is a direct consequence of the increased separation between $|\alpha\rangle$ and $|-\alpha\rangle$ in phase space. This separation makes it increasingly difficult for noise to induce transitions between these states, effectively protecting the stored quantum information from phase-flip errors $|\alpha_o\rangle \rightarrow -|\alpha_o\rangle$.

The suppression of logical bit-flip errors as the lattice size M grows is a result of the collective error correction provided by the Ising-like interactions, the cold bath, and the resulting local dissipators. As the lattice size increases, the energy barrier for creating a logical bit-flip error also increases, making it exponentially less likely for such errors to occur. This scalability ensures that the quantum memory performs better and better as the size of the quantum system increases.

The product-state mean-field ansatz, defined as $$\rho = \bigotimes_{x,y=1}^{M} \rho_{x,y},$$

where each $\rho_{x,y}$ is a density matrix for a two-level system in the basis of $|\pm\alpha_{MF}\rangle$ for some mean-field coherent parameter $\alpha_{MF}$, provides a simplified framework for analyzing the behavior of the quantum memory. This approximation, which assumes that the state of each oscillator can be described independently, allows for the application of mean-field theory to study the system's properties and to identify phase transitions. Nonzero order parameters $\langle a^2 \rangle$ and $\langle Q \rangle$ represent that the cat states are stabilized and that the ferromagnetic phase is stabilized, respectively. The resulting mean-field phase diagram suggests that for weak single-photon loss and weak single-photon dephasing, the memory is protected against both phase and bit-flip errors.

The toy model, comprising a single cavity coupled to a spin-½ particle described by Pauli operators X,Y,Z, serves as a simplified representation of the full two-dimensional system. This model allows for the exploration of the effects of single-photon loss and bit-flip recovery processes without the complexities of the full lattice.

The assumption that single-photon loss is accompanied by a spin flip reflects the behavior of the full system, where single-photon loss events can induce bit flips in the harmonic oscillators. However, the toy model neglects the effects of dephasing and two-photon drive processes for simplicity.

The bit-flip recovery jump in the toy model represents the process of correcting a bit-flip error in the cavity based on the state of the spin-½ particle. This mechanism mimics the behavior of the local dissipators in the full two-dimensional model, which correct bit-flip errors based on the parity misalignment between neighboring cavities.

In the superconducting implementation, the parity-parity interaction Hamiltonian can be engineered from a coupling between high-impedance cavity modes and Josephson junctions. High-impedance cavity modes are electromagnetic resonances within a cavity that have a large impedance, meaning they resist the flow of current. This property makes them suitable for coupling to Josephson junctions, as the junctions are sensitive to changes in current. By carefully designing the circuit parameters, the interaction between the cavity modes and the Josephson junctions can be engineered to produce the desired Ising-like parity-parity interaction, contributing to the passive error correction capabilities of the memory.

The alternative implementation of the photonic-Ising dissipators using digital techniques offers a potentially simpler approach to realizing the passive error correction mechanism. This involves implementing the dissipative interactions between the harmonic oscillators and the cold bath using a sequence of discrete quantum gates and operations, rather than relying on direct always-on physical coupling to a cold bath. This approach could simplify the experimental realization of the quantum memory and facilitate its integration into larger quantum computing systems.

The specific implementation of each element in the process for operating a passively protected memory in two dimensions contributes to its overall functionality and effectiveness. The encoding of quantum information into a square lattice of harmonic oscillators provides redundancy and facilitates error correction. The two-photon drive and loss processes stabilize the quantum states and suppress phase-flip errors caused by photon dephasing. The Josephson junctions generate an Ising-like parity-parity interaction that, with the help of the cold bath, promotes parity alignment and corrects, through local dissipators, bit-flip errors caused by photon loss. The optional implementation of the photonic-Ising dissipators using digital techniques offers an alternative approach to realizing the passive error correction mechanism. These elements work together to create a robust and scalable quantum memory that operates efficiently in two dimensions, advancing the field of quantum computing.

In an embodiment, a passively protected memory in two dimensions includes: a square lattice including a plurality of quantum harmonic oscillators, each harmonic oscillator exhibiting excellent coherence properties; each of the plurality of harmonic oscillators experiencing a coherent two-photon drive process and a two-photon loss process; an ancillary cavity coupled to each of the plurality of harmonic oscillators; and a processor configured to perform the following steps: applying a unitary operation U to the ancillary cavity, the unitary operation U being dependent on the state of the corresponding harmonic oscillator and its four nearest neighbor harmonic oscillators, the unitary operation U changing the state of the ancillary cavity if a local error is detected in the configuration of domain walls on the four bonds connecting the corresponding harmonic oscillator it its four nearest neighbor harmonic oscillators and doing nothing otherwise; applying a controlled-NOT gate with the ancillary cavity as the control qubit and the corresponding harmonic oscillator as the target qubit; and resetting the ancillary cavity to its initial state. In an embodiment, each of the plurality of harmonic oscillators experiences a two-photon drive process with an amplitude $\lambda$ and a two-photon loss process with a rate $\kappa_2$. In an embodiment, the unitary operation U is defined as $U=P\otimes(|\alpha_e\rangle\langle\alpha_o|+|\alpha_o\rangle\langle\alpha_e|+P^{\perp}\otimes(|\alpha_o\rangle\langle\alpha_o|+|\alpha_e\rangle\langle\alpha_e|)$, wherein P projects on a local configuration of domain walls and $P^{\perp}$ is the orthogonal subspace projector. In an embodiment, P projects onto a configuration with 3 or 4 misaligned neighboring lattice cavities. In an embodiment, P implements Toom's rule for detecting local errors. In an embodiment, the ancillary cavity is initialized in state $|\alpha_o\rangle$. In an embodiment, the processor resets the ancillary cavity by dispersively coupling the ancillary cavity to a transmon qubit. In an embodiment, the processor implements the unitary operation U in parallel across all the sites of the square lattice before resetting the ancillary cavities. In an embodiment, the processor implements the unitary operation U in parallel by dividing the lattice into bipartite sublattices and operating on the cavities that belong to the same sublattice in parallel. In an embodiment, the processor implements the unitary operation U using bias-preserving gates.

It is contemplated that the square lattice including a plurality of harmonic oscillators forms the fundamental structure of the passively protected memory. Each harmonic oscillator, exhibiting excellent coherence properties, acts as a qubit capable of storing quantum information. These oscillators can be implemented using various physical systems, such as superconducting cavities or trapped ions, which exhibit the desired harmonic behavior and coherence properties. The lattice arrangement provides a framework for implementing error correction codes by exploiting the interactions between neighboring qubits.

The two-photon drive process and the two-photon loss process play a crucial role in stabilizing the quantum states stored within the harmonic oscillators. The two-photon drive process involves the coherent addition of pairs of photons to the oscillators, effectively counteracting the decoherence caused by single-photon loss events. The two-photon loss process ensures that the system remains within the desired subspace of states by removing excess photons. These processes can be implemented using carefully designed electromagnetic fields that interact with the harmonic oscillators, driving transitions between specific energy levels. The combined effect of these processes is the suppression of phase-flip errors and the maintenance of the integrity of the stored quantum information.

The ancillary cavity, coupled to each of the plurality of harmonic oscillators, serves as an auxiliary system that interacts with the main harmonic oscillators to facilitate error detection and correction. This coupling allows for the transfer of information between the ancillary cavity and the corresponding harmonic oscillator, enabling the detection of local errors and the subsequent application of corrective measures. The ancillary cavity can be implemented using a similar physical system as the main harmonic oscillators, such as a superconducting cavity or a trapped ion, ensuring compatible interactions and efficient information transfer.

The processor, responsible for implementing the passive error correction mechanism, performs a sequence of steps to detect and correct errors within the quantum memory. The processor applies a unitary operation U to the ancillary cavity, where the specific form of U depends on the state of the corresponding harmonic oscillator and its four nearest neighbor harmonic oscillators. The unitary operation U is designed to change the state of the ancillary cavity only if a local error is detected in the configuration of the corresponding harmonic oscillator and its four nearest neighbor harmonic oscillators. Otherwise, it leaves the ancillary cavity unchanged. This selective application of the unitary operation ensures that corrective actions are taken only when necessary.

Following the application of the unitary operation, the processor applies a controlled-NOT gate with the ancillary cavity as the control qubit and the corresponding harmonic oscillator as the target qubit. The controlled-NOT gate, a fundamental quantum operation, flips the state of the target qubit (the harmonic oscillator) only if the control qubit (the ancillary cavity) is in a specific state. This step allows for the transfer of error information from the ancillary cavity to the harmonic oscillator, enabling the correction of local errors within the quantum memory.

Finally, the processor resets the ancillary cavity to its initial state, preparing it for subsequent error detection and correction cycles. This resetting process ensures that the ancillary cavity is ready to interact with the harmonic oscillators in the next cycle, maintaining the continuous operation of the passive error correction mechanism.

The specific implementation of each element in the passively protected memory in two dimensions contributes to its overall functionality and advantages. The square lattice structure, together with the operations on the ancillary cavities, provides a framework for correcting bit-flip errors. The two-photon drive and loss processes applied on each harmonic oscillator suppress phase-flip errors. The ancillary cavity facilitates error detection and correction through its coupling to the main harmonic oscillators. The processor, by implementing a sequence of unitary operations and quantum gates, enables the detection and correction of local errors. Finally, the resetting of the ancillary cavity ensures the continuous operation of the passive error correction mechanism. The combined effect of these elements is a passively protected quantum memory in two dimensions that exhibits exceptional robustness and scalability, paving the way for advancements in quantum computing technologies.

The two-photon drive process, characterized by an amplitude $\lambda$, governs the strength with which pairs of photons are added to the harmonic oscillators. This amplitude influences the average number of photons present in the system and consequently, affects the separation between $|\alpha\rangle$ and $|-\alpha\rangle$ in phase space. The two-photon loss process, occurring at a rate $\kappa_2$, controls the removal of photons from the harmonic oscillators. By carefully balancing the drive and loss processes, the quantum memory can be maintained within the desired subspace of states while simultaneously suppressing phase-flip errors caused by photon dephasing.

The unitary operation U, defined as $U=P\otimes(|\alpha_e\rangle\langle\alpha_o|+|\alpha_o\rangle\langle\alpha_e|)+P^{\perp}\otimes(|\alpha_o\rangle\langle\alpha_o|+|\alpha_e\rangle\langle\alpha_e|)$, plays a role in the error detection and correction process. The projector P selects specific configurations of domain walls, which represent boundaries between regions of different parity within the lattice of harmonic oscillators. This allows the unitary operation U to target and correct local errors within the quantum memory. The orthogonal subspace projector $P\perp$ ensures that the unitary operation does not affect the state of the ancillary cavity when no local errors are detected, preventing unnecessary disturbances to the system.

The projector P can be designed to target specific error configurations, such as a configuration with 3 or 4 misaligned neighboring lattice cavities. This configuration corresponds to a local error within the lattice, where the parity of a harmonic oscillator is misaligned with the majority of its neighbors. By projecting onto this configuration, the unitary operation U can identify and subsequently correct these local errors, enhancing the overall robustness of the quantum memory.

Alternatively, the projector P can implement Toom's rule for detecting local errors. Toom's rule is a specific algorithm used in cellular automata and error correction codes to determine the state of a cell based on the states of its neighboring cells. In this context, Toom's rule can be applied to detect local errors within the lattice of harmonic oscillators by analyzing the parity of an oscillator and its two nearest neighbors at the top and to the left. By implementing Toom's rule, the unitary operation U can efficiently identify and correct local errors, contributing to the passive error correction capabilities of the memory.

The ancillary cavity is initialized in state $|\alpha_o\rangle$, representing an odd cat state, which is a superposition of coherent states with opposite phases. Initializing the ancillary cavity in this state ensures that it is prepared to interact with the harmonic oscillators and detect local errors within the quantum memory. The specific choice of initial state for the ancillary cavity is crucial for the proper functioning of the error detection and correction mechanism.

The processor resets the ancillary cavity by dispersively coupling it, in the case of a superconducting implementation, to a transmon qubit. Dispersive coupling refers to a weak interaction between two quantum systems that does not directly induce transitions between their energy levels but rather shifts their energy levels based on their respective states. A transmon qubit is a type of superconducting qubit known for its long coherence times and its suitability for coupling to other quantum systems. By dispersively coupling the ancillary cavity to a transmon qubit, the processor can effectively extract entropy from the ancillary cavity and reset it to its initial state $|\alpha_o\rangle$, preparing it for subsequent error detection and correction cycles.

The processor can implement the unitary operation U in parallel across all the sites of the square lattice before resetting the ancillary cavities. This parallel implementation allows for the simultaneous detection and correction of errors across the entire lattice, significantly improving the efficiency and speed of the passive error correction process.

To achieve parallel implementation, the processor can divide the lattice into bipartite sublattices and operate on the cavities that belong to the same sublattice in parallel. Bipartite sublattices refer to a division of the lattice into two sets of non-adjacent cavities. By operating on the cavities within each sublattice simultaneously, the processor can efficiently apply the unitary operation U across the entire lattice before resetting the ancillary cavities. This approach optimizes the utilization of processing resources and minimizes the overall time required for error correction.

The processor can implement the unitary operation U using bias-preserving gates. Bias-preserving gates are a specific type of quantum gate that minimizes the introduction of additional dephasing errors during the error correction process. By utilizing bias-preserving gates, the processor ensures the accuracy and fidelity of the passive error correction mechanism, contributing to the overall robustness of the quantum memory.

The specific implementation of each element in this embodiment of the passively protected memory in two dimensions contributes to its overall functionality and effectiveness. The encoding of quantum information into a square lattice of harmonic oscillators with excellent coherence properties provides redundancy and facilitates error correction. The two-photon drive and loss processes stabilize the quantum states and suppress phase-flip errors. The ancillary cavity, coupled to the main harmonic oscillators, facilitates bit-flip error detection and correction. The processor implements a sequence of unitary operations and quantum gates to detect and correct local errors. The resetting of the ancillary cavity, achieved, in the case of a superconducting implementation, through dispersive coupling to a transmon qubit, ensures the continuous operation of the error correction mechanism. The parallel implementation of the unitary operation, facilitated by dividing the lattice into bipartite sublattices, enhances the efficiency of the error correction process. Finally, the use of bias-preserving gates ensures the accuracy and fidelity of the error correction mechanism. These elements work together to create a robust and scalable quantum memory that operates efficiently in two dimensions, advancing the field of quantum computing.

The process for making a passively protected memory in two dimensions begins with providing a square lattice of harmonic oscillators. These harmonic oscillators, possessing small non-linearities and outstanding coherence properties, serve as the building blocks of the quantum memory. Various physical systems, such as superconducting cavities or trapped ions, can be utilized to implement these harmonic oscillators, ensuring the desired behavior and coherence properties. The lattice arrangement provides a framework for implementing error correction codes by exploiting the interactions between neighboring qubits.

Each harmonic oscillator within the lattice is then subjected to a two-photon drive process and a two-photon loss process. The two-photon drive process involves the coherent addition of pairs of photons to the oscillators, counteracting decoherence caused by single-photon loss events. The two-photon loss process ensures that the system remains within the desired subspace of states by removing excess photons. These processes can be implemented using carefully designed electromagnetic fields that interact with the harmonic oscillators, driving transitions between specific energy levels and contributing to the overall stability of the quantum memory.

In the superconducting implementation, the coupling of each harmonic oscillator to its neighbor via a Josephson junction generates an Ising-like parity-parity interaction. Josephson junctions, implemented using superconducting circuits, facilitate the flow of superconducting current between neighboring cavities. This current flow depends on the relative phase of the superconducting wavefunctions in each cavity, and by carefully designing the circuit parameters, this interaction can be engineered to produce the desired Ising-like parity-parity coupling. Together with the cold bath, the resulting interaction, which depends on the parity (even or odd) of the photon number within each cavity, promotes the alignment of neighboring qubits and contributes to the collective error correction capabilities of the memory, enhancing its robustness against bit-flip errors.

A cold bath is coupled to the harmonic oscillators, enabling the dissipation of energy and the correction of local errors. The cold bath can be implemented using a physical reservoir at a low temperature, such as a cryogenic system, and its interaction with the harmonic oscillators is designed to preferentially dissipate energy in configurations with misaligned parities. This leads to the alignment of parities in neighboring cavities, effectively correcting bit-flip errors and enhancing the robustness of the quantum memory. This passive error correction mechanism, driven by the interaction with the cold bath, ensures the long-term stability and integrity of the quantum information stored within the memory.

The specific implementation of each element in the process for making a passively protected memory in two dimensions contributes to its overall functionality and advantages. The square lattice structure provides redundancy needed for correcting bit-flip errors caused by photon loss, while the harmonic oscillator Hilbert space provides redundancy needed for correcting phase-flip errors caused by photon dephasing. The two-photon drive and loss processes stabilize the quantum states and suppress phase-flip errors. An Ising-like parity-parity interaction, implemented in the superconducting case using Josephson junctions, together with the cold bath promotes parity alignment and contributes to the correction of bit-flip errors caused by photon loss. The combined effect of these elements is a passively protected quantum memory in two dimensions that exhibits exceptional robustness and scalability, paving the way for advancements in quantum computing technologies.

Each harmonic oscillator within the lattice is subjected to a two-photon drive process with an amplitude $\lambda$ and a two-photon loss process with a rate $\kappa_2$. The amplitude $\lambda$ determines the strength of the drive, influencing the number of photons added to the harmonic oscillators during the drive process. The rate $\kappa_2$ governs the speed at which photons are removed from the harmonic oscillators through the loss process. By carefully tuning these parameters, the quantum memory can be optimized for both coherence and error correction.

The parity-parity interaction Hamiltonian between neighboring cavities, defined as $H_S = -\sum_{\langle ij \rangle} Q_i Q_j$, where $Q_j$ is the photon parity operator at site j, plays a crucial role in promoting error correction. The photon parity operator indicates the evenness or oddness of the number of photons in a cavity. This specific form of the interaction Hamiltonian ensures that the energy of the system depends on the relative parity of neighboring cavities, encouraging their alignment and contributing to the passive error correction capabilities of the memory.

The local dissipators, produced by the cold bath and the parity-parity Hamiltonian, contribute to the passive error correction mechanism. These dissipators act on specific configurations of neighboring cavities based on the number of domain walls, which represent boundaries between regions of different parity. The annihilation and creation operators, $a_{x,y}$ and $$a^\dagger_{x,y}$$

respectively, remove or add photons to the cavities, while the dissipative rates $\tilde{\kappa}_{nn}$ determine the strength of the dissipation process. By preferentially dissipating energy in configurations with misaligned parities, the local dissipators drive the system towards a state with aligned parities and thus, correcting bit-flip errors.

The steady states of the model, spanning the codespace and defined as $|\psi\rangle = c_0 |\alpha_e\rangle |\alpha_e\rangle |\alpha_e\rangle \ldots + c_1 |\alpha_o\rangle |\alpha_o\rangle |\alpha_o\rangle \ldots$, for $|c_0|^2 + |c_1|^2 = 1$, serve as the logical basis for the quantum memory. The even and odd cat states, $|\alpha_e\rangle$ and $|\alpha_o\rangle$ respectively, are superpositions of coherent states with opposite phases, and they provide a robust encoding for quantum information. The specific form of these states, along with the interactions and dissipative processes within the system, contribute to the protection against both bit-flip and phase-flip errors.

The definition of the even and odd cat states, $|\alpha_e\rangle \sim |\alpha\rangle + |-\alpha\rangle$ and $|\alpha_o\rangle \sim |\alpha\rangle - |-\alpha\rangle$, where $|\alpha\rangle$ is a coherent state with amplitude $\alpha = \text{Exp}[-i\pi/4] \, \text{Sqrt}[N]$ and $N = \lambda/\kappa 2$ photons, highlights the importance of the coherent state amplitude $\alpha$. This amplitude determines the average number of photons $N = |\alpha|^2$ in the coherent state and consequently, affects the separation between $|\alpha\rangle$ and $|-\alpha\rangle$ in phase space. As the amplitude increases, the separation between these states also increases, making it exponentially less likely for noise to induce transitions between them and thus, providing enhanced protection against phase-flip errors $|\alpha_o\rangle \rightarrow -|\alpha_o\rangle$.

The suppression of logical phase-flip errors as the number of photons N grows is a direct consequence of the increased separation between $|\alpha\rangle$ and $|-\alpha\rangle$ in phase space. This separation makes it increasingly difficult for noise to induce transitions between these states, effectively protecting the stored quantum information from phase-flip errors $|\alpha_o\rangle \rightarrow -|\alpha_o\rangle$.

The suppression of logical bit-flip errors as the lattice size M grows is a result of the collective error correction provided by the Ising-like interactions, the cold bath, and the resulting local dissipators. As the lattice size increases, the energy barrier for creating a logical bit-flip error also increases, making it exponentially less likely for such errors to occur. This scalability ensures that the quantum memory performs better and better as the size of the quantum system increases.

The parity-parity interaction Hamiltonian can be engineered from a coupling between high-impedance cavity modes and Josephson junctions. High-impedance cavity modes are electromagnetic resonances within a cavity that have a large impedance, meaning they resist the flow of current. This property makes them suitable for coupling to Josephson junctions, as the junctions are sensitive to changes in current. By carefully designing the circuit parameters, the interaction between the cavity modes and the Josephson junctions can be engineered to produce the desired Ising-like parity-parity interaction, contributing to the passive error correction capabilities of the memory.

The alternative implementation of the photonic-Ising dissipators using digital techniques offers a potentially simpler approach to realizing the passive error correction mechanism. This involves implementing the dissipative interactions between the harmonic oscillators and the cold bath using a sequence of discrete quantum gates and operations, rather than relying on direct always-on physical coupling to a cold bath. This approach could simplify the experimental realization of the quantum memory and facilitate its integration into larger quantum computing systems.

The specific implementation of each element in the process for making a passively protected memory in two dimensions contributes to its overall functionality and advantages. The square lattice structure provides redundancy needed for correcting bit-flip errors caused by photon loss, while the harmonic oscillator Hilbert space provides redundancy needed for correcting phase-flip errors caused by photon dephasing. The two-photon drive and loss processes stabilize the quantum states and suppress phase-flip errors. An Ising-like parity-parity interaction, implemented in the superconducting case using Josephson junctions, together with the cold bath promotes parity alignment and contributes to the correction of bit-flip errors caused by photon loss. The optional implementation of the photonic-Ising dissipators using digital techniques offers an alternative approach to realizing the passive error correction mechanism. These elements work together to create a robust and scalable quantum memory that operates efficiently in two dimensions, advancing the field of quantum computing.

The articles and processes herein are illustrated further by the following Example, which is non-limiting.

EXAMPLE

Quantum error correction remains one of the biggest challenges towards building a practical quantum computer. One of the leading candidates for realizing fault tolerance is the family of quantum stabilizer codes, including the surface code and the GKP code. These error-correcting schemes are based on fast error recovery controlled by the feedback from repetitive syndrome measurements.

A prominent alternative is the finite-temperature quantum memory: Certain thermal environments naturally evolve arbitrary initial states into a qubit subspace of interest at low temperature, thus eliminating the need for active measurements and correcting operations. Many recent studies have investigated thermal self-correcting properties. To date, the only known models that host a passive quantum memory via this mechanism are topological codes in four dimensions (4D) and higher, e.g. the 4D toric code.

A separate line of research aims to uncover a passively protected quantum memory via engineered "driven-dissipative" systems. Such passive protection includes but is not limited to the finite-temperature case, since a thermal-equilibrium steady state is not required. The memory is dynamically protected against certain noise channels by (local) Markovian dissipation. This has led to a number of new ideas for passive error correction, such as the autonomously corrected cat qubit and the dissipative Toom's rule. Unfortunately, none of these models can protect a quantum memory for an exponentially-long time as a function of the system size (in less than four dimensions).

This Examples provides a model with engineered dissipation that protects against both bit flips and phase flips and lives in two spatial dimensions. Instead of relying on topological order, we suggest that the model should belong to a phase that spontaneously breaks two different $Z_2$ symmetries. Each $Z_2$-symmetry-broken phase protects a "classical bit," which together form a robust qubit. The proposed model provides an example of a robust quantum memory which, at low temperature, can be exponentially long-lived in system size parameters and has challenging, yet realistic physical requirements.

Quantum Memory

Consider a Hilbert space H, and define two encoded, logical states $|\bar{0}\rangle$, $|\bar{1}\rangle \in H$ that span the codespace C. We assume the system is always initialized in the codespace: $\rho_i = |\psi\rangle\langle\psi|$ where $|\psi\rangle \in C$.

A local continuous-time Markovian generator L in Lindblad form is defined by $$\frac{d\rho}{dt} = \mathcal{L}(\rho) = -i[H, \rho] + \sum_j \left( L_j \rho L_j^\dagger - \frac{1}{2}\{L_j^\dagger L_j, \rho\} \right), \tag{1}$$

where H is the Hamiltonian of the system and $L_j$ are local dissipators which arise due to the system-environment coupling. We consider a dynamical process that can be decomposed into two parts, an "error" generator and a "recovery" generator: $L=L_e+L_r$. The error generator describes the main channels of physical noise which move the initial state out of the codespace. The recovery generator stabilizes the codespace: $L_r(\rho_i)=0$, i.e. any state in the codespace is a steady state of the recovery. We allow for this noisy process to occur for a time t, which generically sends $\rho_i$ to a mixed state $\rho_m(t)=e^{Lt}(\rho_i)$.

Finally, we employ a "single-shot" decoding quantum channel $E_r$ which sends every state in the Hilbert space back to the codespace. The final state is $$\rho_f(t) = E_r e^{Lt}(\rho_i). \tag{2}$$

We wish to find systems where the difference between the initial and final states is exponentially small in the system size:

$$1 - Tr[\rho_i \rho_f(t)] = O\left(e^{-\gamma M}\right) \text{ as } M \to \infty, \tag{3}$$

where $\gamma > 0$ is a time-independent constant and M is some system size parameter. A system described by L hosts a passively protected quantum memory for any finite time t if Eq. (3) holds as the thermodynamic limit is approached.

The bit-flip and phase-flip errors of a two-level system are generated via the Pauli operators X, Z respectively. A good quantum memory should thus protect against both sources of noise. Recent work has described the connection between $Z_2$ symmetry breaking and error correction: A symmetry-broken phase protects quantum information against X or Z errors, but not both. This leads to a protected classical bit, which can be viewed as a quantum bit experiencing biased noise.

In this work, we attempt to glue two different classical bits together to form a robust qubit. Our strategy involves studying a system that passively corrects against bit flips due to Ising-like dissipators which tend to align qubits locally. Furthermore, phase flips will passively correct due to driven-dissipative stabilization of the photonic cat code. We begin by describing spontaneous symmetry breaking in the cat code and in the Ising model separately. We then describe a model which inherits both protecting features.

Photonic Cat Code

Let us briefly review $Z_2$ spontaneous symmetry breaking in the photonic cat code. Consider a driven-dissipative photonic cavity in the presence of two-photon drive and two-photon loss. The rotating-frame Hamiltonian and dissipator read $H=\lambda(a^2+(a^\dagger)^2)$, $L_2=\sqrt{\kappa_2}a^2$. Here a is the annihilation operator for a cavity photon, $\lambda$ is the drive strength, and $\kappa_2$ is the two-photon loss rate. While the model has $Z_2$ symmetry $[H,Q]=[L_2,Q]=0$ generated by parity $Q=\exp(i\pi a^\dagger a)$, the steady state can violate this symmetry:

$$\rho_{ss} = |\psi\rangle\langle\psi|, |\psi\rangle = c_0|\alpha_e\rangle + c_1|\alpha_o\rangle, \tag{4}$$

for $|c_0|^2+|c_1|^2=1$, where $|\alpha_e\rangle \sim |\alpha\rangle+|-\alpha\rangle$, $|\alpha_o\rangle \sim |\alpha\rangle-|-\alpha\rangle$, and $|\alpha\rangle$ is a coherent state with amplitude $\alpha=Exp[-i\pi/4]$ Sqrt[N] and $N=\lambda/\kappa_2$ photons. The even and odd cat states $|\alpha_{e/o}\rangle\Phi$ represent logical 0 and 1, respectively.

The cat code is protected against phase-flip errors generated by photon dephasing $L_d$=Sqrt[$\kappa_d$] $a^\dagger a$. Indeed, the phase-flip logical error rate scales as $e^{-\gamma N}$ where $\gamma$ is a constant. The symmetry-broken states $|\pm\gamma\rangle\approx(|\alpha_e\rangle\pm|\alpha_o\rangle)/\sqrt{2}$ have an exponentially-long lifetime in the limit of large N, ensuring that logical phase flips are unlikely.

The dominant decoherence mechanism for the cat qubit stems from the bit flip, generated via single-photon loss $L_1=\sqrt{\kappa_1}a$: $a|\alpha_{e/o}\rangle\sim|\alpha_{o/e}\rangle$, which reduces the qubit steady state structure to a classical bit: $\rho_{ss}\approx c|{+}\alpha\rangle\langle{+}\alpha|+(1-c)|{-}\alpha\rangle\langle{-}\alpha|,c\in[0,1]$. More generally, perturbations that commute with photon parity (e.g. $[L_d,Q]$=0) are expected to be passively corrected, while terms which explicitly break the symmetry (e.g. $\{L_1,Q\}$=0) are not.

2D Ising Model

We now turn our attention to a system that has the opposite problem: $Z_2$ symmetry breaking will protect against bit flips but not phase flips. We consider the 2D Ising model on an M×M square lattice with periodic boundary conditions. The Hamiltonian reads $$H_{is} = -\sum\nolimits_{x,y=1}^{M}(Z_{x,y}Z_{x+1,y} + Z_{x,y}Z_{x,y+1}),\qquad(5)$$

where $Z_{x,y}$ is the Z Pauli operator on site (x,y). The ferromagnetic states are the ground states of this model and span the codespace: $|\bar{0}\rangle\equiv|\downarrow\downarrow\downarrow\ \ldots\ \rangle,|\bar{1}\rangle\equiv|\uparrow\uparrow\uparrow\ \ldots\ \rangle$, with $Z|\downarrow\rangle=|\downarrow\rangle$ and $Z|\uparrow\rangle=-|\uparrow\rangle$.

We define local dissipators that describe the thermalization of the Ising Hamiltonian. (For simplicity, we set the Hamiltonian in the master equation to zero.) Consider dissipators that are a product of a spin flip (X) with a projector onto a particular domain-wall configuration. These jumps will cause a spin to flip sign according to a local "majority rule," i.e. only if more than two of the neighboring spins are misaligned. Specifically:

$$L_{x,y}^{(4)} = \sqrt{\kappa}\,X_{x,y}P_{x,y;\rightarrow}^{-}P_{x,y;\uparrow}^{-}P_{x-1,y;\rightarrow}^{-}P_{x,y-1;\uparrow}^{-}\qquad(6)$$

$$L_{x,y}^{(3)} = \sqrt{\tilde{\kappa}}\,X_{x,y}P_{x,y;\rightarrow}^{+}P_{x,y;\uparrow}^{-}P_{x-1,y;\rightarrow}^{-}P_{x,y-1;\uparrow}^{-}$$

where $$\tilde{\kappa} = Sqrt[\Delta\kappa + \Delta^2] - \Delta \text{ and } P_{x,y;\rightarrow}^{\pm} = (1 \pm Z_{x,y}Z_{x+1,y})/2,$$

$$P_{x,y;\uparrow}^{\pm} = (1 \pm Z_{x,y}Z_{x,y+1})/2$$

are projectors onto particular local configurations of spins. The superscripts indicate the number of domain walls which the projector is checking for, and we neglect to write jumps related by rotational invariance (i.e. there are 4 different $L^{(3)}$ operators per site). We also consider an error process in the form of a uniform bit flip rate on each lattice site:

$$L_{x,y}' = \sqrt{\Delta}\,X_{x,y}.$$

Figure 1:
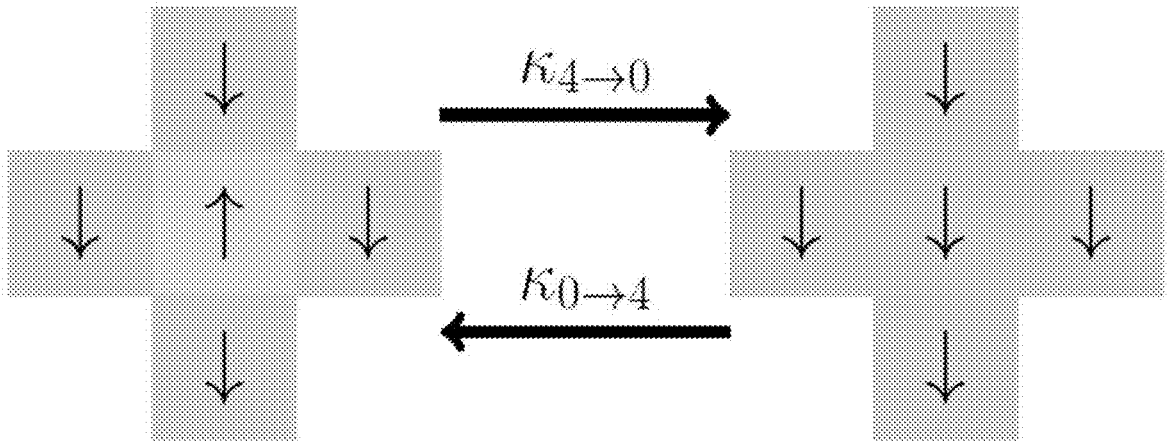
FIG. 1 shows, according to some embodiments, that the total rate of transitioning from a configuration with 4 domain walls to a configuration with 0 domain walls satisfies detailed balance: $\kappa_{4\to0}/\kappa_{0\to4}=e^{8\beta}$.

We have chosen our dissipators above such that the steady state of the model is the thermal state of the 2D classical Ising model:

$$\rho_{ss} = \frac{e^{-\beta H_{is}}}{T_r[e^{-\beta H_{is}}]}, \beta = \frac{1}{8}\ln\left[\frac{\kappa + \Delta}{\Delta}\right],\qquad(7)$$

with the effective temperature set by the relative ratio of the correction rate to the bit-flip rate. Within the quantum jump picture, the rates of transitioning between different classical configurations respect detailed balance. (See e.g. FIG. 1.)

While the thermal state (7) is always a steady state of the model, it is not unique. All dissipators commute with the parity operator $$Q = \prod\nolimits_{i=1}^{M^2} X_i\colon [L_j, Q] = 0.$$

This means that the dynamics preserves the parity of the state (called a "strong $Z_2$ symmetry"). In the thermodynamic limit of the low-temperature (symmetry-broken) phase, a qubit can be stored in the steady state.

Figure 2:
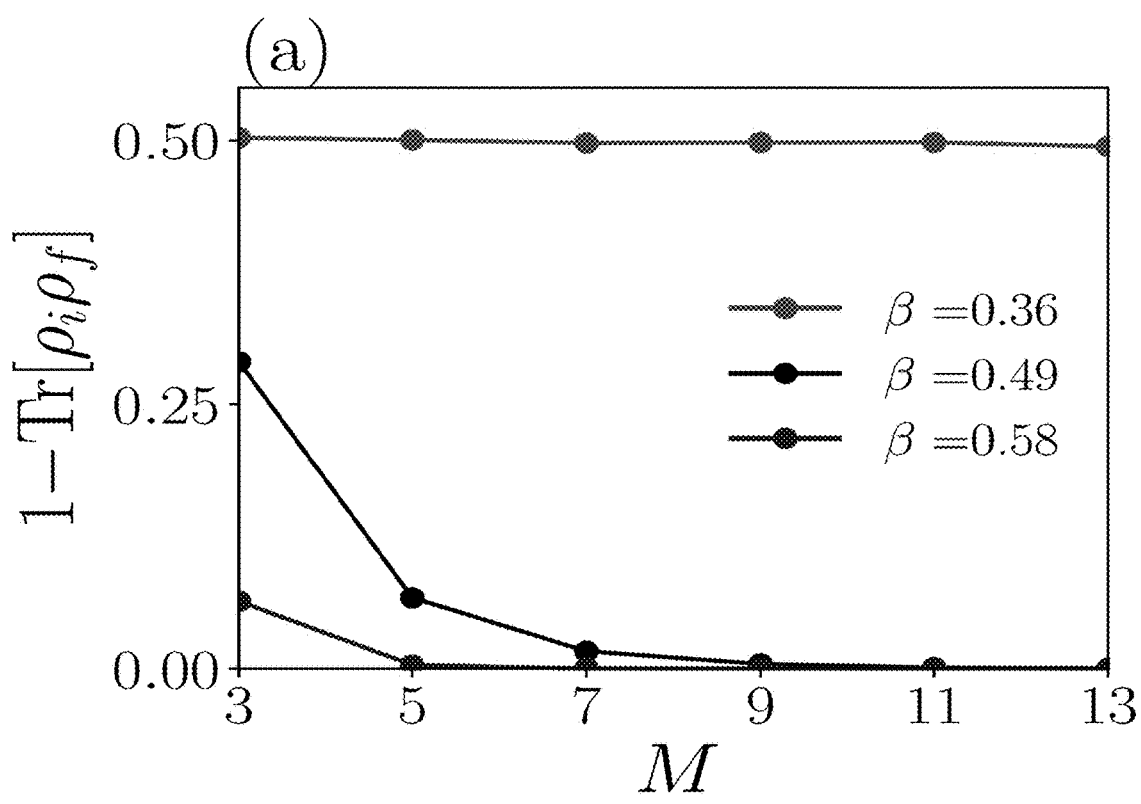
FIG. 2 shows, according to some embodiments, in panel (a), the overlap between the initial and final states for the protocol given above, for a Lindbladian in the high-temperature phase (red dots), and in the low-temperature phase (black and blue dots). As linear system size M grows, the overlap approaches one only in the low-temperature (symmetry-broken) phase corresponding to $\beta>\beta_c\approx0.44$. In panel (b), it shows same black data points on a log plot; the overlap tends to one exponentially fast in M. In both (a) and (b), the quench time is $T=800/\kappa$, i.e. long enough to reach the steady state. The simulation employs the quantum jump approach by averaging over $10^5$ trajectories.
Figure 2:
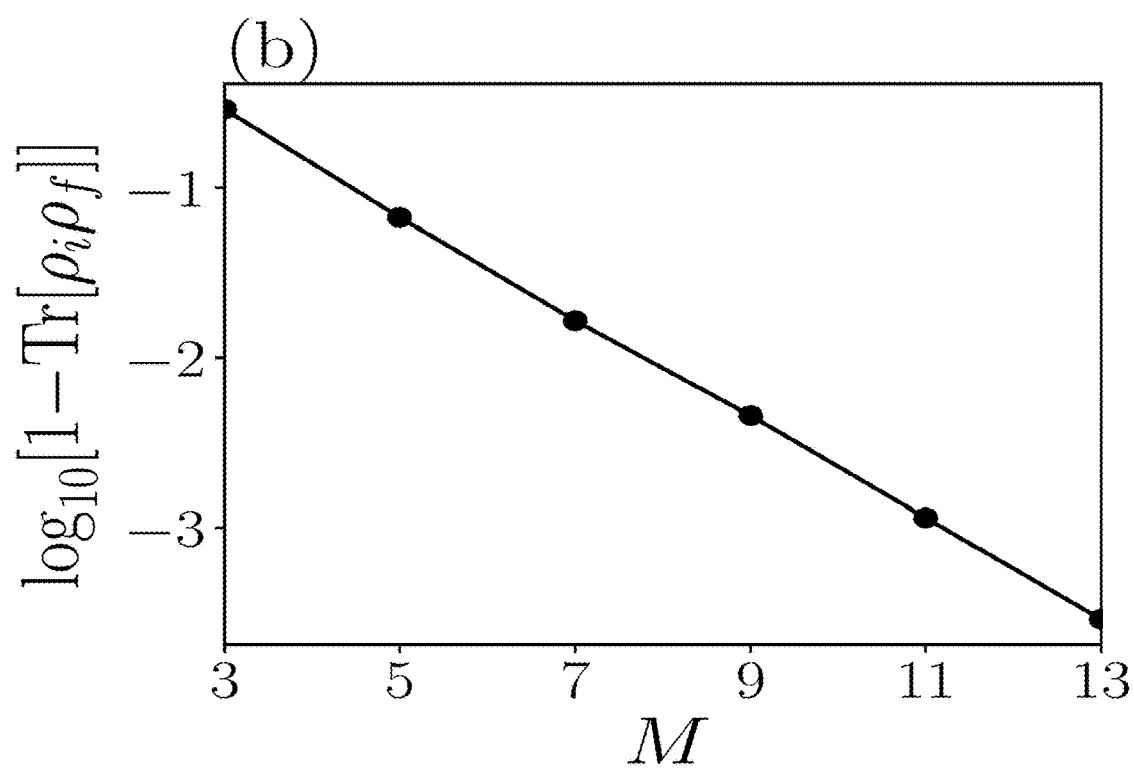

We can confirm this picture via numerical simulations. Suppose we initialize our system in a ferromagnetic state:

$$\psi\rangle = |\bar{0}\rangle = (|E_0^+\rangle + |E_0^-\rangle)/\sqrt{2} \text{ where } |E_0^{\pm}\rangle$$

are ground states in the different parity sectors. We then quench the system with the noisy Lindbladian for a time T much larger than the inverse of the dissipative gap, so that the system settles into its steady state. Finally, we apply a single-shot decoder which brings the state back to the codespace by measuring all domain walls in the system then flipping all bits in the smaller domain. Our results are summarized in FIG. 2. In the low-temperature phase, the overlap starts to approach the ideal value of 1 exponentially fast in M. Qualitatively different behavior occurs in the high-temperature phase [$\beta>\beta_c$=ln(1+$\sqrt{2}$)/2$\approx$0.44; red dots], where the success rate stays at 50% for a wide range of M.

Unfortunately, the stored qubit is unstable to noise that violates the strong symmetry. In particular, the presence of dephasing $L_i\sim Z_i$ (phase flips), reduces the strong $Z_2$ symmetry to a "weak $Z_2$ symmetry" (defined at the level of the superoperator: [L,Q]=0, where Q($\rho$)=Q$\rho$Q$^\dagger$), such that only a classical bit can be stored in the steady state. In this case, the steady state at low-temperature has the structure $\rho_{ss}\approx c|\bar{0}\rangle\langle\bar{0}|+(1-c)|\bar{1}\rangle\langle\bar{1}|$, for $c\in[0,1]$.

In analogy with the cat qubit in the presence of single-photon loss, Z dephasing destroys the coherence between Ising ferromagnetic states.

2D Photonic-Ising Model

We see that the cat code passively corrects against phase flips but not bit flips, and that the 2D Ising model passively corrects against bit flips but not phase flips. Is it possible to combine the protecting features of both models to construct a system that passively corrects against both sources of noise?

Consider an M×M square lattice of photonic cavities. Each cavity undergoes a two-photon drive process and a two-photon loss process:

$$H_{x,y} = \lambda\left(a_{x,y}^2 + \left(a_{x,y}^\dagger\right)^2\right), \quad L_{2,x,y} = \sqrt{\kappa_2}\, a_{x,y}^2, \tag{8}$$

where $a_{x,y}$ is the annihilation operator on site (x,y). Next, let us consider a parity-parity interaction between neighboring cavities: $H_S = \sum_{\langle ij\rangle} Q_i Q_j$, where $Q_j$ is the photon parity operator at site j. Similar to the Ising model, at low temperatures, such interaction will tend to align the parities of neighboring cavities via the following local dissipators:

$$L_{x,y}^{(4)} = \sqrt{\kappa_{nn}}\, a_{x,y} P_{x,y;\rightarrow}^- P_{x,y;\uparrow}^- P_{x-1,y;\rightarrow}^- P_{x,y-1;\uparrow}^-, \tag{9}$$

$$L_{x,y}^{(3)} = \sqrt{\tilde{\kappa}_{nn}}\, a_{x,y} P_{x,y;\rightarrow}^+ P_{x,y;\uparrow}^- P_{x-1,y;\rightarrow}^- P_{x,y-1;\uparrow}^-,$$

where $a_{x,y}$ is the annihilation operator for the cavity at site $$x, y, \tilde{\kappa}_{nn} = \sqrt{\kappa_1 \kappa_{nn} + \kappa_1^2} - \kappa_1,$$

$\kappa_1$ is the single-photon loss rate (corresponding to the dissipator:

$$L_{1,x,y} = \sqrt{\kappa_1}\, a_{x,y} P_{x,y;\rightarrow}^\pm = (1 \pm Q_{x,y} Q_{x+1,y})/2, \quad P_{x,y;\uparrow}^\pm = (1 \pm Q_{x,y} Q_{x,y+1})/2,$$

and $$Q_{x,y} = e^{i\pi a_{x,y}^\dagger a_{x,y}}.$$

The following states are the steady states of the model in the absence of errors ($\kappa_1=0$) and span the codespace:

$$|\psi\rangle = c_0|\alpha_e\rangle|\alpha_e\rangle|\alpha_e\rangle\ldots + c_1|\alpha_o\rangle|\alpha_o\rangle|\alpha_o\rangle\ldots, \tag{10}$$

for $|c_0|^2 + |c_1|^2 = 1$.

For thermal systems, the existence of a passively-correcting quantum memory is related to the presence of an extensive energy barrier which local errors must overcome in order to create a logical bit-flip or phase-flip operation. In the model described above, a logical bit-flip operation can be created via local single-photon loss $L_{1,x,y} = \sqrt{\kappa_1} a_{x,y}$ only by passing through a configuration with an extensive number of domain walls, which is exponentially unlikely in the limit of large lattice size M→∞. Similarly, a phase-flip error can only be generated by taking the state $|\alpha_e\rangle \pm |\alpha_o\rangle$ to $|\alpha_e\rangle \pm |\alpha_o\rangle$ for any of the cavities. However, such a process is also unlikely to occur via dephasing perturbations $L_{d,x,y} = \sqrt{\kappa_d} a_{x,y} a_{x,y}$ which perturb states locally in phase space, since the states $|\pm\alpha\rangle \approx |\alpha_e\rangle \pm |\alpha_o\rangle$ are well separated in phase space and an unstable fixed point sits between them. The logical phase-flip errors are again exponentially unlikely as N→∞.

The single-photon loss and the dephasing lead to terms proportional to $a^\dagger a$ and $(a^\dagger a)^2$ in the Lindbladian, which result in leakage out of the effective two-level codespace for each cavity into other states of the cavity. This leakage poses a challenge for numerical simulation since (unlike the Ising model) we need to keep track of more than two degrees of freedom per lattice site. Nevertheless, we shall provide evidence for a stable quantum memory by employing a variety of approximations.

First, let us consider an approximation that allows us to map the dynamics of the photonic-Ising model directly to the classical-Ising model studied above. Specifically, we introduce an idealized model by replacing the single photon loss dissipator $L_1 = \sqrt{\kappa_1}a$ with $E_1 = \sqrt{\kappa_1}b$, where b=aV and V is the projector onto the codespace: $V = |\alpha_e\rangle\langle\alpha_e| + |\alpha_o\rangle\langle\alpha_o|$. We also assume an absence of dephasing errors, i.e. $\kappa_d = 0$. This allows us to treat each site as an effective two-level system $|0\rangle = |\alpha_e\rangle$, $|1\rangle = |\alpha_o\rangle$, avoiding any leakage out of the codespace. We similarly replace a→b in the nearest-neighbor coupling dissipators (9) (except in the definition of Q). The operator b can be regarded as an "idealized bit flip" since, for N≫1, it takes the form $b \approx \alpha(|\alpha_e\rangle\langle\alpha_o| + |\alpha_o\rangle\langle\alpha_e|)$. The idealized model maps exactly to the Ising model studied above, with an effective bit-flip error rate of $N\kappa_1$, an effective Ising-correction rate of $N\kappa_{nn}$, and an inverse temperature $\beta = \ln[(\kappa_{nn}+\kappa_1)/\kappa_1]/8$. We therefore find that this model passively corrects against bit flips in the limit M→∞ of the low-temperature phase. In the limit of large driving strength and small single-photon loss, we expect the photonic-Ising model to be well approximated by the idealized model since the state rarely leaves the codespace. We provide quantitative evidence for this below.

Dephasing, single-photon loss, and bit-flip recovery jumps $$\left(L_{x,y}^{(3)} \text{ and } L_{x,y}^{(4)}\right)$$

cause leakage out of the codespace which is neglected within the idealized model. It is natural to ask whether this leakage is detrimental to the passively protected memory when the idealized model is no longer a good approximation. We provide evidence that this is not the case by studying a toy model which resembles the 2D model. Consider a single cavity coupled to a spin-½ particle (described by Pauli operators X, Y,Z), leading to two logical states $|\downarrow\rangle|\alpha_e\rangle$ and $|\downarrow\rangle|\alpha_o\rangle$. The Hamiltonian and jump operators read $$h = \lambda\left(a^2 + \left(a^\dagger\right)^2\right), \quad l_2 = \sqrt{\kappa_2}\, a^2, \quad l_1 = \sqrt{\kappa_1}\, Xa,$$

$$l_d = \sqrt{\kappa_d}\, a^\dagger a, \quad l_m = \sqrt{\kappa_{nn}}\, \frac{1}{2} X(1-Z)a.$$

The model assumes that single-photon loss is accompanied by a spin flip, while two-photon drive and dephasing are not. The flip-recovery jump $l_{nn}$ is triggered by a flipped spin state $|\uparrow\rangle$, similar to the bit-flip recovery jump caused by a parity misalignment in 2D. Importantly, leakage caused by the noise processes $l_1$, $l_d$, and the flip-recovery jump is captured by this model. Below, we analyze this model numerically and analytically. We find that the initial state can always be perfectly restored via a decoder (up to corrections exponentially small in N).

Figure 3:
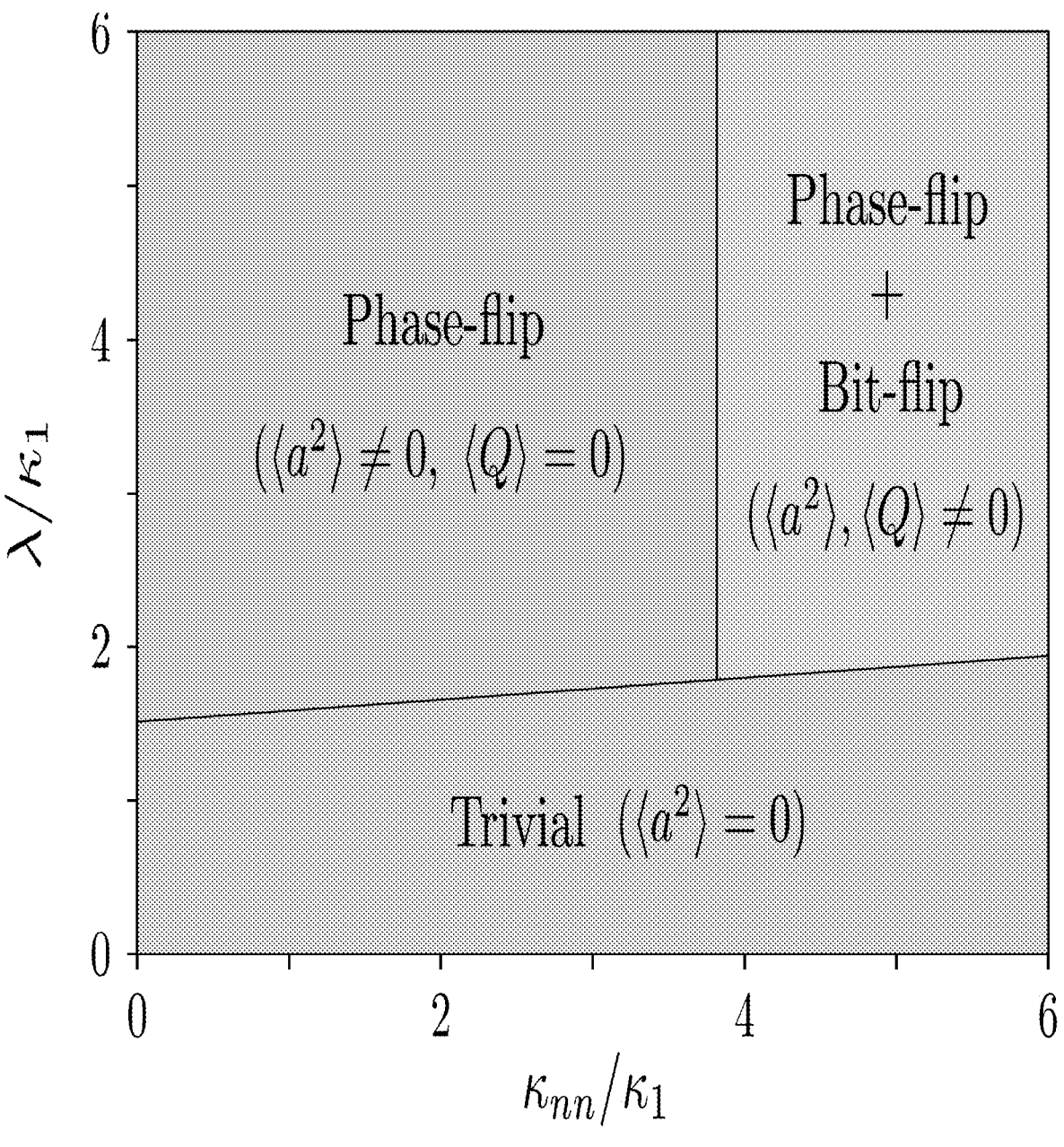
FIG. 3 shows, according to some embodiments, the mean-field phase diagram for $\kappa_d=\kappa_1$. The top right corner shades the region where both $\langle Q\rangle$ and $\langle a^2\rangle$ are non-zero. Both phase and bit-flip errors are protected. When $\langle a^2\rangle$ is not equal to 0 but $\langle Q\rangle=0$, we expect protection only for phase errors. When $\langle a^2\rangle=0$, the memory may become fragile under either noise.

Finally, the stability of the memory can also be understood as the coexistence of two order parameters: $\langle Q\rangle = \langle e^{i\pi a^\dagger a}\rangle \neq 0$ indicates the ferromagnetic phase and therefore suppression of bit-flip errors, while $\langle a^2\rangle \neq 0$ indicates that the cat states are stabilized, implying suppression of phase-flip errors. We use a product-state mean-field ansatz $$\rho = \bigotimes_{x,y=1}^{M} \rho_{x,y},$$

where each $\rho_{x,y}$ is a density matrix for a two-level system in the basis of $$|\pm\alpha_{MF}\rangle$$

for some mean-field coherent parameter $\alpha_{MF}$. A non-trivial dissipative phase of the system is identified by non-zero fixed points of $\langle Q \rangle$ and $\langle a^2 \rangle$. The mean-field solutions suggest that, for small $\kappa_1$, $\kappa_d$, the memory is protected against both phase and bit-flip errors. When $\kappa_1$ or $\kappa_d$ exceeds a threshold, the order parameters undergo two second-order phase transitions and the quantum memory is no longer stable (see below). The mean-field phase diagram is sketched in FIG. 3.

Implementing the Photonic-Ising Dissipators

The key ingredients for our proposal are the microscopic dissipators defined in Eq. (9). A direct approach to achieve such terms involves engineering an Ising-like interaction between cavity modes: $H_S \propto -\Sigma_{(ij)} Q_i Q_j$. The natural system-bath interaction of the form $$\sum_i \left(a_i + a_i^\dagger\right) \otimes B_i$$

(where $B_i$ acts on bath degrees of freedom) would then give rise to the model described above (within the standard Born-Markov approximation). The parity-parity interaction $H_S$ can be engineered from coupling between high-impedance cavity modes and Josephson junctions, as we review below.

Inspired by the microscopic dissipators Eq. (9), an alternative approach to protect the memory involves digitally implementing a stochastic local error decoder. Below, we provide an explicit description of how to achieve such a local decoder autonomously without the need of measurements; however, it requires that the local error decoding should be carried out at a rate that scales linearly in the photon number N of each cavity. The implementation can be achieved simultaneously with the dephasing protection Eq. (8), making it fault-tolerant. Note that this is different from the active repetition cat code in 1D as we avoid the processing of non-local syndrome information.

A photonic-Ising model hosts robust quantum memory under both single-photon loss and dephasing noise. We can estimate the logical error rates in the photonic-Ising model as follows. While the bit-flip error rate becomes extensive ($\sim O(N)$) in the limit of large cavity photon number, the Ising-type interaction gives rise to an exponentially-suppressed error rate $O(e^{-\gamma M})$ with $\gamma > 0$, resulting in a logical bit-flip error rate of $O(Ne^{-\gamma M})$. Similarly, a single cavity yields a phase-flip error rate of $O(e^{-\gamma N})$ with $\gamma > 0$, while this is made extensive by the spatially-extended lattice configuration, resulting in a logical phase flip error rate of $O(M^2 e^{-\gamma N})$. Harmonic oscillators with small non-linearities and outstanding coherence properties—and thus with large achievable N—can be found in a variety of photonic and phononic systems.

The realization of the parity-parity coupling based on Josephson junctions and a high-impedance cavity mode is experimentally challenging. The effective dynamics studied in this work can potentially be achieved via other qubits, e.g. by constructing Ising interactions between superconducting qubits with intrinsic $T_1$ protection (see below for more details). This may lead to more amenable experimental constructions within circuit QED platforms (and potentially beyond). The photonic-Ising model can be generalized to adapt the Toom's rule, or to higher dimensions for a more robust perturbative stability. The full perturbative stability of the model remains an interesting open question.

Idealized Bit Flip Approximation

We elaborate on the idealized bit flip approximation used above. In experiments, the bit flip error for a single photonic cat qubit is generated via single-photon loss $L_1 = \mathrm{Sqrt}[\kappa_1]a$. However, in order to map our many-body-cat-qubit system to the 2D Ising model, we must replace this noise generator with an "idealized bit flip", represented via the jump operator: $E_1 = \mathrm{Sqrt}[\kappa_1]aV$ where $V$ is a projector onto the codespace. We provide evidence that $E_1$ is a reasonable approximation for $L_1$ in the limit of small single-photon loss and large two-photon drive (compared to the two-photon loss rate), which is the relevant regime for modern experiments involving photonic cat qubits. We also assume the absence of photon dephasing. To this end, we shall present two models for a single cavity and show that their steady states and dissipative gaps converge in this limit.

Model 1 has the standard single-photon loss term which is expected to appear in experiment. Model 2 has the "idealized bit flip" which is needed to make numerical progress.

Model 1: Let us consider a single photonic cavity in the presence of two-photon drive $H = \lambda[a^2 + (a^\dagger)^2]$, two photon loss $L_2 = \mathrm{Sqrt}[\kappa_2]a^2$, and single-photon loss $L_1 = \mathrm{Sqrt}[\kappa_1]a$. It is convenient to utilize the gauge freedom of the Lindbladian to eliminate the Hamiltonian by incorporating it in a dissipative term. The following two dissipators share the same master equation as the model just described:

$$L_c = \sqrt{\kappa_2}\left(a^2 - \alpha^2\right), \alpha = \sqrt{\frac{\lambda}{\kappa_2}}\, e^{-i\pi/4} \tag{S1}$$

$$L_1 = \sqrt{\kappa_1}\, a. \tag{S2}$$

The dissipator $L_c$ will cause states in the Hilbert space to evolve towards the coherent states $$|\pm\alpha\rangle,$$

which are dark states of $L_c$. We thus find that $L_c$ generates the "recovery" part of the Lindbladian, while $L_1$ generates bit flip errors and causes leakage out of the codespace.

From the perspective of quantum trajectories, single-photon loss causes the amplitude of a coherent state to decay due to the non-Hermitian Hamiltonian term proportional to $\kappa_1 a^\dagger a$ which (by itself) causes the coherent state parameter to decay via $\alpha e^{-\kappa_1 r}$. The two-photon drive process ensures that the steady state amplitude remains non-zero, but nevertheless the photon population decreases due to the single-photon loss. Within mean-field theory, the average number $\bar{n}$ of photons in the cavity satisfies $$\bar{n} = \frac{2\lambda - \kappa_1}{2\kappa_2}. \tag{S3}$$

This suggests that, in the limit of $\lambda/\kappa_2 \gg 1$, the steady state of the system should start to converge to a coherent state $|\pm\mu\rangle$ with a shifted amplitude:

$$a|\pm\mu\rangle = \pm\mu|\pm\mu\rangle, \ \eta = \sqrt{\frac{2\lambda - \kappa_1}{2\kappa_2}} \, e^{-i\pi/4}. \tag{S4}$$

Numerics suggest that the true steady state of the system will be a mixture of several pure states. However, the steady state will have large overlap with the states $$|\pm\mu\rangle.$$

In the limit $\kappa_1/\kappa_2 \ll 1$, the steady state will start to converge to a mixture of the states $$|\pm\mu\rangle.$$

Figure 4:
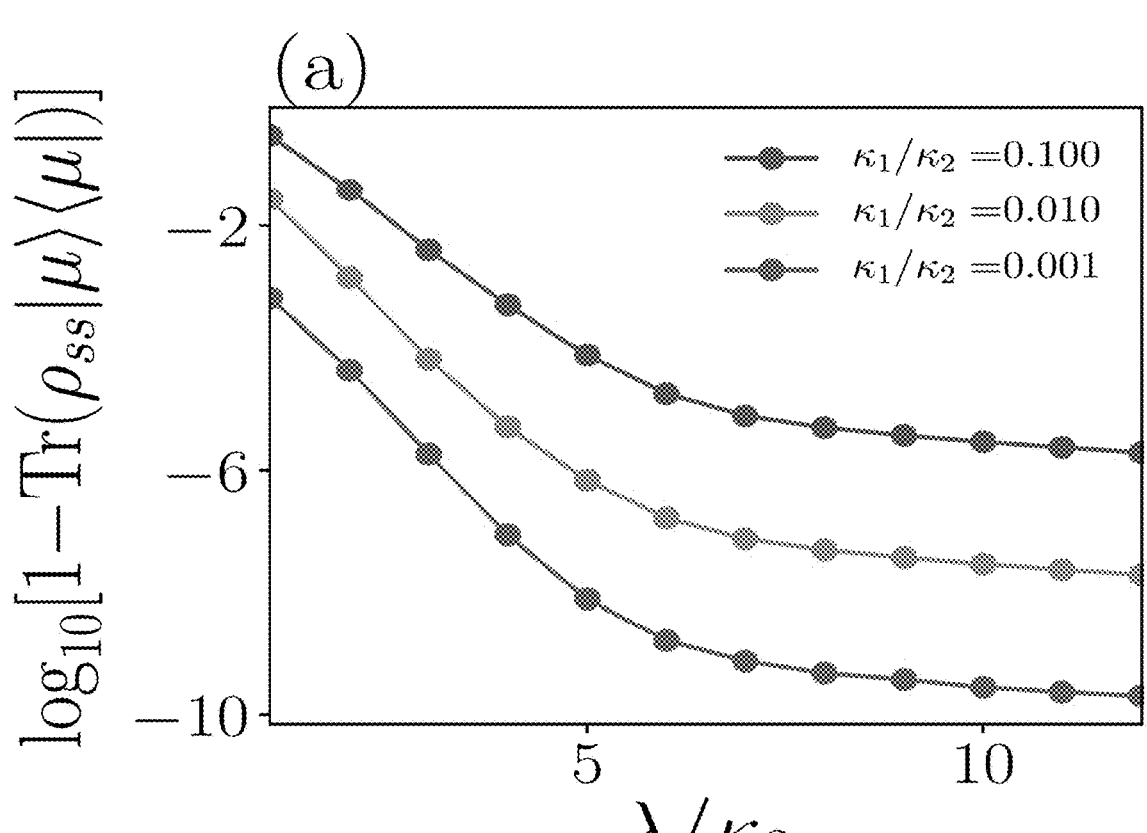
FIG. 4 shows, according to some embodiments, Model 1: (a) Expectation value of $|\mu\rangle\langle\mu|$ in the steady state of the model described in Eqs. (S1), (S2) with $\lambda/\kappa_2=N$ for different choices of $\kappa_1/\kappa_2$. In the limit $\lambda/\kappa_2\gg1$, $\kappa_1/\kappa_2\ll1$, the system converges to the coherent state $|\mu\rangle$. We use exact Lindblad evolution starting from the initial state $|\alpha\rangle$ and evolving for a time $t=200/\kappa_2$ to reach the steady state. (b) The dissipative gap $\Lambda_g$ scales linearly as a function of the drive strength, for $\kappa_1/\kappa_2=10^{-3}$.
Figure 4:
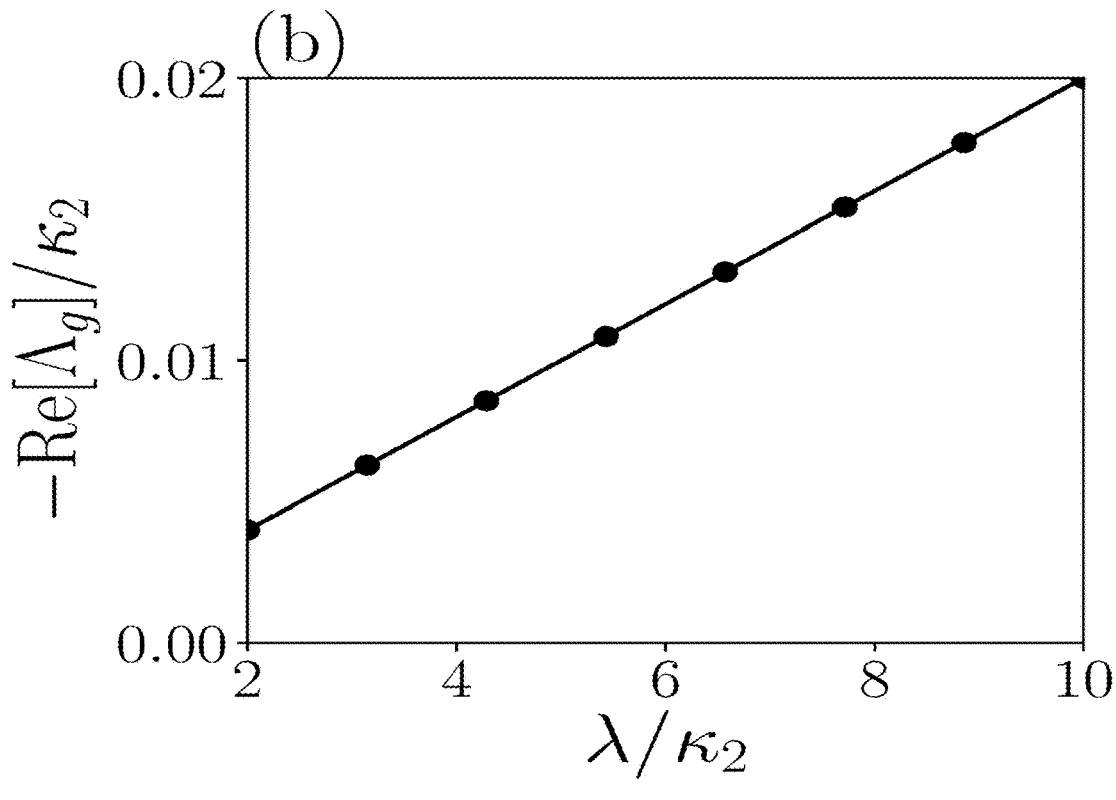

We can confirm this via numerical simulations. In FIG. 4 we plot the overlap of the steady state with $|\mu\rangle$ as a function of the drive strength $\lambda/\kappa_2$, for different choices of $\kappa_1/\kappa_2$. We find that the steady state of the system approaches $|\mu\rangle$ in the limit $\lambda/\kappa_2 \gg 1$, $\kappa_1/\kappa_2 \ll 1$. These parameters are in a regime that is relevant for modern experiments. We also plot the dissipative gap, which scales linearly with the drive strength.

Beyond a shift in the coherent state amplitude, single-photon loss also has the effect of reducing the qubit-steady state structure to a classical-bit-steady-state structure. Only classical mixtures of coherent states are stable, while off-diagonal coherences have a finite lifetime:

$$\rho_{ss} \approx c|\mu\rangle\langle\mu| + (1-c)|-\mu\rangle\langle-\mu|. \tag{S5}$$

for $c \in [0,1]$, $\lambda/\kappa_2 \gg 1$, $\kappa_1/\kappa_2 \ll 1$. The steady state is thus two dimensional, enough only to store a classical bit.

Model 2: Let us now consider a different model which will have the same steady state and dissipative gap in the limit $\lambda/\kappa_2 \gg 1$, $\kappa_1/\kappa_2 \ll 1$, but will involve the "idealized bit flip" rather than single-photon loss. Consider the dissipators $$L_c = \sqrt{\kappa_2}\left(a^2 - \alpha^2\right), \ \alpha = \sqrt{\frac{\lambda}{\kappa_2}} \, e^{-i\pi/4} \tag{S6}$$

$$E_1 = \sqrt{\kappa_1} \, b = \sqrt{\kappa_1} \, aV, \ V = |\alpha_e\rangle\langle\alpha_e| + |\alpha_o\rangle\langle\alpha_o| \tag{S7}$$

where $|\alpha_e\rangle \sim |\alpha\rangle + |-\alpha\rangle$, $|\alpha_o\rangle \sim |\alpha\rangle - |-\alpha\rangle$. In this model, the dissipator $E_1$ does not cause any leakage of photons out of $|\alpha\rangle$. This is because the non-Hermitian Hamiltonian term proportional to $$E_1^\dagger E_1$$

keeps superpositions of $|\pm\alpha\rangle$ in this subspace (due to the projector V). Nevertheless, the term $E_1$ ensures that quantum superpositions of $$|\pm\alpha\rangle$$

are unstable, while classical mixtures are stable. The steady state starts to converge to the following state in the limit of large drive $\lambda/\kappa_2 \gg 1$:

$$\rho_{ss} \approx c|\alpha\rangle\langle\alpha| + (1-c)|-\alpha\rangle\langle-\alpha|, \tag{S8}$$

for $c \in [0, 1]$.

The overlap between $|\alpha\rangle$ and $|\mu\rangle$ satisfies $$\left|\langle\alpha \mid \mu\rangle\right|^2 = \exp\left[-\frac{\kappa_1^2}{16\kappa_2\lambda}\right] \approx 1 - \frac{\kappa_1^2}{16\kappa_2\lambda} + \dots \tag{S9}$$

Figure 5:
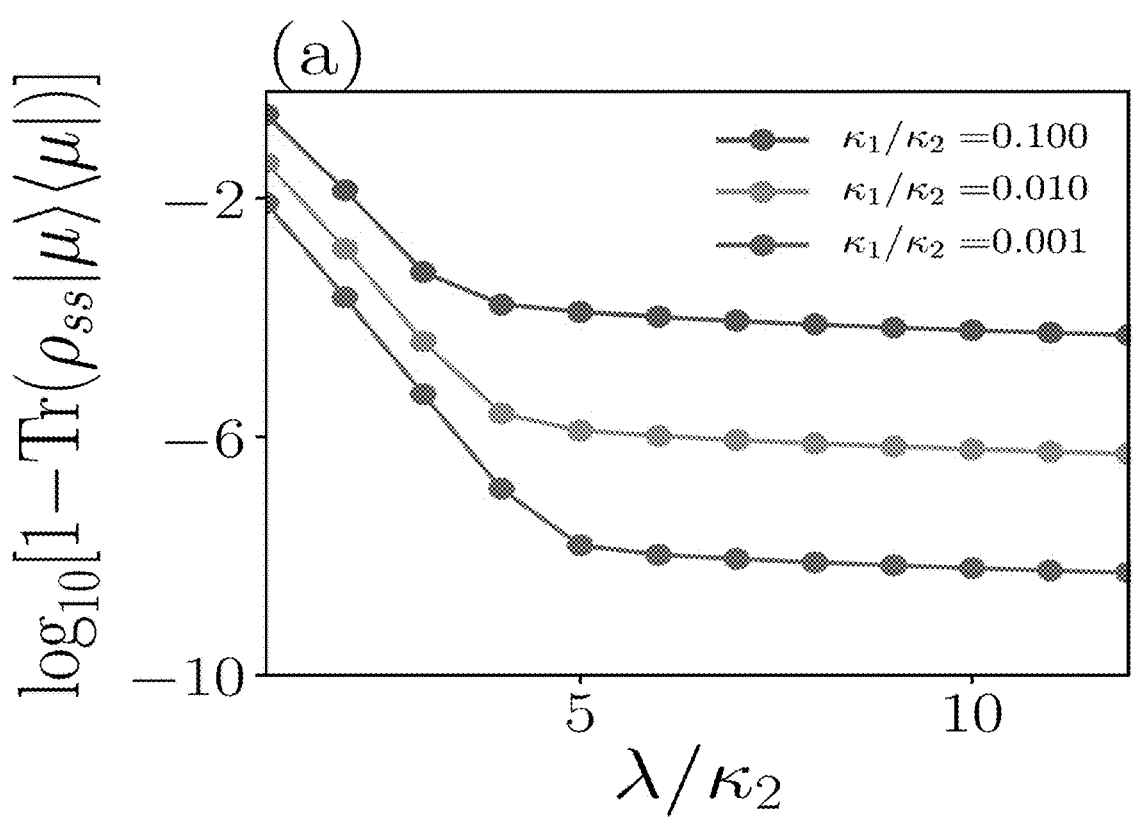
FIG. 5 shows, according to some embodiments, Model 2: (a) Expectation value of $|\mu\rangle\langle\mu|$ in the steady state of the model described in Eqs. (S6), (S7) with parameters: $\lambda/\kappa_2=N$ for different choices of $\kappa_1/\kappa_2$. In the limit, $\lambda/\kappa_2\gg1$, $\kappa_1/\kappa_2\ll1$ the system converges to the coherent state $|\mu\rangle$. An exact Lindblad evolution starts from the initial state $|\alpha\rangle$ and evolving for a time $t=200/\kappa_2$ to reach the steady state. (b) The dissipative gap $\Lambda_g$ scales linearly as a function of the drive strength, for $\kappa_1/\kappa_2=10^{-3}$.
Figure 5:
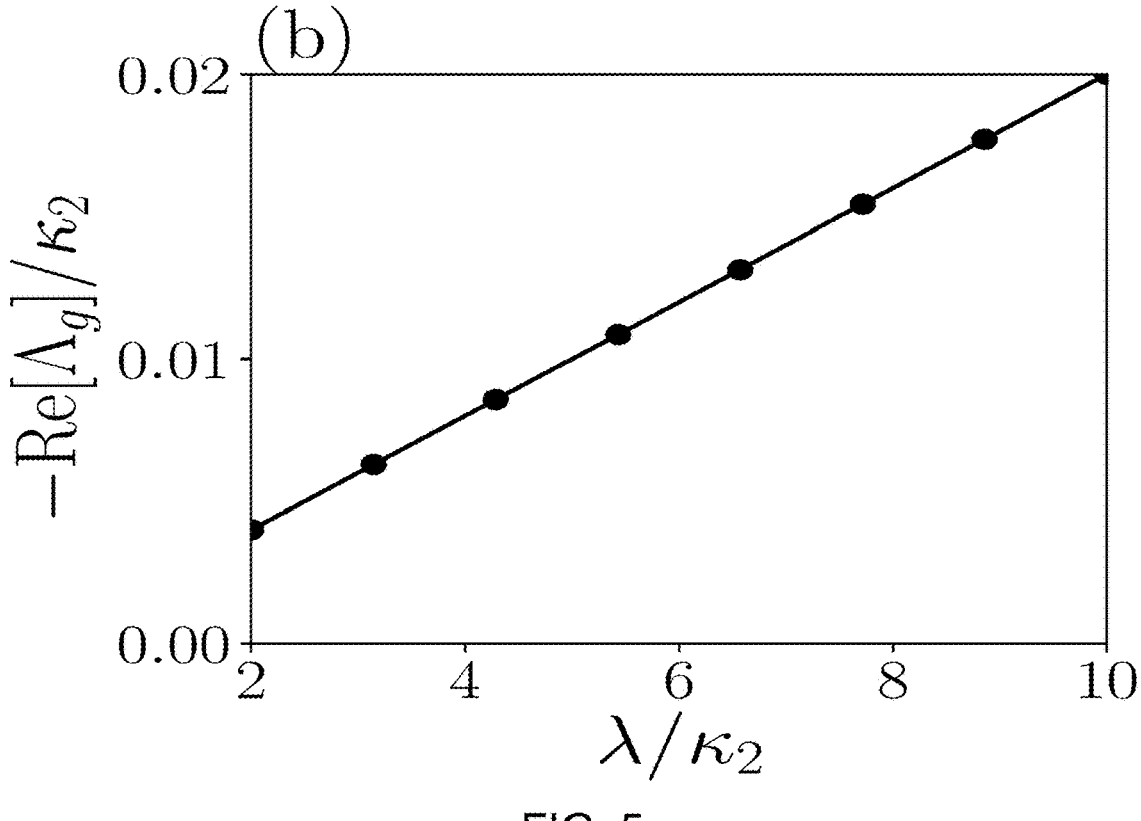

This implies that the deviation from unity scales as $(\kappa_1)^2$ when $\kappa_2\lambda \gg (\kappa_1)^2$. We confirm this in FIG. 5: The deviation between the steady state of Model 2 and $|\mu\rangle$ scales quadratically with $\kappa_1$ in the limit of large drive. We also plot the dissipative gap, which again scales linearly with the drive strength.

We have shown that Models 1 and 2 converge to each other in terms of their steady state and their dissipative gap in the limit $\lambda/\kappa_2 \gg 1$, $\kappa_1/\kappa_2 \ll 1$. This suggests that Model 2 is a reasonable approximation for Model 1 in this regime. Intuitively, this happens because the system quickly evolves toward the codespace, such that the projector term V acts trivially on the state. Above, we demonstrated that Model 2 passively corrects against bit flip errors via the Ising-like dissipators described above. We expect Model 1 to behave in qualitatively the same manner after the replacement of $b \rightarrow a$.

Although we used the limit $\lambda/\kappa_2 \gg 1$, $\kappa_1/\kappa_2 \ll 1$ to establish the exact mapping to the Ising model, we do not expect that this limit is needed to preserve quantum information in general. Rather, the system only needs to stay within the ordered phase (see FIG. 3). A relatively small $\kappa_1$ ensures that the steady state of the dynamics is a mixed state. Nevertheless, we expect that this mixed state will be a "noiseless subsystem", which implies that it can be decoded with a channel superoperator at the end of the dynamics.

Toy Model

The Ising-inspired bit-flip recovery jump operators [Eqs. (9)] by themselves will not give rise to protection against single-photon loss in the absence of a drive, since single-photon loss will cause the system to evolve to a vacuum state. In this section, we argue that, when the bit-flip recovery is coupled with the driving, the resulting environment is able to protect against both dephasing and single-photon loss errors.

Ideally, we would like to numerically simulate the 2D array of $M^2$ cat qubits introduced above. However, such a simulation is computationally expensive. We restrict ourselves to the toy model introduced above: a single cat qubit coupled to a two-level system, the latter described by Pauli operators X, Y,Z. The logical states of this toy system are defined as $|\downarrow\rangle|\alpha_o\rangle$ and $|\downarrow\rangle|\alpha_e\rangle$, where $|\alpha_e\rangle$, $|\alpha_o\rangle$ are the logical states for a single cat qubit. The noise and recovery jump operators are modified to $$l_c = \sqrt{\kappa_2}\left(a^2 - \alpha^2\right), \alpha = \sqrt{\frac{\lambda}{\kappa_2}}\, e^{-i\pi/4} \qquad \text{(S10)}$$

$$l_1 = \sqrt{\kappa_1}\, Xa, l_d = \sqrt{\kappa_d}\, a^\dagger a, \qquad \text{(S11)}$$

$$l_{nn} = \sqrt{\kappa_{nn}}\,\frac{1}{2}X(1-Z)a, \qquad \text{(S12)}$$

where $l_c$ generates a Lindbladian that is equivalent to the combined action of h and $l_2$ above. In this toy model, the spin-½ particle is essentially a "classical bit" that takes the discrete value of up or down. Any single-photon loss event is always accompanied by a flip of the spin. A bit-flip recovery for the cat qubit can then be achieved by checking the orientation of the spin: an annihilation operator a is applied to the cavity if the spin points upwards, otherwise nothing happens. This mimics the full 2D case where a bit-flip recovery jump is triggered by a parity misalignment between nearest-neighbor cat qubits. The difference between the 2D model and the toy model is that the latter always knows when an odd number of single photon-loss events has occurred. What remains to be tested is whether the errors can be corrected by introducing the bit-flip recovery jump.

Suppose we initialize the dynamics with a generic state in the codespace. We consider the following two scenarios: We choose the model with (i) $\kappa_2=1$, $\kappa_d=0.1$, $\kappa_1=0.1$, $\kappa_{nn}=0$ and (ii) $\kappa_2=1$, $\kappa_d=0.1$, $\kappa_1=0.1$, $\kappa_{nn}=0.3$. The system size parameter is $N=\lambda/\kappa_2$ with $N\rightarrow\infty$ representing the thermodynamic limit. The initial state is first evolved with this Lindbladian for duration T=15, then followed by the corresponding noiseless Lindbladian evolution ($\kappa_d=\kappa_1=0$) for another T=15. In the end, we compute the fidelity between the final state and the initial state. The results for the two scenarios are shown in FIG. 6 for different N.

The results clearly show distinct behaviors. For case (i), where $\kappa_{nn}=0$, the single-photon loss causes uncorrectable errors in the stored memory, leading to a saturated fidelity of ½ (due to an equal mixture of the flipped and unflipped states) as N increases. For case (ii), where $\kappa_{nn}=0$l, increasing N leads to a fidelity exponentially close to the ideal value of 1.

As a sanity check, let us consider the same numerical simulation but modify case (ii) by setting $\kappa_{nn}=0$ during the noiseless dynamics (while still keeping $\kappa_{nn}=0.3$ during the noisy dynamics). The results of the simulation are shown in FIG. 7. In case (i), which is identical to the one studied in FIG. 6, the fidelity relaxes to ½ regardless of the system size as before. The modified case (ii) shows a saturated fidelity between ½ and 1, suggesting a partial preservation of the initial quantum memory. This again confirms the dynamical quantum memory protection arising from the flip-recovery jump and two-photon drive.

Mean-Field Analysis of the Toy Model

We use a mean field approach to show that, despite the spin-boson coupling in our toy model, the $Z_2$ symmetry-breaking phase diagram of the single cat qubit is reproduced. Given an observable $\hat{O}$ and a Lindbladian term L generated by the jump operator L, the expectation value obeys $$Tr[\hat{O}\mathcal{L}\rho] = -\frac{1}{2}Tr\big[[\hat{O}, L^\dagger]L\rho + L^\dagger[L, \hat{O}]\rho\big]. \qquad \text{(S13)}$$

Using this, we can derive a coupled set of mean-field equations of motion for $\rangle a\langle$ and $\rangle Z\langle$:

$$\frac{d}{dt}\langle a\rangle = -i\lambda\langle a^\dagger\rangle - \frac{1}{2}\left(\kappa_1 + \kappa_d + \frac{\kappa_{nn}}{2}(1 - \langle Z\rangle)\right)\langle a\rangle - \kappa_2|\alpha|^2\langle a\rangle, \qquad \text{(S14)}$$

$$\frac{d}{dt}\langle Z\rangle = -2\kappa_1|\alpha|^2\langle Z\rangle + \kappa_{nn}|\alpha|^2(1 - \langle Z\rangle). \qquad \text{(S15)}$$

This yields the mean-field fixed point solutions for both observables $$\langle Z\rangle = \frac{\kappa_{nn}}{\kappa_{nn} + 2\kappa_1}, \qquad \text{(S16)}$$

$$\kappa_2|\alpha|^2 = |\lambda| - \frac{1}{2}\left(\kappa_1 + \kappa_d + \frac{\kappa_1\kappa_{nn}}{\kappa_{nn} + 2\kappa_1}\right). \qquad \text{(S17)}$$

The expression closely matches the simulation in the thermodynamic limit (see FIG. 7).

It is interesting to note that if $\kappa_1/\kappa_2$ is small enough, then any non-zero $\kappa_{nn}$ can give rise to a stable memory ($\langle Z\rangle, \langle a\rangle\approx0$). On the other hand, if $\kappa_1/\kappa_2$ is large, a large $\kappa_{nn}$ can destabilize the memory, leading to $\langle a\rangle=0$.

Mean-Field Solution for the 2D Photonic-Ising Model

In this section, we present the mean-field solution for the 2D photonic-Ising model. The mean-field analysis shows the existence of two symmetry-breaking transitions via two order parameters: $a^2$ and $Q\equiv e^{i\pi a^\dagger a}$.

We consider a product-state mean-field ansatz $$\rho = \bigotimes_{x,y=1}^{M}\rho_{x,y}.$$

At each site, $\rho_{x,y}$ is a density matrix for a two-level system in the basis of $|\pm\alpha_{MF}\rangle$ for some coherent parameter $\alpha_{MF}$. We first begin by deriving the mean-field equation for $Q=e^{i\pi a^\dagger a}$. Note that all the terms that commute with Q do not contribute to the time evolution. We are therefore left to consider only the single-photon loss term and the bit-flip correction term. Using Eq. (S13), we obtain $$\frac{d\langle Q\rangle}{dt} = -2\big(\kappa_1\langle a^\dagger aQ\rangle + \kappa_{nn}\langle a^\dagger aQP_{\kappa_{nn}}\rangle + \tilde{\kappa}_{nn}\langle a^\dagger aP_{\tilde{\kappa}_{nn}}\rangle\big), \qquad \text{(S18)}$$

Where $P_{\kappa_{nn}}$, $P_{\bar{\kappa}_{nn}}$ are sums of projectors onto different parity configurations with rates $\kappa_{nn}$, $\bar{\kappa}_{nn}$, as introduced above. Within mean-field theory, we replace the expectations by a product of expectations at each site, yielding $$-\frac{1}{2|\alpha|^2}\frac{d\langle Q\rangle}{dt} = \tag{S19}$$

$$\frac{\kappa_{nn}-4\bar{\kappa}_{nn}}{16}\langle Q\rangle^5 + \frac{\kappa_{nn}+4\bar{\kappa}_{nn}}{8}\langle Q\rangle^3 - \left(\frac{3\kappa_{nn}+4\bar{\kappa}_{nn}}{16}-\kappa_1\right)\langle Q\rangle.$$

Similarly, we can derive the mean-field equation for $a^2$:

$$\frac{d\langle a^2\rangle}{dt} = -\kappa_2\left(2\langle a^\dagger aa^2\rangle + \langle a^2\rangle\right) - i\lambda\left(2\langle a^\dagger a\rangle + 1\right) - \tag{S20}$$

$$\kappa_1\langle a^2\rangle - 2\kappa_d\langle a^2\rangle - \kappa_{nn}\langle a^2 P_{\kappa_{nn}}\rangle - \bar{\kappa}_{nn}\langle a^2 P_{\bar{\kappa}_{nn}}\rangle.$$

With the mean-field ansatz, we may approximate $\langle a^\dagger aa^2\rangle\approx|\alpha_{MF}|^2\langle a^2\rangle$. We also have $\langle a^2 P_{\bar{\kappa}_{nn}}\rangle = \langle a^2\rangle\langle P_{\bar{\kappa}_{nn}}\rangle$ and $\langle a^2 P_{\kappa_{nn}}\rangle = \langle a^2\rangle\langle P_{\kappa_{nn}}\rangle$. After some algebra, the mean-field fixed points at the thermodynamic limit (e.g. $\kappa_2\to 0$) can be found to satisfy $$\langle Q\rangle^2 = \frac{2\sqrt{\kappa_{nn}^2 - 4\kappa_1(\kappa_{nn}-4\bar{\kappa}_{nn})}-\kappa_{nn}-4\bar{\kappa}_{nn}}{\kappa_{nn}-4\bar{\kappa}_{nn}} \tag{S21}$$

$$|\alpha_{MF}|^2 = \frac{2\lambda - \kappa_1 - 2\kappa_d\left(-\gamma_4\langle Q\rangle^4 - \gamma_2\langle Q\rangle^2 - \gamma_0\right)}{2\kappa_2}, \tag{S22}$$

where $\gamma_4 = (-3\kappa_{nn}+4\bar{\kappa}_{nn})/16$, $\gamma_2 = (\kappa_{nn}-4\bar{\kappa}_{nn})/8$, $\gamma_0 = (\kappa_{nn}+4\bar{\kappa}_{nn})/16$.

In addition, $\langle Q\rangle^2\neq 0$ is only possible when $|\alpha_{MF}|^2\neq 0$. Intuitively, when $\langle a^2\rangle=0$, the cavity will lose coherence and decay to the vacuum due to the noise. The logical states are no longer well-defined in this case.

It is important to note that the mean-field solution suggests that the leakage caused by both finite $\kappa_1$ and finite $\kappa_d$ is compensated by the two-photon drive. The effect of this leakage amounts to a shift in the steady state coherent parameter.

A Microscopic Derivation of the Photonic-Ising Dissipators

Here we establish an explicit connection between the Hamiltonian approach for the photonic-Ising model and the microscopic Lindbladian approach. This section provides an example where the proposed photonic-Ising dissipators emerge naturally from a microscopic coupling, unlike the example in the previous section. In the next section, we will discuss an experimental protocol that realizes the desired Hamiltonian coupling based on superconducting circuits.

The Microscopic Generators

Let us start by considering a microscopic Hamiltonian of both the system and the bath:

$$H = H_S + H_B + H_{SB}, \tag{S23}$$

where $H_S = -J\sum_{\langle ij\rangle}Q_iQ_j$, and $H_B$, $H_{SB}$ are the bath and the system-bath coupling Hamiltonian, respectively. Notice that, in contrast to the above, we explicitly introduced an energy scale $J>0$ in $H_S$ to help us carry out the analysis. We consider $$H_{SB} = \sum_i\left(a_i + a_i^\dagger\right)\otimes B_i,$$

where $a_i$ is the annihilation operator on the photonic-Ising lattice and $B_i$ is some Hermitian local operator on the bath. We assume that the bath is large and the interaction $H_{SB}$ is weak such that effects of the coupling on the bath is fast and can be neglected, i.e. the full density matrix approximately factorizes into a product of a system density matrix and a bath density matrix: $\rho(t)\approx\rho_S(t)\otimes\rho_B$, $\forall t$. Provided that the standard Born-Markov approximation (i.e. the smallness of the influence of the system-bath coupling on the bath) and the rotating-wave approximation are valid, we can derive the Master equation in the interaction picture as $$\frac{d\rho_S}{dt} = \tag{S24}$$

$$-i[H', \rho_S] + \sum_\omega\sum_{i,j}\gamma_{i,j}(\omega)\left(A_i(\omega)\rho_S A_j^\dagger(\omega) - \frac{1}{2}\{A_j^\dagger(\omega)A_i(\omega), \rho_S\}\right).$$

Here $H'$ is the Lamb-shift Hamiltonian which we will define below. The operator $A_i(\omega)$ is defined as $$A_i(\omega) = \sum_E\prod(E)\left(a_i + a_i^\dagger\right)\prod(E + \omega), \tag{S25}$$

where $\Pi(E)$ is a projection the eigenstates of $H_S$ of energy E. So $A_i(\omega)$ is a lowering operator: it is the part of $a_i+a_i^\dagger$ that couples eigenstates of $H_S$ whose energies differ by $\omega$. It is easy to verify that $$\sum_\omega A_i(\omega) = a_i + a_i^\dagger.$$

Note that $a_i+a_i^\dagger$ can only create an energy difference of $\omega=0,\pm 4J,\pm 8J$, and we can work out $A_i(\omega)$ for each case explicitly.

It is straightforward to verify that $A_i(\omega)$ is geometrically local and takes the form $$A_i(0) = \left(a_i + a_i^\dagger\right)\sum_{\sigma(2)}P_{\sigma(2)}, A_i(0) = \left(a_i + a_i^\dagger\right)\sum_{\sigma(2)}P_{\sigma(2)} \tag{S26}$$

$$A_i(+4J) = \left(a_i + a_i^\dagger\right)\sum_{\sigma(3)}P_{\sigma(3)}, A_i(-4J) = \left(a_i + a_i^\dagger\right)\sum_{\sigma(1)}P_{\sigma(1)} \tag{S27}$$

$$A_i(+8J) = \left(a_i + a_i^\dagger\right)\sum_{\sigma(4)}P_{\sigma(4)}, A_i(-8J) = \left(a_i + a_i^\dagger\right)\sum_{\sigma(0)}P_{\sigma(0)} \tag{S28}$$

where $P_{\sigma(n)}$ denotes the projector onto different local configurations $\sigma(n)$ around site i with n domain walls. The following relationship is satisfied:

$$A_i^\dagger(\omega) = A_i(-\omega).$$

In Eq. (S24), the Hamiltonian H' is the Lamb-shift Hamiltonian $$H' = \sum_\omega \sum_{i,j} \chi_{i,j}(\omega) A_i^\dagger(\omega) A_j(\omega), \qquad (S29)$$

where the coupling $\chi_{i,j}(\omega)$ is given in terms of the Fourier transform of the reservoir correlation functions:

$$\chi_{i,j}(\omega) = \mathrm{Im}\{C_{i,j}(w)\}, \text{ where } C_{i,j} := \int_0^\infty ds e^{i\omega s} \langle B_i^\dagger(s) B_j(0) \rangle, \qquad (S30)$$

where $$B_i^\dagger(s)$$

denotes Heisenberg evolution under $H_B$ for time s and the expectation value is taken in the initial thermal state of the bath. To simplify the expression, we make the assumption that $\langle B_i^\dagger(s) B_j(0) \rangle \approx \langle B_i^\dagger(s) \rangle \langle B_j(0) \rangle$ for $i \neq j$. In particular, this is immediately satisfied if each site is coupled to its own bath. Note that we also assumed $\langle B_i^\dagger(s) \rangle = \langle B_j(0) \rangle = 0$ in order to get to Eq. (S24). We find $\chi_{ij}(\omega) = 0$ for $1 \neq j$. Defining $\chi_{i,i}(\omega) := \chi_i(\omega)$, H' simplifies to $$H' = \sum_{\omega,i} \chi_i(\omega) A_i^\dagger(\omega) A_i(\omega) \qquad (S31)$$

$$= \sum_i \left( \sum_\omega \chi_i(\omega) \sum_{\sigma(n[\omega])} P_{\sigma(n[\omega])} \right) (a_i + a_i^\dagger)^2,$$

where $n[\omega]$ is the number of domain walls in the projected configuration as in Eqs. (S26)-(S28). We therefore have a Hamiltonian contribution quadratic in the bosonic operators. A Hamiltonian of this form will in general cause dephasing of the quantum memory. However, such an effect will be exponentially suppressed by the combination of two-photon drive and two-photon loss in Eq. (8).

In Eq. (S24), the dissipative rate $\gamma_{i,j}(\omega)$ is also expressed in terms of the correlation functions as $$\gamma_{i,j}(\omega) = \mathrm{R}[C_{i,j}(\omega)] = \int_{-\infty}^\infty ds e^{i\omega s} \langle B_i^\dagger(s) B_j(0) \rangle.$$

We make use of the locality assumption again so $\gamma_{i,j} = 0$ for $1 \neq j$. The master equation Eq. (S24) simplifies to $$\frac{d\rho_S}{dt} = -i[H', \rho_S] + \qquad (S32)$$

$$\sum_{\omega \in \{0, \pm 2J, \pm 4J\}} \sum_i \gamma_i(\omega) \left( A_i(\omega) \rho_S A_i^\dagger(\omega) - \frac{1}{2}\{A_i^\dagger(\omega) A_i(\omega), \rho_S\} \right).$$

Imposing the Kubo-Martin-Schwinger (KMS) condition (i.e. assuming that the bath is in thermal equilibrium) leads to the detailed balance relation $$\gamma_i(\omega) = e^{\beta\omega} \gamma_i(-\omega). \qquad (S33)$$

for some temperature $\beta = 1/(\kappa_B T)$ set by the bath.

Recovering the Photonic-Ising Dissipators

We now show that the photonic-Ising dissipators defined in Eq. (9) are a special case of the dissipative part of Eq. (S32). Let us set $\gamma(0) = \gamma(-4J) = \gamma(-8J) = \kappa_1/2$. This can be satisfied at low temperature for a roughly constant density of states across this energy range. Suppose we initialize the system $\rho_S(0)$ as a pure state corresponding to a well-defined domain-wall configuration. Let us denote $$D(L)[\rho_s] = L\rho_s L^\dagger - \frac{1}{2}\{L^\dagger L, \rho_S\},$$

then, for any site i and time t, the density matrix $\rho_S(t)$ satisfies $$\mathcal{D}\left(a_i \sum_\sigma P_\sigma\right)[\rho_S] = \sum_\sigma \mathcal{D}(a_i \cdot P_\sigma)[\rho_S], \qquad (S34)$$

where the sum is taken over some projector $P_\sigma$ that projects onto distinct domain wall configuration $\sigma$. The same result holds when we replace $a_i$ by $a_i^\dagger$ or $a_i + a_i^\dagger$. This is because $\rho_S(t)$ evolved under Eq. (S32) is always a linear combination of some $|\psi_1\rangle\langle\psi_2|$, where $|\psi_1\rangle$, $|\psi_2\rangle$ might be different states but they are always the same domain wall configuration defined by the parity misalignment. The dissipative terms on site i in Eq. (S32) now read $$\gamma_i(0)\mathcal{D}(A_i(0))[\rho_S] + \sum_{\omega=\pm 4J}\gamma_i(\omega)\mathcal{D}(A_i(\omega))[\rho_S] + \sum_{\omega=\pm 8J}\gamma_i(\omega)\mathcal{D}(A_i(\omega))[\rho_S] =$$

$$\frac{\kappa_1}{2}\sum_{\omega=0,\pm 4J,\pm 8J}\mathcal{D}(A_i(\omega))[\rho_S] + \left(\gamma_i(2J) - \frac{\kappa_1}{2}\right)\mathcal{D}(A_i(4J))[\rho_S] +$$

$$\left(\gamma_i(8J) - \frac{\kappa_1}{2}\right)\mathcal{D}(A_i(8J))[\rho_S] = \frac{\kappa_1}{2}\mathcal{D}\left(\sum_{\omega=0,\pm 4J,\pm 8J} A_i(\omega)\right)[\rho_S] +$$

$$\frac{\kappa_1}{2}(e^{4\beta J} - 1)\mathcal{D}(A_i(4J))[\rho_S] + \frac{\kappa_1}{2}(e^{8\beta J} - 1)\mathcal{D}(A_i(8J))[\rho_S] =$$

$$\frac{\kappa_1}{2}\mathcal{D}(a_i + a_i^\dagger)[\rho_S] + \frac{\kappa_1}{2}(e^{4\beta J} - 1)\sum_{\sigma(3)}\mathcal{D}((a_i + a_i^\dagger)P_{\sigma(3)})[\rho_S] +$$

$$\frac{\kappa_1}{2}(e^{8\beta J} - 1)\sum_{\sigma(4)}\mathcal{D}((a_i + a_i^\dagger)P_{\sigma(4)})[\rho_S]$$

(S35)

We can now choose $$\beta = \frac{1}{8J}\ln\left[\frac{\kappa_{nn} + \kappa_1}{\kappa_1}\right]$$

for some $\kappa_{nn}$. Then we have $$\frac{\kappa_1}{2} D(a_i + a_i^\dagger)[\rho_S] + \frac{\bar{\kappa}_{nn}}{2} \sum_{\sigma(3)} \mathcal{D}\left((a_i + a_i^\dagger) P_{\sigma(3)}\right)[\rho_S] + \tag{S36}$$

$$\frac{\kappa_{nn}}{2} \sum_{\sigma(4)} \mathcal{D}\left((a_i + a_i^\dagger) P_{\sigma(4)}\right)[\rho_S,$$

where $$\bar{\kappa}_{nn} = \sqrt{\kappa_1 \kappa_{nn} + \kappa_1^2} - \kappa_1.$$

This is almost the same as the dissipators defined in Eq. (9). The first difference is that all jumps here are proportional to $a_i + a_i^\dagger$, while above all jumps are proportional to just $a_i$. (We shall address this in the next paragraph.) The second difference is that here $\kappa_i$ came solely from the bath that we designed ourselves, representing the fluctuations associated with a non-zero-temperature bath that disorders the state. We note that single-photon loss processes can also occur due to spontaneous emission for a single cavity, which arises due to processes that lower the energy within a single cavity (not included in the analysis above for simplicity). Taking such terms into account amounts to shifting up the effective temperature of the model. However, as long as the composite system sits in the low-temperature part of the phase diagram (i.e. if the "zero-temperature" part of the bath is significantly stronger than the terms that generate bit flips), the system will sit in the part of the phase diagram that hosts a quantum memory.

To recover the photonic-Ising dissipators, we take into account the two-photon process on each photonic-Ising site. The two-photon process effectively constrains the bosonic Hilbert space on each site to a two-dimensional manifold, making the thermal equilibrium of $H_S$ well-defined. Without the two-photon process, $H_S$ is infinitely degenerate even for a finite photonic-Ising lattice, which leads to an ill-defined steady-state manifold for the Lindbladian even when detailed balance is enforced.

To simplify the analysis, we assume that $N = |\alpha|^2 \to \infty$ and $\kappa_2$ is nonzero, in which case the system is at all times close to the ideal manifold spanned by the two coherent states $$|\pm\alpha\rangle = \left|\pm e^{-i\pi/4} \sqrt{N}\right\rangle \text{ with } \langle\alpha|-\alpha\rangle = 0.$$

So, within this two-dimensional Hilbert space, both a and at have vanishing diagonal matrix elements, while their off-diagonal matrix elements are off by only a phase, so we can write $a + a^\dagger \to (1+i)a$. This finally yields $$\kappa_1 \mathcal{D}(a_i)[\rho_s] + \tilde{\kappa}_{nn} \sum_{\sigma(3)} \mathcal{D}(a_i P_{\sigma(3)})[\rho_S] + \tag{S37}$$

$$\kappa_{nn} \sum_{\sigma(4)} \mathcal{D}(a_i P_{\sigma(4)})[\rho_S],$$

which are the photonic-Ising dissipators [Eq. (9)] and the single-photon loss noise at site i.

Note that, while we made many assumptions to arrive at the precise dissipators from Eq. (9), it is likely that nearly any low-temperature thermal Markovian bath will result in a protected quantum memory.

Engineering an Ising Interaction Between Cavity Modes

We showed in the last section that the dissipators described in Eq. (9) most naturally appear as thermal dissipators corresponding to processes that raise and lower the energy of the Ising-like Hamiltonian $$H = -J \sum_{\langle ij \rangle} Q_i Q_Y, \text{ where } Q_i = e^{i\pi a_i^\dagger a_i}.$$

The most straightforward approach to achieve a passively protected memory is therefore to engineer an Ising-like interaction between nearest-neighbor cat qubits. At low temperatures, the coupling of the system to its thermal environment can lead to thermal processes that drive the system to a ferromagnetic state, thus protecting the system against bit flips.

Previous studies have described how to achieve a parity-parity interaction term between neighboring cat qubits. Here we first review the steps needed to achieve a single-cavity Hamiltonian proportional to parity. We then discuss the generalization to a parity-parity interaction which follows in a very similar manner.

Consider an LC oscillator (representing a cavity mode) connected to a Josephson junction, as shown in FIG. 8(a), in the presence of a two-photon drive on the cavity (not shown). The Hamiltonian of the system reads $$H = \frac{\hat{q}^2}{2C} + \frac{\hat{\phi}^2}{2L} - E_J \cos\left(\hat{\phi}/\Phi_0\right) + \lambda\left(\hat{a}^2 e^{i\omega_d t} + (\hat{a}^\dagger)^2 e^{i\omega_d t}\right), \tag{S38}$$

where $\hat{q}$ is the charge of the capacitor C, $\hat{\phi}$ is the flux through the inductor L, and $E_J$ is the Josephson energy, $\Phi_0 = \hbar/(2e)$ is the flux quantum, $\hat{a}$ annihilates an excitation of the cavity, $\lambda$ is the drive strength, and $\omega_d$ is the drive frequency. We note that the flux through the inductor is equal in magnitude to the flux through the Josephson junction since Kirchoff's law relates the voltage drop across the two elements at any given time. We can rewrite the Hamiltonian in terms of $a, a^\dagger$:

$$H = \hbar\omega(a^\dagger a + 1/2) - E_J \cos\left[x(a + a^\dagger)\right] + \lambda\left(a^2 e^{i\omega_d t} + (a^\dagger)^2 e^{-i\omega_d t}\right) \tag{S39}$$

where $$\phi = \sqrt{\hbar Z/2}\,(a + a^\dagger)$$

$$q = (1/i)\sqrt{\square\,\hbar/(2Z)}(a - a^\dagger)$$

$$\omega = 1/\sqrt{LC}$$

$$Z = \sqrt{L/C}$$

$$x = \Phi_0^{-1}\sqrt{\hbar Z/2}$$

and we drop the hats on operators henceforth.

Going to the interaction picture with respect to $\hbar\omega(a^\dagger a + \frac{1}{2})$, the Hamiltonian takes the form $$H_{int} = E_J \cos\left[x(ae^{-i\omega t} + a^\dagger e^{+i\omega t})\right] + \tag{S40}$$

$$\lambda\left(a^2 + (a^\dagger)^2\right) = -\frac{E_J}{2}(D[\beta(t)] + D[-\beta(t)]) + \lambda(a^2 + (a^\dagger)^2),$$

where we have assumed an on-resonant drive, $\omega_d=2\omega$, and defined the displacement operator $D[\beta(t)]=e^{\beta(t)a^\dagger - \beta^*(t)a}$, with $\beta(t)=ixe^{-i\omega t}$. We apply the rotating-wave approximation to remove all time dependence in the Hamiltonian, which is valid in the limit $\omega \gg E_J$:

$$H_{rm} = -E_J e^{-x^3/2} \sum_n \left(L_n(x^2)|n\rangle\langle n|\right) + \lambda\left(a^2 + \left(a^\dagger\right)^2\right), \quad (S41)$$

where $L_n$ is the Laguerre polynomial of order n.

The two-photon drive (along with engineered two-photon loss) ensures that the system is approximately confined to a two-dimensional manifold spanned by the cat states $|\alpha_e\rangle$ and $|\alpha_o\rangle$. In this subspace, the Hamiltonian is diagonal (since $H_{rw}$ is diagonal in the Fock basis). Further, if we set $x=2|\alpha|$, then the Hamiltonian is exponentially close to the parity operator:

$$H_{rw}^{cat} = -\frac{\hbar\Omega}{2}\left(|\alpha_e\rangle\langle\alpha_e| - |\alpha_o\rangle\langle\alpha_o|\right) + O\left(E_J e^{-|\alpha|^2/2}\right) \quad (S42)$$

$$= -\left(\frac{\hbar\Omega}{2}\right)Q + O\left(E_J e^{-|\alpha|^2/2}\right), \quad Q = e^{i\pi a^\dagger a},$$

Where $\Omega=E_J/(\hbar\sqrt{2\pi|\alpha|^2})$. The exponentially small term is proportional to the identity in this subspace, which should not affect the dynamics.

Let us briefly summarize the physical conditions required to achieve a parity Hamiltonian of the form $H\sim Q$ in (S43) above. In the large $|\alpha|^2\equiv N$ limit, we require that $E_J\sim\sqrt{N}$ such that the coefficient $\Omega$ does not tend to zero at large N. In order for the rotating wave approximation to be valid, we required that $\omega\sim E_J$. This implies that $\omega\sim\sqrt{N}$, which can be achieved with a small capacitance: $\omega\sim 1/\sqrt{LC}$ if $C\sim N^{-1}$. Finally, we required $x\sim\sqrt{L/C}\sim\sqrt{N}$. This is again satisfied with the small capacitance condition: $C\sim N^{-1}$.

So far, our discussion has focused on achieving a parity Hamiltonian for a single cavity. A very similar setup will result in a parity-parity interaction between neighboring cavity modes. We briefly describe how this can be done.

Consider two driven LC oscillators which are connected to a Josephson junction, as shown in FIG. 8(b). (We again assume two-photon drives on each cavity as before, but neglect to include them in the Hamiltonian since they only serve the purpose of confining the state of the system to the cat state subspace, as described in the previous paragraphs.) The Hamiltonian for the system reads $$H = \left(\frac{q_1^2}{2C_1} + \frac{\phi_1^2}{2L_1}\right) + \left(\frac{q_2^2}{2C_2} + \frac{\phi_2^2}{2L_2}\right) - E_J\cos(\phi_2 + \phi_1), \quad (S44)$$

where $\phi_{1/2}$ are the node fluxes defined in FIG. 8(b). Moving to the rotating frame of the cavity Hamiltonians leads to the interaction Hamiltonian $$H_{int} = E_J\cos\left(\left(a_2 e^{-i\omega_2 t} + a_2^\dagger e^{i\omega_2 t}\right) + \left(a_1 e^{-i\omega_1 t} + a_1^\dagger e^{i\omega_1 t}\right)\right), \quad (S45)$$

where $a_{1/2}$ are the annihilation operators associated with the two cavities, and $\omega_{1/2}$ are the frequencies. Applying the rotating-wave approximation leads to $$H_{rw} = -E_J e^{-(x_1^2+x_2^2)/2} \sum_{n_1,n_2} L_{n_1}(x_1^2)L_{n_2}(x_2^2)|n_1, n_2\rangle\langle n_1, n_2|. \quad (S46)$$

Note that we also require that the frequencies of the cavities should be incommensurate in order for the terms above to be the only ones that are time independent, i.e. $l_1\omega_1\neq l_2\omega_2, \forall l_1, l_2 \in Z$. Specializing to the two-dimensional cat state manifold leads to an interaction of the form $$H_{rw}^{cat} = -\left(\frac{\Omega_1\Omega_2}{4E_J}\right)Q_1 Q_2, \quad Q_{1/2} = e^{i\pi a_{1/2}^\dagger a_{1/2}}, \quad (S47)$$

where $\Omega_{1/2}=E_J/\sqrt{2\pi|\omega_{1/2}|^2})$ set the energy scale of the coupling between the two cavities 1,2.

Again, let us briefly summarize the physical conditions required to achieve the parity-parity Hamiltonian of the form $H\sim Q_1 Q_2$ in Eq. (S47) above. In the large $|\alpha|^2\equiv N$ limit, we require that $E_J\sim N$ such that the coefficient $\sim\Omega_1\Omega_2/E_J$ does not tend to zero at large N. In order for the rotating wave approximation to be valid, we required that $\omega_{1/2}\gg E_J$ and $|\omega_1-\omega_2|\gg E_J$. This implies that $\omega\sim N$. We also require that $x_{1/2}\sim\sqrt{L_{1/2}/C_{1/2}}\sim\sqrt{N}$. Both of these conditions can be achieved for $C_{1/2}\sim N^{-3/2}, L_{1/2}\sim N^{-1/2}$.

A schematic layout for a 2D quantum memory is provided in FIG. 8(c): Each black dot represents a driven dissipative resonator, connected to its neighbor via a Josephson junction that results in an Ising interaction. The advantage of the passive approach is the lack of ancilla qubits and of precise pulse signals that are typically needed to make the measurements required for active error correction. The passive approach also avoids the need for classical communication with a decoder.

Let us briefly estimate the logical decoherence rate for a model with N=30, M=10, composed of state-of-the-art circuit elements. The logical bit-flip time for a single photonic cavity is set by the single-photon loss rate, which is about $\kappa_1/2\pi=20$ KHz. [Note that our naming convention for bit/phase-flip errors differs from the conventional cat qubit literature.] For a cavity with N photons, this rate increases to $N\kappa_1/2\pi=20N$ KHz, corresponding to a logical bip-flip time of about 1.6 μs for N=30. Placing such cat qubits on an M×M lattice for M=10, and assuming that $\beta=0.49$, we see (from FIG. 2) that the logical bit-flip time gets improved by a factor of $10^3$, suggesting an overall logical bit-flip time of about 1.6 ms. We can similarly estimate the logical phase-flip time: A single cavity with N=30 has a logical phase-flip time of about 1 s. Constructing an M×M lattice of such cavities leads to an overall logical phase-flip time of $1/10^2s=10$ ms. We therefore find that such a system is expected to have both a bit-flip and phase-flip time that exceeds 1 ms. In terms of circuit parameters, the Ising coupling strength is set by $J=E_J/(8\pi N)$. For $E_J/2\pi=400$ GHz and N=30, we can achieve an effective $\beta=0.49$ if the physical temperature is T=51 mK, which can be achieved via standard dilution refrigerators. The most challenging part of constructing such a model involves constructing a high-impedance cavity mode. The condition $x=2|\alpha|$ implies that the impedance of the cavity should satisfy $Z=8NR_Q$, where $R_Q$ is the resistance quantum. Currently, superimpedances constructed out of Josephson junction arrays have reached about $Z=8R_Q$, so achieving such a high impedance will be challenging for N=30. Nevertheless, we note that, in principle, the impedance can be made arbitrarily large by increasing the number of Josephson junctions in the array.

The scheme we have just described to achieve a parity-parity interaction requires fabricating a device with challenging circuit requirements. It is conceivable that there are other routes towards achieving similar passive 2D memories that are not as demanding to realize. The field of superconducting circuits potentially provides new routes to achieve such a model. In particular, certain qubits can achieve exponential suppression of errors as a function of circuit parameters, e.g. squeezed cat qubits, Kerr qubits, cos (2θ) qubits, and zero-pi qubits. Future work should investigate ways to achieve an Ising interaction for different types of protected qubits.

Digital Autonomous Photonic-Ising Local Decoder

In this section, we describe a digital autonomous approach for realizing a stochastic local error decoder inspired by the photonic-Ising dissipators defined above. This procedure involves implementing a sequence of fault-tolerant local gates to correct the errors without the need of measurements. The step is then iterated over time on the entire system as fast as possible. Although this approach is different from directly realizing the microscopic Lindbladian (which could be done by dividing the error-correcting step infinitesimally), this digital approach is potentially easier to realize experimentally, and we expect that it provides the same dynamical protection of the quantum memory. Note that the protocol requires the rate of the digital steps to scale linearly with the average photon number.

It suffices to consider the implementation of the local decoder at a single time step. Consider a square lattice of photonic cavities. Over each lattice cavity, we place an ancillary cavity (initialized in $|\alpha_o\rangle$).

We describe the implementation at a single site and the generalization to the whole lattice follows straightforwardly. First, for a given site, we perform an encoding unitary U. Depending on the state of the chosen lattice cavity and its four neighbors, U changes the state of the ancillary cavity via $$U = P \otimes (|\alpha_e\rangle\langle\alpha_o| + |\alpha_o\rangle\langle\alpha_e|) + P^\perp \otimes (|\alpha_o\rangle\langle\alpha_o| + |\alpha_e\rangle\langle\alpha_e|), \quad (S48)$$

where P projects on a local configuration of domain walls (a specific example was considered above, where we project onto a configuration with 3 or 4 misaligned neighboring lattice cavities) and $P^\perp$ is the orthogonal subspace projector. We define the unitary U such that it changes the ancillary cavity from $|\alpha_o\rangle$ to $|\alpha_e\rangle$ if a local error is detected; it does nothing otherwise. Note that U can be implemented using the fundamental set of bias-preserving gates, where the two-photon drive and two-photon loss can be kept on thus suppressing the dephasing errors during the gate implementation.

Second, we apply a CNOT gate (described in Section IV.D in Ref. [54]) that is controlled by the ancillary cavity and targets the corresponding lattice cavity. (We use the convention that $|\alpha_o\rangle$ is $|0\rangle$ and $|\alpha_e\rangle$ is $|1\rangle$).

Third, we use a strong dispersive coupling to a transmon to extract the entropy from the ancillary cavity and reset it back to the initial state $|\alpha_o\rangle$. Due to the fault-tolerance of the cavity-cavity gates, the phase errors stay suppressed when the Ising-type local decoder is implemented autonomously.

The full procedure is achieved by implementing the encoding and the reset across the entire lattice. To extend the single-site procedure to the entire lattice, we note that the encoding operations U on each site are local around each lattice cavity and they commute across different lattice sites. Therefore, the encoding U can be implemented in parallel across all the sites before a final reset, e.g. by dividing the lattice into bipartite sublattices and operating on the cavities that belong to the same sublattice in parallel.

For concreteness, let us consider an example where U flips the ancillary cavity if it identifies a corner formed by the domain walls, i.e. Toom's rule. (Digitally, this is simpler than the majority rule described above, but one could implement the majority rule approach as well.) Then U for a chosen orientation can be implemented by the following gate sequence 1. Apply two CNOTs from center lattice cavity to its neighboring cavities on the left and on the top.
2. Apply a Toffoli gate controlled by the two neighboring cavities and targeting the ancillary cavity.
3. Repeat step 1 to invert the two CNOTs applied.

The digital procedure for the autonomous implementation of Toom's rule on a particular configuration is schematically depicted in FIG. 9.

The autonomous approach above can be easily turned into an active error correction protocol: instead of applying a CNOT from the ancillary cavity to the central cavity and then resetting the ancillary cavity, we can measure the ancillary cavity and flip the parity of the central cavity if the measurement result is (+). Alternatively, when implementing active error correction, we can place a syndrome cavity between each pair of neighboring cavities on the lattice. By storing in the syndrome cavity the information regarding the presence of a domain wall, we can implement a local decoder based on the rules defined by U. This then becomes a 2D version of a repetition cat code. Again, all the steps can be achieved with dephasing errors exponentially suppressed. In contrast with the non-local processing of syndrome information required by the 1D repetition cat code, the 2D code allows for a stochastic local decoding procedure. As mentioned at the beginning of the section, to achieve an exponentially long memory time, both the autonomous and the active error correction approaches require scaling the rate of the digital step linearly with the average number of cavity photons N because bit-flip error rate scales with N.

The processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware, or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Any logical blocks, modules, and algorithm elements described or used in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described or used in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix(s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. A passively protected quantum memory in two dimensions comprising: a square lattice comprising a plurality of harmonic oscillators; each of the plurality of harmonic oscillators experiencing a coherent two-photon drive process and an incoherent two-photon loss process; each of the plurality of harmonic oscillators coupled to its nearest neighbor harmonic oscillators via a ferromagnetic Ising parity-parity interaction; and a cold bath coupled to the plurality of harmonic oscillators at a temperature sufficient to cause parities of neighboring harmonic oscillators to align through an energy dissipation process described by local dissipators.

2. The passively protected quantum memory in two dimensions of claim 1, wherein each of the harmonic oscillators experiences the coherent two-photon drive process with an amplitude $\lambda$ and the incoherent two-photon loss process with a rate $\kappa_2$.

3. The passively protected memory in two dimensions of claim 1, wherein the ferromagnetic Ising parity-parity interaction comprises a Hamiltonian between neighboring cavities defined as $H_S=-\Sigma_{(ij)}Q_iQ_j$ wherein indices i and i denote lattice sites, (i,j) denotes a sum over nearest neighbors, and $Q_j$ is a photon parity operator at site j.

4. The passively protected memory in two dimensions of claim 1, wherein the local dissipators are defined as $$L_{x,y}^{(4)} = \sqrt{\kappa_{nn}}\, a_{x,y} P_{x,y;\rightarrow}^{-} P_{x,y;\uparrow}^{-} P_{x-1,y;\rightarrow}^{-} P_{x,y-1;\uparrow}^{-},$$

$$L_{x,y}^{(3)} = \sqrt{\tilde{\kappa}_{nn}}\, a_{x,y} P_{x,y;\rightarrow}^{+} P_{x,y;\uparrow}^{-} P_{x-1,y;\rightarrow}^{-} P_{x,y-1;\uparrow}^{-},$$

wherein x and y denote coordinates of a site in the square lattice, $a_{x,y}$ is an annihilation operator for harmonic oscillator at site $$x, y, \tilde{\kappa}_{nn} = \sqrt{\kappa_1\kappa_{nn} + \kappa_1^2} - \kappa_1,$$

$\kappa_1$ is a single-photon loss rate corresponding to a local dissipator $L_{1,x,y}=\sqrt{\kappa_1}a_{x,y}$, $$P_{x,y;\rightarrow}^{\pm} = (1 \pm Q_{x,y}Q_{x+1,y})/2,\ P_{x,y;\uparrow}^{\pm} = (1 \pm Q_{x,y}Q_{x,y+1})/2,\ \text{and}$$

$$Q_{x,y} = e^{i\pi a_{x,y}^{\dagger} a_{x,y}}.$$

5. The passively protected quantum memory in two dimensions of claim 3, wherein steady states of the parity-parity interaction Hamiltonian span a codespace and are defined as $|\psi\rangle=c_0|\alpha_e\rangle|\alpha_e\rangle|\alpha_e\rangle\ldots+c_1|\alpha_o\rangle|\alpha_o\rangle|\alpha_o\rangle\ldots$, for $|c_0|^2+|c_1|^2=1$.

6. The passively protected quantum memory in two dimensions of claim 5, wherein $|\alpha_e\rangle\sim|\alpha\rangle+|-\alpha\rangle$, $|\alpha_o\rangle\sim|\alpha\rangle-|-\alpha\rangle$, and $|\alpha\rangle$ is a coherent state with amplitude $\alpha=e^{-i\pi/4}\sqrt{N}$ and $N=\lambda/\kappa_2$ photons.

7. The passively protected quantum memory in two dimensions of claim 1, wherein the passively protected quantum memory suppresses logical phase-flip errors as the number of photons N increases.

8. The passively protected quantum memory in two dimensions of claim 1, wherein the passively protected quantum memory suppresses logical bit-flip errors as a lattice size M of the square lattice increases.

9. The passively protected quantum memory in two dimensions of claim 1, wherein the ferromagnetic Ising parity-parity interaction comprises a coupling between high-impedance cavity modes and Josephson junctions.

10. The passively protected quantum memory in two dimensions of claim 1, wherein the local dissipators are implemented digitally.

11. A passively protected memory in two dimensions comprising: a square lattice comprising a plurality of harmonic oscillators; each of the plurality of harmonic oscillators experiencing a coherent two-photon drive process and an incoherent two-photon loss process; an ancillary cavity coupled to each of the plurality of harmonic oscillators; and a processor configured to perform the following steps: applying a unitary operation U to the ancillary cavity, the unitary operation U being dependent on a state of the corresponding harmonic oscillator and its four nearest neighbor harmonic oscillators, the unitary operation U changing the state of the ancillary cavity if a local error is detected in the configuration of the corresponding harmonic oscillator and its four nearest neighbor harmonic oscillators and leaving the state of the ancillary cavity unchanged if no local error is detected; applying a controlled-NOT gate with the ancillary cavity acting as a control qubit and the corresponding harmonic oscillator acting as a target qubit; and resetting the ancillary cavity to its initial state.

12. The passively protected memory in two dimensions of claim 11, wherein each of the plurality of harmonic oscillators experiences the coherent two-photon drive process with an amplitude $\lambda$ and the incoherent two-photon loss process with a rate $\kappa_2$.

13. The passively protected memory in two dimensions of claim 11, wherein the unitary operation U is defined as $U=P\otimes(|\alpha_e\rangle\langle\alpha_o|+|\alpha_o\rangle\langle\alpha_e|)+P^{\perp}\otimes(|\alpha_o\rangle\langle\alpha_o|+|\alpha_e\rangle\langle\alpha_e|)$, wherein P is a projector that projects on a local configuration of domain walls and $P^{\perp}$ is an orthogonal subspace projector.

14. The passively protected memory in two dimensions of claim 13, wherein the projector P projects onto a configuration with 3 or 4 misaligned neighboring lattice cavities.

15. The passively protected memory in two dimensions of claim 13, wherein the projector P implements a Toom's rule algorithm for detecting local errors.

16. The passively protected memory in two dimensions of claim 11, wherein the ancillary cavity is initialized in state $|\alpha_o\rangle$.

17. The passively protected memory in two dimensions of claim 11, wherein the processor resets the ancillary cavity by dispersively coupling the ancillary cavity to a transmon qubit.

18. The passively protected memory in two dimensions of claim 11, wherein the processor implements the unitary operation U in parallel across all sites of the square lattice before resetting the ancillary cavities.

19. The passively protected memory in two dimensions of claim 18, wherein the processor implements the unitary operation U in parallel by dividing the lattice into bipartite sublattices and operating on the cavities that belong to the same sublattice in parallel.

20. The passively protected memory in two dimensions of claim 11, wherein the processor implements the unitary operation U using bias-preserving gates.

21. A process for operating a passively protected quantum memory in two dimensions, the process comprising: encoding a quantum bit into a square lattice comprising a plurality of harmonic oscillators; each of the plurality of harmonic oscillators experiencing a coherent two-photon drive process and an incoherent two-photon loss process; each of the plurality of harmonic oscillators coupled to its nearest neighbor harmonic oscillators via a ferromagnetic Ising parity-parity interaction; and a cold bath coupled to the plurality of harmonic oscillators at a temperature sufficient to cause parities of neighboring harmonic oscillators to align through an energy dissipation process described by local dissipators.

22. The process for operating a passively protected quantum memory in two dimensions of claim 21, wherein each of the harmonic oscillators experiences the coherent two-photon drive process with an amplitude $\lambda$ and the two-photon loss process with a rate $\kappa_2$.

23. The process for operating a passively protected quantum memory in two dimensions of claim 21, wherein the ferromagnetic Ising parity-parity interaction comprises a Hamiltonian between neighboring cavities defined as $H_S=-$ $\Sigma_{(ij)}Q_iQ_j$, wherein indices i and i denote lattice sites, (i,j) denotes a sum over nearest neighbors, and $Q_j$ is a photon parity operator at site j.

24. The process for operating a passively protected quantum memory in two dimensions of claim 21, wherein the local dissipators are defined as $$L_{x,y}^{(4)} = \sqrt{\tilde{\kappa}_{nn}}\, a_{x,y} P_{x,y;\to}^- P_{x,y;\uparrow}^- P_{x-1,y;\to}^- P_{x,y-1;\uparrow}^-,$$

$$L_{x,y}^{(3)} = \sqrt{\tilde{\kappa}_{nn}}\, a_{x,y} P_{x,y;\to}^+ P_{x,y;\uparrow}^- P_{x-1,y;\to}^- P_{x,y-1;\uparrow}^-,$$

wherein x and y denote coordinates of a site in the square lattice, $\alpha_{x,y}$ is an annihilation operator for the harmonic oscillator at site $$x, y, \tilde{\kappa}_{nn} = \sqrt{\kappa_1 \kappa_{nn} + \kappa_1^2} - \kappa_1,$$

$\kappa_1$ is a single-photon loss rate corresponding to a local dissipator $$L_{1,x,y} = \sqrt{\kappa_1}\, a_{x,y} P_{x,y;\to}^\pm = (1 \pm Q_{x,y}Q_{x+1,y})/2,$$

$$P_{x,y;\uparrow}^\pm = (1 \pm Q_{x,y}Q_{x,y+1})/2, \text{ and } Q_{x,y} = e^{i\pi a_{x,y}^\dagger a_{x,y}}.$$

25. The process for operating a passively protected quantum memory in two dimensions of claim 21, wherein steady states of the ferromagnetic Ising parity-parity interaction span a codespace and are defined as $|\psi\rangle = c_0|\alpha_e\rangle|\alpha_e\rangle |\alpha_e\rangle \ldots + c_1|\alpha_o\rangle|\alpha_o\rangle|\alpha_o\rangle \ldots$, for $|c_0|^2 + |c_1|^2 = 1$.

26. The process for operating a passively protected quantum memory in two dimensions of claim 25, wherein $|\alpha_e\rangle \sim |\alpha\rangle + |-\alpha\rangle$, $|\alpha_o\rangle \sim |\alpha\rangle - |-\alpha\rangle$, and $|\alpha\rangle$ is a coherent state with amplitude $\alpha = e^{-i\pi/4}\sqrt{N}$ and $N = \lambda/\kappa_2$ photons.

27. The process for operating a passively protected quantum memory in two dimensions of claim 21, wherein the process suppresses logical phase-flip errors as the number of photons N increases.

28. The process for operating a passively protected quantum memory in two dimensions of claim 21, wherein the process suppresses logical bit-flip errors as the lattice size M of the square lattice increase.

29. The process for operating a passively protected quantum memory in two dimensions of claim 21, wherein the ferromagnetic Ising parity-parity interaction comprises a coupling between high-impedance cavity modes and Josephson junctions.

30. The process for operating a passively protected quantum memory in two dimensions of claim 21, wherein the local dissipators are implemented digitally.

* * * * *